US012773716B2

(12) United States Patent
Konishi et al.

(10) Patent No.: US 12,773,716 B2
(45) Date of Patent: Oct. 27, 2026

(54) LIQUID APPLICATION APPARATUS AND LIQUID APPLICATION METHOD

(71) Applicants: Yohsuke Konishi, Kanagawa (JP); Takayuki Niihara, Kanagawa (JP); Takashi Fujita, Kanagawa (JP); Yukihiro Wakabayashi, Kanagawa (JP)

(72) Inventors: Yohsuke Konishi, Kanagawa (JP); Takayuki Niihara, Kanagawa (JP); Takashi Fujita, Kanagawa (JP); Yukihiro Wakabayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 419 days.

(21) Appl. No.: 18/487,442

(22) Filed: Oct. 16, 2023

(65) Prior Publication Data

US 2024/0131553 A1 Apr. 25, 2024
US 2024/0226953 A9 Jul. 11, 2024

(30) Foreign Application Priority Data

Oct. 20, 2022 (JP) ................................ 2022-168509

(51) Int. Cl.
*B05C 11/10* (2006.01)
*B05C 9/12* (2006.01)

(52) U.S. Cl.
CPC ............ *B05C 11/1039* (2013.01); *B05C 9/12* (2013.01)

(58) Field of Classification Search
CPC ........... B05C 11/10; B05C 5/027; B05C 5/00; B05C 5/0208; B05C 11/08; B05C 11/02; B05C 5/0204; B05C 1/00; B05C 9/12; B05C 11/1039
See application file for complete search history.

(56) References Cited

U.S. PATENT DOCUMENTS

2006/0066664 A1 3/2006 Kachi et al.

FOREIGN PATENT DOCUMENTS

| | | |
|---|---|---|
| JP | 2004-142365 A | 5/2004 |
| JP | 2006-095880 | 4/2006 |
| JP | 2008-126451 A | 6/2008 |
| JP | 2009-045892 | 3/2009 |
| JP | 2011-224833 A | 11/2011 |

OTHER PUBLICATIONS

Machine translation of JP2004142365 A (Year: 2004).*
Machine translation of JP2011224833 A (Year: 2011).*
Office Action for JP2022-168509 mailed on Aug. 4, 2026.

* cited by examiner

*Primary Examiner* — Vishal I Patel
(74) *Attorney, Agent, or Firm* — IPUSA, PLLC

(57) ABSTRACT

A liquid application apparatus includes an applicator, a maintenance device, a conveyor, a first conveyance path, and a second conveyance path. The applicator applies a liquid to an object. The maintenance device maintains an applying condition of the liquid by the applicator. The conveyor conveys the object and the maintenance device. The object is to be conveyed along the first conveyance path. The maintenance device is to be conveyed along the second conveyance path. The applicator includes a nozzle surface on which a plurality of nozzles to discharge the liquid is formed. The maintenance device includes a wiper to wipe the nozzle surface. The first conveyance path overlaps with the second conveyance path at least at a portion at which the first conveyance path passes by the applicator.

15 Claims, 43 Drawing Sheets

LIQUID APPLICATION APPARATUS AND LIQUID APPLICATION METHOD

CROSS-REFERENCE TO RELATED APPLICATION

This patent application is based on and claims priority pursuant to 35 U.S.C. § 119(a) to Japanese Patent Application No. 2022-168509, filed on Oct. 20, 2022, in the Japan Patent Office, the entire disclosure of which is hereby incorporated by reference herein.

BACKGROUND

Technical Field

Embodiments of the present disclosure relate to a liquid application apparatus and a liquid application method.

Related Art

A liquid application apparatus is known in the art that includes an application unit to apply liquid to an object and a maintaining unit to maintain an applying condition of the liquid by the application unit. Such a liquid application apparatus is used for, for example, manufacturing a device by applying liquid onto a base material as an object, or for forming an image with liquid on a recording medium as an object.

As a liquid application apparatus as described above, for example, there has been proposed an apparatus that executes maintenance operation by a maintenance unit that is conveyed.

SUMMARY

According to an embodiment of the present disclosure, a liquid application apparatus includes an applicator, a maintenance device, a conveyor, a first conveyance path, and a second conveyance path. The applicator applies a liquid to an object. The maintenance device maintains an applying condition of the liquid by the applicator. The conveyor conveys the object and the maintenance device. The object is to be conveyed along the first conveyance path. The maintenance device is to be conveyed along the second conveyance path. The applicator includes a nozzle surface on which a plurality of nozzles to discharge the liquid is formed. The maintenance device includes a wiper to wipe the nozzle surface. The first conveyance path overlaps with the second conveyance path at least at a portion at which the first conveyance path passes by the applicator.

According to another embodiment of the present disclosure, there is provided a liquid application method to be performed by a liquid application apparatus. The method includes applying, maintaining, and conveying. The applying applies a liquid to an object by an applicator that includes a nozzle surface on which a plurality of nozzles to discharge the liquid is formed. The maintaining maintains an applying condition of the liquid by the applicator, by a maintenance device including a wiper to wipe the nozzle surface. The conveying conveys, by a conveyor, the object along a first conveyance path and the maintenance device along a second conveyance path, the first conveyance path overlapping with the second conveyance path at least at a portion at which the first conveyance path passes by the applicator.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
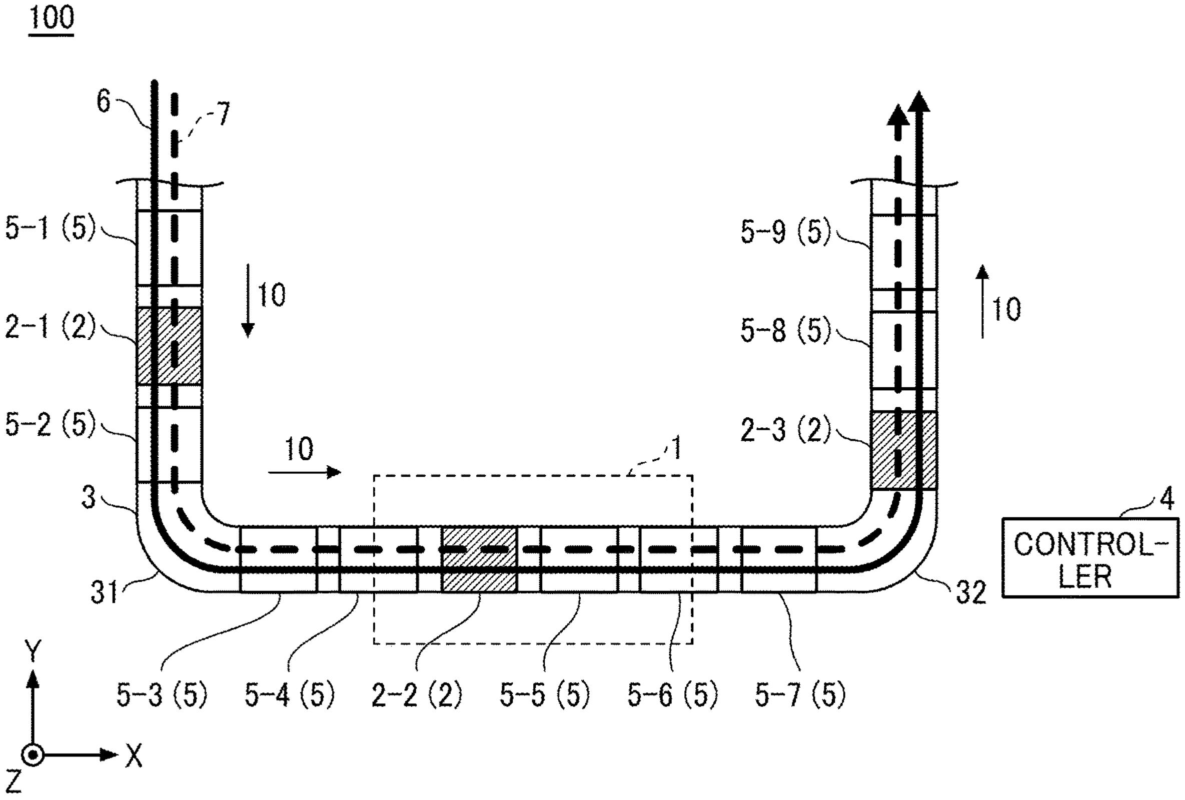
FIG. 1 is a top view of a liquid application apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below in detail with reference to the drawings. In the drawings, the same or similar components are denoted by the same reference codes, and redundant description thereof will be omitted as appropriate.

The following embodiments exemplify a liquid application apparatus and a liquid application method for embodying the technical idea of the present disclosure, and do not limit the present disclosure to the following embodiments. For example, the dimension, material, and shape of components and the relative positions of the arranged components are given by way of example in the following description, and the scope of the present disclosure is not limited thereto unless particularly specified. The size, positional relation, and the like of components illustrated in the drawings may be exaggerated for clarity of description.

In each drawing, orthogonal coordinates having an X axis, a Y axis, and a Z axis are used as direction representations. A Z direction along the Z axis will be defined as an up-and-down direction. The up-and-down direction is a vertical direction. The +Z direction will be defined as upward, and the −Z direction will be defined as downward. In a plane orthogonal to the Z direction, two orthogonal directions will be defined as an X direction and a Y direction. However, these directional representations do not limit the directions in the embodiments of the present disclosure.

First Embodiment

Configuration Example of Liquid Application Apparatus

Figure 2:
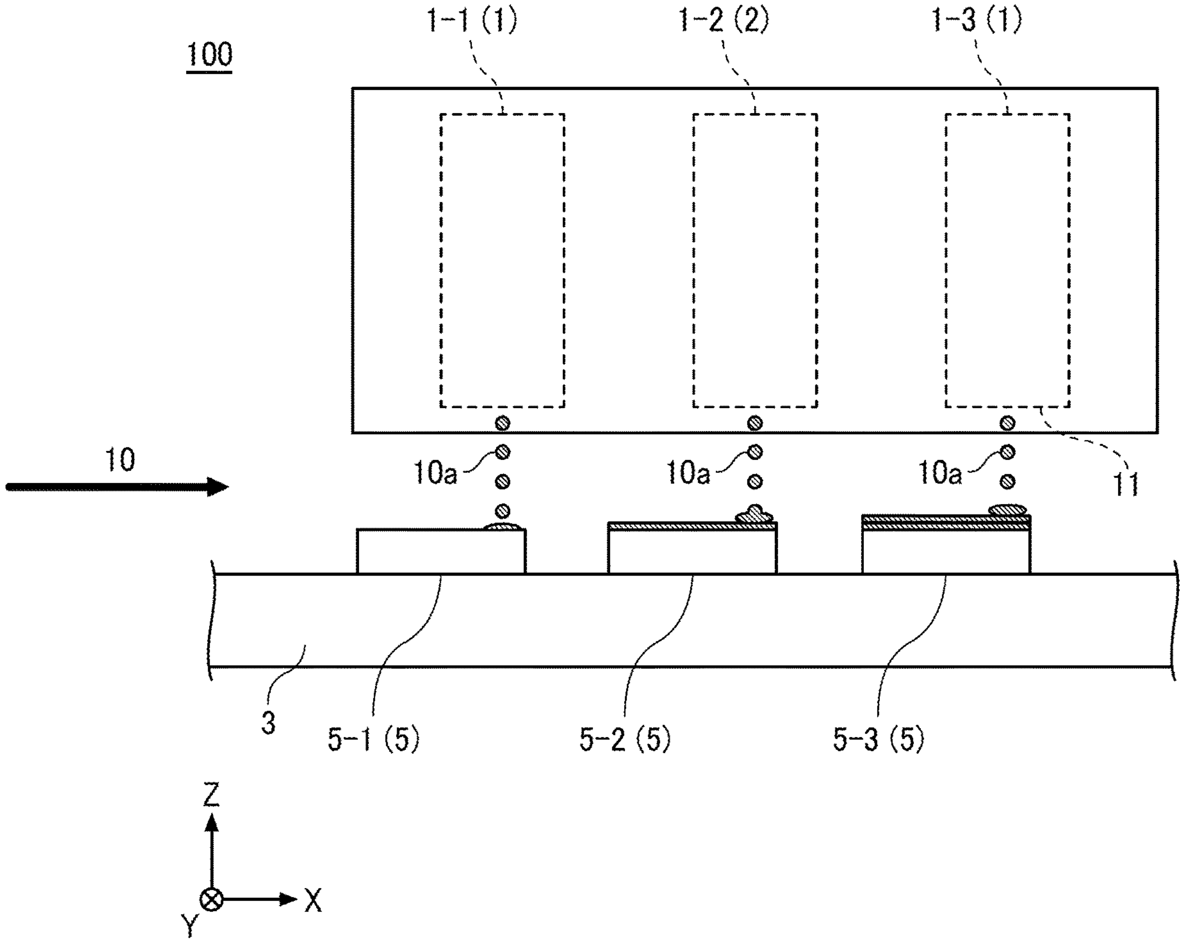
FIG. 2 is a side view of a head and the vicinity thereof in the liquid application apparatus in FIG. 1, illustrating a state in which an object is located below the head.
Figure 3:
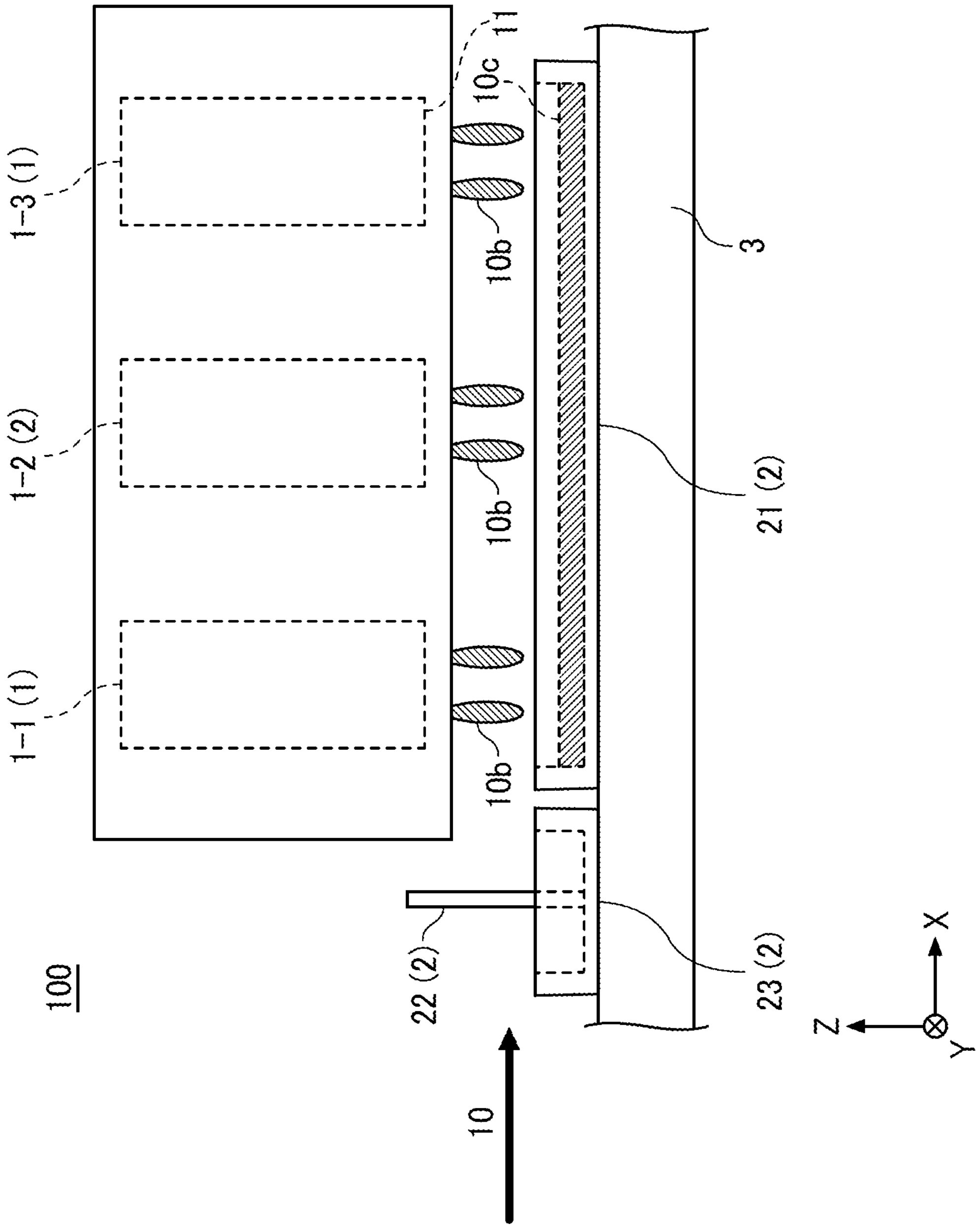
FIG. 3 is a side view of the head and the vicinity thereof in the liquid application apparatus in FIG. 1, illustrating a state in which a cleaning unit is located below the head.

A configuration of a liquid application apparatus 100 according to a first embodiment of the present disclosure will be described with reference to FIGS. 1 to 3. FIG. 1 is a schematic top view of the liquid application apparatus 100 according to the first embodiment of the present disclosure. FIG. 2 is a side view of a head 1 and the vicinity thereof in the liquid application apparatus 100, schematically illustrating a state in which an object 5 is located below the head 1. FIG. 3 is a side view of the head 1 and the vicinity thereof in the liquid application apparatus 100, schematically illustrating a state in which a cleaning unit 2 is located below the head 1.

FIGS. 2 and 3 are side views of the head 1 as viewed from a direction (−Y direction) orthogonal to both a conveyance direction 10 of the object 5 and the cleaning unit 2 and the up-and-down direction (Z direction). In the side views of the head 1, members or liquids inside a discharged liquid holder 21 and a wiped liquid holder 23 may be indicated by broken lines. This also applies to each side view of the head 1 referred to later.

As illustrated in FIGS. 1 to 3, the liquid application apparatus 100 includes the head 1, the cleaning unit 2, a conveyor 3, a controller 4, a first conveyance path 6, and a second conveyance path 7. In addition to these components, the liquid application apparatus 100 may include other components such as an operation unit such as a touch panel for operating the liquid application apparatus 100 and a display unit such as a display for displaying a message to an operator of the liquid application apparatus 100.

The liquid application apparatus 100 is an apparatus that applies an active energy ray-curable liquid to an upper surface of a base material as the object 5 to manufacture a resin structure, for example. Examples of the resin structure include an electrode base, a secondary battery, and a fuel cell.

The liquid according to the embodiment may contain a polymerizable compound, a solvent, and other components such as a polymerization initiator as necessary. The liquid may be cured to form a resin structure having a porous structure with a skeleton of a resin.

The head 1 is an example of an applicator that applies a liquid to the object 5. The cleaning unit 2 is an example of a maintenance device that maintains the applying condition of liquid by the head 1. The conveyor 3 is an example of a conveyor that conveys the object 5 and the cleaning unit 2. The conveyor 3 is a conveyance mechanism such as a roller conveyor or a belt conveyor. The controller 4 controls the operations of the head 1, the cleaning unit 2, and the conveyor 3. The first conveyance path 6 is a path along which the object 5 is conveyed. The second conveyance path 7 is a path along which the cleaning unit 2 is conveyed. In FIG. 1, in order to display the object 5 and the cleaning unit 2 under the head 1 in an easy-to-understand manner, the head 1 is indicated by a broken line such that the head 1 is seen through.

The liquid application apparatus 100 applies a liquid 10*a* by discharging from the head 1 to the object 5 conveyed below the head 1 along the first conveyance path 6 by the conveyor 3. In the present embodiment, the liquid application apparatus 100 maintains the applying condition of liquid by the head 1 so that a substantially desired amount of liquid can be applied to a substantially desired position on the object 5, by the cleaning unit 2 conveyed along the second conveyance path 7 by the conveyor 3. The cleaning unit 2 can maintain the applying condition of liquid by the head 1 by reducing the thickening of the liquid to be discharged from the head 1 or removing a thickened liquid, foreign substances, and the like attached to a nozzle for discharging the liquid in the head 1.

As illustrated in FIG. 2, the head 1 includes a head 1-1, a head 1-2, and a head 1-3. The head 1-1, the head 1-2, and the head 1-3 are aligned along the conveyance direction 10. The conveyance direction 10 represents a conveyance direction of the object 5 and the cleaning unit 2 by the conveyor 3. The conveyance direction of the object 5 conveyed by the conveyor 3 and the conveyance direction of the cleaning unit 2 conveyed by the conveyor 3 are the same.

Each of the head 1-1, the head 1-2, and the head 1-3 includes a nozzle surface 11, and discharges the liquid 10*a* from a plurality of nozzles formed on the nozzle surface 11. The liquid 10*a* discharged from the head 1-1, the head 1-2, and the head 1-3 may be a liquid of different types. Alternatively, the liquid 10*a* discharged from at least some of the head 1-1, the head 1-2, and the head 1-3 may be a liquid of the same type. The types of the liquid include the composition of the liquid, the color of the liquid, and the like.

In the state illustrated in FIG. 2, the head 1-1 applies the discharged liquid 10*a* to an object 5-1. The head 1-2 applies the discharged liquid 10*a* to the object 5-2. The head 1-3 applies the discharged liquid 10*a* to the object 5-3. However, the head 1-1 may apply the liquid 10*a* to the object 5-2 and the object 5-3. The head 1-2 may apply the liquid 10*a* to the object 5-1 and the object 5-3. The head 1-3 may apply the liquid 10*a* to the object 5-1 and the object 5-2.

In the present embodiment, the head 1 may apply the liquid discharged by a line head method to the object 5. The line head method refers to a method of discharging a liquid from a head having a length equivalent to the width of the object 5 in a direction substantially orthogonal to the conveyance direction 10. By using the line head method, the liquid can be applied to a large area in the object 5 at a time at an increased speed.

As illustrated in FIG. 3, the cleaning unit 2 includes a discharged liquid holder 21, a wiping member 22, and a wiped liquid holder 23.

The discharged liquid holder 21 is a container that holds a liquid 10*b* discharged by dummy discharge by the head 1. The upper portion of the discharged liquid holder 21 is open. When facing the head 1, the discharged liquid holder 21 can receive and hold the liquid 10*b* dummy-discharged from the head 1. A liquid 10*c* indicates a liquid held by the discharged liquid holder 21. The dummy discharge here refers to discharging the liquid 10*b* that is not applied to the object 5. The term dummy discharge may be replaced with terms such as pre-discharging, flushing, purging, dummy jetting, and the like. The cleaning unit 2 can perform dummy discharge such that the discharged liquid 10*b* is held by the discharged liquid holder 21. The cleaning unit 2 can remove a liquid thickened inside the head 1 by the dummy discharge, a thickened liquid attached to the vicinity of the nozzles for discharging the liquid, foreign substances, and the like.

The liquid 10*b* is a liquid of the same type as the liquid 10*a*. The liquid content of the liquid 10*b* is larger than the liquid content of the liquid 10*a*. The head 1 can discharge and remove the thickened liquid in the head 1, the thickened liquid adhering to the vicinity of the nozzles on the nozzle surface 11, foreign substances, and the like by dummy-discharging the liquid 10*b* larger in liquid content than the liquid 10*a*.

When the discharged liquid holder 21 is full of the dummy-discharged liquid 10*b*, the discharged liquid holder 21 is replaced with an empty discharged liquid holder or is temporarily detached from the cleaning unit 2, and then is reattached to the cleaning unit 2 after the held liquid 10*b* is discarded.

The wiping member 22 wipes the nozzle surface 11 when facing the nozzle surface 11 of the head 1. The wiping member 22 is a wiper blade or the like that is a plate member made of a soft material such as rubber. The wiping member 22 wipes the nozzle surface 11 to remove the thickened liquid, foreign substances, and the like attached to the nozzle surface 11, the nozzles formed on the nozzle surface 11, and the like. However, the wiping member 22 is not limited to a rubber plate member, and may include a soft cloth or the like.

The wiped liquid holder 23 is a container that holds the liquid wiped by the wiping member 22. When the wiped liquid holder 23 is full of the wiped liquid, the wiped liquid holding unit is replaced with an empty wiped liquid holder 23, or is temporarily detached from the cleaning unit 2 and is reattached to the cleaning unit 2 after the held liquid is discarded.

As illustrated in FIG. 1, in the present embodiment, the first conveyance path 6 overlaps with the second conveyance path 7 at least at a portion at which the first conveyance path 6 passes by the head 1, so that it is possible to continuously perform liquid application to the object 5 and wiping by the cleaning unit 2. In other words, it is possible to wipe the nozzle surface of the applicator while applying the liquid without stopping the conveyance of the object 5. In the first conveyance path 6 and the second conveyance path 7 illustrated in FIG. 1, the object 5 and the cleaning unit 2 are conveyed in the −Y direction from the upstream process. Then, the object 5 and the cleaning unit 2 are turned by 90 degrees such that the conveyance direction aligns with the +X direction at a curved portion 31. Thereafter, the object 5 and the cleaning unit 2 are conveyed in the +X direction, and then, the object 5 and the cleaning unit 2 are further turned by 90 degrees such that the conveyance direction aligns with the +Y direction at a curved portion 32. Thereafter, the object 5 and the cleaning unit 2 are conveyed in the +Y direction toward the downstream process.

In the example illustrated in FIG. 1, the conveyor 3 conveys a plurality of objects 5 including objects 5-1 to 5-9. The conveyor 3 conveys a plurality of cleaning units 2 including the cleaning units 2-1 to 2-3.

Between the adjacent objects 5 in the conveyance direction 10, there are a portion where one cleaning unit 2 is arranged and a portion where the cleaning unit 2 is not arranged. Specifically, the cleaning unit 2-1 is arranged between the object 5-1 and the object 5-2. The cleaning unit 2-2 is arranged between the object 5-4 and the object 5-5. The cleaning unit 2-3 is arranged between the object 5-7 and the object 5-8. Among the adjacent objects 5, the cleaning unit 2 is not arranged in places other than the above.

Three objects 5 are arranged between the adjacent cleaning units 2 in the conveyance direction 10. Specifically, the objects 5-2 to 5-4 are arranged between the cleaning unit 2-1 and the cleaning unit 2-2, and the objects 5-5 to 5-7 are arranged between the cleaning unit 2-2 and the cleaning unit 2-3.

The liquid application apparatus 100 discharges the liquid from the head 1 at different timings to apply the liquid to the plurality of objects 5 conveyed under the head 1. The liquid application apparatus 100 performs a maintaining operation on the head 1 at different timings by the plurality of cleaning units 2 conveyed under the head 1. The maintaining operation refers to an operation of maintaining the applying condition of liquid by the head 1. The arrangements of the object 5 and the cleaning unit 2 conveyed are not limited to those described above, and can be changed as appropriate according to the manufacturing process and the like.

In the present embodiment, since the wiping of the liquid by the cleaning unit 2 conveyed in the second conveyance path 7 that is the same path as the first conveyance path 6 is continuously performed in accordance with the liquid application to the object 5, it is not necessary to move the head 1 to a position separated from the first conveyance path 6 at execution of the maintaining operation. The position separated from the first conveyance path 6 is a position separated from the first conveyance path 6 in a direction orthogonal to the conveyance direction 10 so that a space for arranging the cleaning unit 2 can be secured under the head 1, for example.

In the present embodiment, since the head 1 is not moved to the position separated from the first conveyance path 6, it is possible to reduce the movement time of the head 1 and increase the productivity of the liquid application apparatus 100 in applying the liquid to the object 5. Accordingly, in the present embodiment, it is possible to provide the liquid application apparatus 100 with high productivity.

In the present embodiment, the number of objects 5 arranged between the adjacent cleaning units 2 in the conveyance direction 10 may be different according to at least one of the conveyance speed of the cleaning unit 2 and the type of the liquid. For example, in a period during which the object 5 is conveyed between the adjacent cleaning units 2 in the conveyance direction 10, the liquid exposed to the outside air through the nozzles may be thickened. The slower the conveyance speed of the conveyor 3 is, the more easily the liquid is thickened. The ease of thickening varies depending on the type of the liquid. For example, in the liquid application apparatus 100, the number of the objects 5 arranged between the adjacent cleaning units 2 is decreased as the conveyance speed of the cleaning units 2 is slower or as the liquid is more easily thickened. This shortens the time interval of the maintaining operation by the cleaning unit 2, so that the thickening of the liquid can be reduced, and the discharge condition of the head 1 can be easily maintained.

In the present embodiment, the length of the discharged liquid holder 21 in the conveyance direction 10 may be different according to at least one of the conveyance speed of the cleaning unit 2 and the length of the head 1 in the conveyance direction 10. For example, as the conveyance speed of the cleaning unit 2 increases, the length of the discharged liquid holder 21 increases in the conveyance direction 10. This allows the head 1 to perform dummy discharge without stopping the cleaning unit 2, so that the liquid application apparatus 100 can be improved in productivity. As the number of heads included in the head 1 and aligned in the conveyance direction 10 increases to make the head 1 longer, the length of the discharged liquid holder 21 increases in the conveyance direction 10. This allows all the plurality of heads included in the head 1 to perform dummy discharge in parallel, so that the liquid application apparatus 100 can be improved in productivity.

The liquid application apparatus 100 is not limited to the manufacturing apparatus of resin structures, and may be any of various manufacturing apparatuses capable of manufacturing an object by applying a liquid. Alternatively, the liquid application apparatus 100 may be an image forming apparatus that forms an image with liquid on a recording medium as an object. The type of the liquid can also be changed as appropriate according to the object or the like. The applicator is not limited to the head 1 that discharges a liquid, and may be a plate or the like that transfers a liquid carried to the object in the offset printing method.

FIG. 1 illustrates the first conveyance path 6 and the second conveyance path 7 having the curved portion 31 and the curved portion 32, but embodiment of the present disclosure are not limited thereto. The first conveyance path 6 and the second conveyance path 7 may be straight paths in which no curved portion is provided and the number of curved portion(s) can be changed as appropriate according to a manufacturing process or the like. The conveyor is not limited to a roller conveyor, a belt conveyor, or the like, and can be changed as appropriate according to the first conveyance path 6 and the second conveyance path 7. For example, in the case of straight paths, a linear motion stage that moves a table on which the object 5 and the cleaning unit 2 are placed by ball screws or the like may be used as the conveyor.

Configuration Example of Controller

Hardware Configuration

Figure 4:
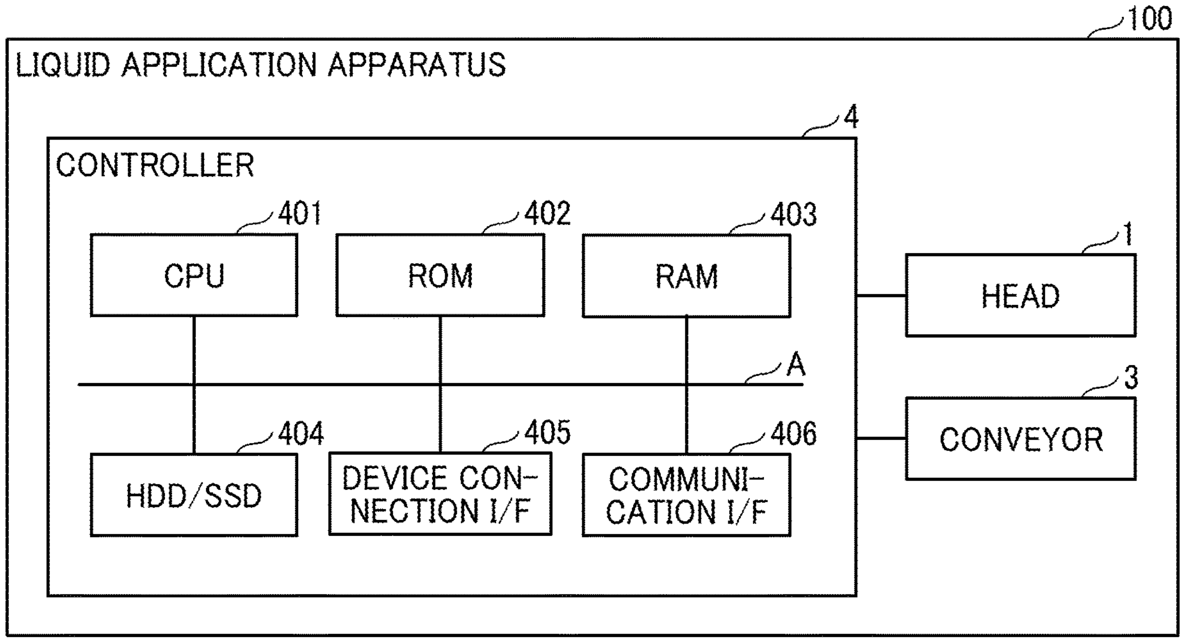
FIG. 4 is a diagram illustrating a hardware configuration of a controller of the liquid application apparatus illustrated in FIG. 1.

FIG. 4 is a block diagram illustrating an example of a hardware configuration of the controller 4. The controller 4 is constructed by a computer, and includes a central processing unit (CPU) 401, a read only memory (ROM) 402, and a random access memory (RAM) 403.

The controller 4 also includes a hard disk drive/solid state drive (HDD/SSD) 404, a device connection interface (I/F) 405, and a communication I/F 406. They are communicably connected to each other via a system bus A.

The CPU 401 executes control processing including various types of arithmetic processing. The ROM 402 stores a program used for driving the CPU 401, such as an initial program loader (IPL). The RAM 403 is used as a work area of the CPU 401. The HDD/SSD 404 stores various kinds of information such as programs, information regarding liquid discharge by the head 1, information regarding conveyance by the conveyor 3, and the like.

The device connection I/F 405 is an interface for connecting the controller 4 to various external devices. The external devices here are the head 1, the conveyor 3, and the like.

The communication I/F 406 is an interface for communicating with external devices via a communication network or the like. For example, the controller 4 is connected to the Internet via the communication I/F 406 and communicates with external devices via the Internet. The external device here is a personal computer (PC) or the like.

At least some of the functions implemented by the CPU 401 may be implemented by an electric circuit or an electronic circuit.

Functional Configuration Example

Figure 5:
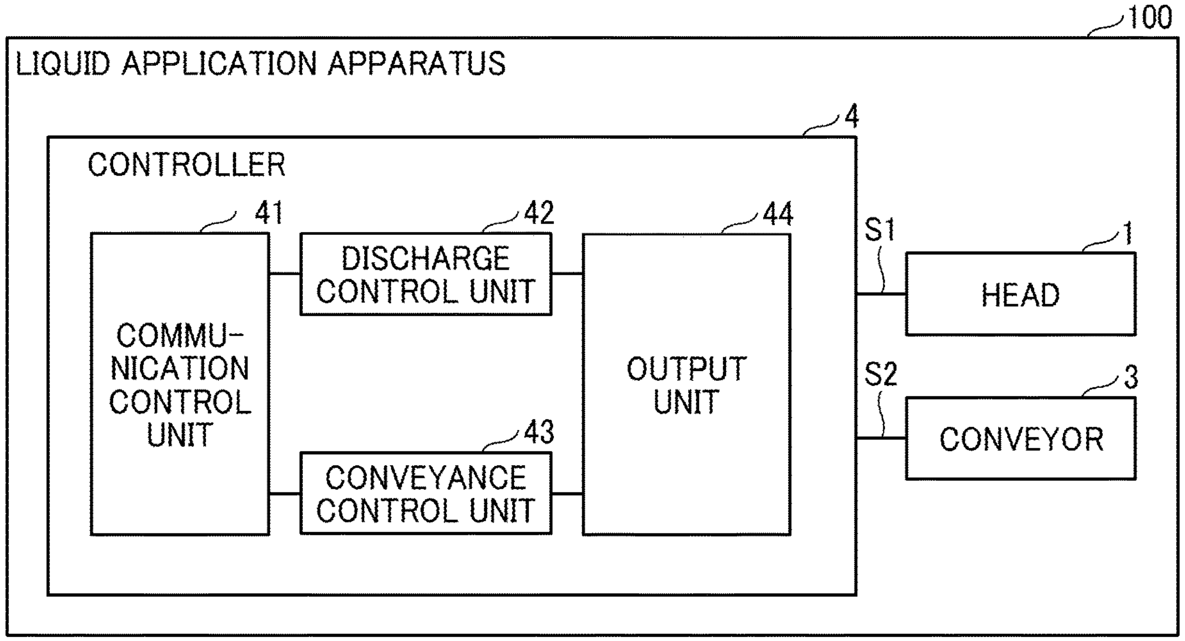
FIG. 5 is a block diagram illustrating a functional configuration of the controller of the liquid application apparatus illustrated in FIG. 1.

FIG. 5 is a block diagram illustrating an example of a functional configuration of the controller 4. The controller 4 includes a communication control unit 41, a discharge control unit 42, a conveyance control unit 43, and an output unit 44. The controller 4 may further include functional components other than those described above.

The functions of the communication control unit 41 are implemented by the communication I/F 406 or the like. The functions of the discharge control unit 42 and the conveyance control unit 43 are implemented by a processor such as the CPU 401 executing processing defined in a program stored in a nonvolatile memory such as the ROM 402. The function of the output unit 44 is implemented by the device connection I/F 405 or the like. Some of the above-described functions of the controller 4 may be implemented by an external device such as a PC or a server, or may be implemented by distributed processing between the controller 4 and the external device.

The communication control unit 41 controls communication with an external device via a communication network or the like. For example, the communication control unit 41 receives data representing a pattern for applying a liquid onto the object 5 in FIG. 1 from an external device.

The discharge control unit 42 controls the operations of the head 1 by outputting a discharge control signal S1 to the head 1 via the output unit 44. The discharge control unit 42 can control the discharge timing, the discharge speed, the discharge frequency, the discharge amount, and the like of the liquid for applying the liquid to the object 5 by the head 1. The discharge control unit 42 can also control the discharge timing, the discharge speed, the discharge frequency, the discharge amount, and the like of the liquid for dummy discharge by the head 1. The discharge control signal S1 may include a drive voltage waveform for driving the head 1, and the discharge control unit 42 may control the discharge speed, the discharge amount, and the like by the drive voltage waveform.

The conveyance control unit 43 controls the operations of the conveyor 3 by outputting a conveyance control signal S2 to the conveyor 3 via the output unit 44. The conveyance control unit 43 can control the conveyance start timing, the conveyance speed, the conveyance stop timing, and the like of the object 5 and the cleaning unit 2 (see FIG. 1) conveyed by the conveyor 3.

Operation Example of Liquid Application Apparatus

Overall Operation Example

Figure 6:
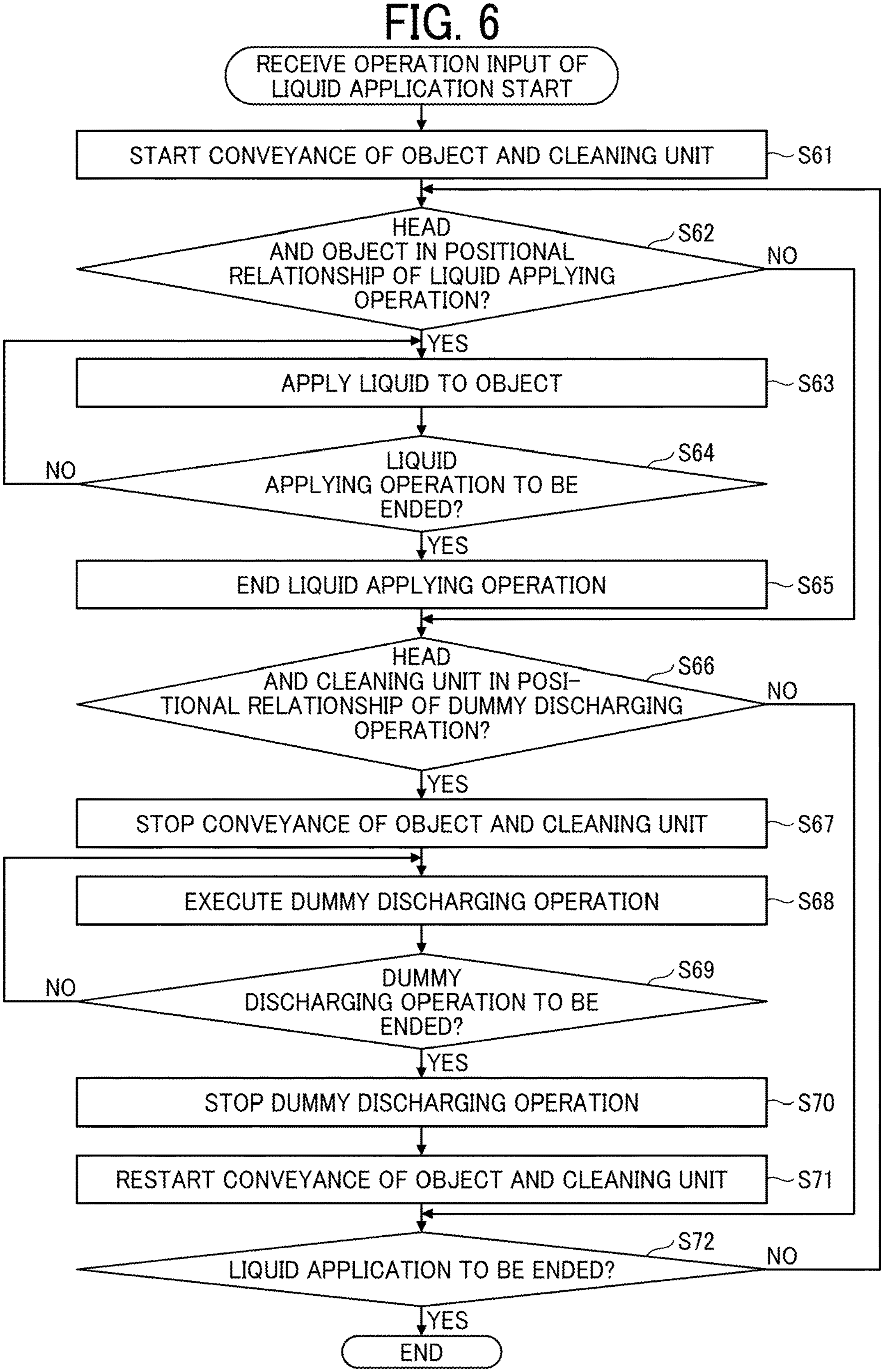
FIG. 6 is a flowchart illustrating an operation example of the liquid application apparatus according to the first embodiment.

FIG. 6 is a flowchart of an example of the operations of the liquid application apparatus 100. The following description is provided with reference to FIGS. 1, 5, and others in addition to FIG. 6. The liquid application apparatus 100 starts the operations in FIG. 6 upon receiving an operation input signal for starting liquid application via the operation unit, for example.

First, in step S61, the liquid application apparatus 100 starts conveyance of the object and the cleaning unit 2 by the conveyor 3 under the control of the conveyance control unit 43. Since the start of conveyance, the liquid application apparatus 100 continues conveyance until conveyance stop control is performed.

Subsequently, in step S62, the liquid application apparatus 100 causes the controller 4 to determine whether the head 1 and the object 5 are in a positional relationship of the liquid applying operation. The positional relationship of the liquid applying operation refers to a positional relationship in which the liquid can be applied from the head 1 to the object 5 by the object 5 being conveyed immediately below the head 1. For example, the controller 4 conveys the object 5 by a predetermined conveyance distance, and determines that the head 1 and the object 5 are in the positional relationship of the liquid applying operation when the object 5 is positioned below the head 1. Alternatively, the controller 4 may determine that the head 1 and the object 5 are in the positional relationship of the liquid applying operation when the proximity of the object 5 is detected by a proximity sensor provided in the head 1.

If it is determined in step S62 that the head 1 and the object 5 are not in the positional relationship of the liquid applying operation (NO in step S62), the liquid application apparatus 100 proceeds to step S66. On the other hand, if it is determined that the head 1 and the object are in the positional relationship of the liquid applying operation (YES in step S62), in step S63, the liquid application apparatus 100 discharges the liquid from the head 1 under the control of the discharge control unit 42 to apply the liquid to the object 5 positioned below the head 1.

Subsequently, in step S64, the liquid application apparatus 100 causes the controller 4 to determine whether to stop the liquid applying operation. For example, the controller 4 determines that the liquid applying operation is to be stopped when the liquid has been applied to a predetermined number of objects 5 in a predetermined pattern.

If it is determined in step S64 that the liquid applying operation is not to be stopped (NO in step S64), the liquid application apparatus 100 performs step S63 again. On the other hand, when it is determined to stop the liquid applying operation (YES in step S64), in step S65, the liquid application apparatus 100 stops the liquid discharge from the head 1 under the control of the discharge control unit 42 to stop the liquid application to the object 5.

Subsequently, in step S66, the liquid application apparatus 100 causes the controller 4 to determine whether the head 1 and the cleaning unit 2 are in a positional relationship of the dummy discharging operation. The positional relationship of the dummy discharging operation refers to a positional relationship in which the dummy discharge from the head 1 to the discharged liquid holder 21 becomes possible by the cleaning unit 2 being conveyed to the vicinity immediately below the head 1. For example, the controller 4 conveys the cleaning unit 2 by a predetermined conveyance distance, and determines that the head 1 and the cleaning unit 2 are in the positional relationship of the dummy discharging operation when the discharged liquid holder 21 is positioned below the head 1. Alternatively, the controller 4 may determine that the head 1 and the cleaning unit 2 are in the positional relationship of the dummy discharging operation when the proximity of the cleaning unit 2 is detected by the proximity sensor provided in the head 1.

In step S66, if the controller 4 determines that the head 1 and the cleaning unit 2 are not in the positional relationship of the dummy discharging operation (NO in step S66), the liquid application apparatus 100 proceeds to step S72. On the other hand, if the controller 4 determines that the head 1 and the cleaning unit 2 are in the positional relationship of the dummy discharging operation (YES in step S66), in step S67, the liquid application apparatus 100 stops the conveyance of the object 5 and the cleaning unit 2 by the conveyor 3 under the control of the conveyance control unit 43.

Subsequently, in step S68, the liquid application apparatus 100 executes dummy discharge by the head 1 under the control of the discharge control unit 42. The dummy-discharged liquid is held by the discharged liquid holder 21 below the head 1.

Subsequently, in step S69, the liquid application apparatus 100 causes the controller 4 to determine whether to stop the dummy discharging operation. For example, the controller 4 determines that the dummy discharging operation is to be stopped when the dummy discharge has been performed a predetermined number of times.

If it is determined in step S69 that the dummy discharging operation is not to be stopped (NO in step S69), the liquid application apparatus 100 performs step S68 again. On the other hand, if it is determined that the dummy discharging operation is to be stopped (YES in step S69), in step S70, the liquid application apparatus 100 stops the dummy discharging operation by the head 1 under the control of the discharge control unit 42.

Subsequently, in step S71, the liquid application apparatus 100 restarts the conveyance of the object 5 and the cleaning unit 2 by the conveyor 3 under the control of the conveyance control unit 43. Since the restart of the conveyance, the liquid application apparatus 100 continues the conveyance until the conveyance stop control is performed. Immediately after the conveyance of the cleaning unit 2 by the conveyor 3 is restarted, the nozzle surface 11 in the head 1 after dummy discharge is wiped by the conveyed wiping member 22, whereby liquid, foreign matter, and the like adhering to the nozzle surface 11 can be removed. Details of this operation will be described later with reference to FIGS. 15 and 16.

Subsequently, in step S72, the liquid application apparatus 100 causes the controller 4 to determine whether to end the liquid application to the object 5. For example, the controller 4 determines that the liquid applying operation is to be ended when the liquid has been applied to the predetermined total number of objects 5 in a predetermined pattern. Alternatively, the controller 4 may determine that the liquid applying operation is to be ended when receiving an operation input signal indicating the end of the liquid application via the operation unit.

If the controller 4 determines in step S72 that the process is not to be ended (NO in step S72), the liquid application apparatus 100 performs step S62 and the subsequent steps again. On the other hand, if the controller 4 determines that the process is to be ended (YES in step S72), the liquid application apparatus 100 ends the operation.

As described above, the liquid application apparatus 100 can apply the liquid to the object 5.

Liquid Application Operation Example

FIGS. 7 to 11 are diagrams schematically illustrating an example of the liquid applying operation by the liquid application apparatus 100.

Figure 7:
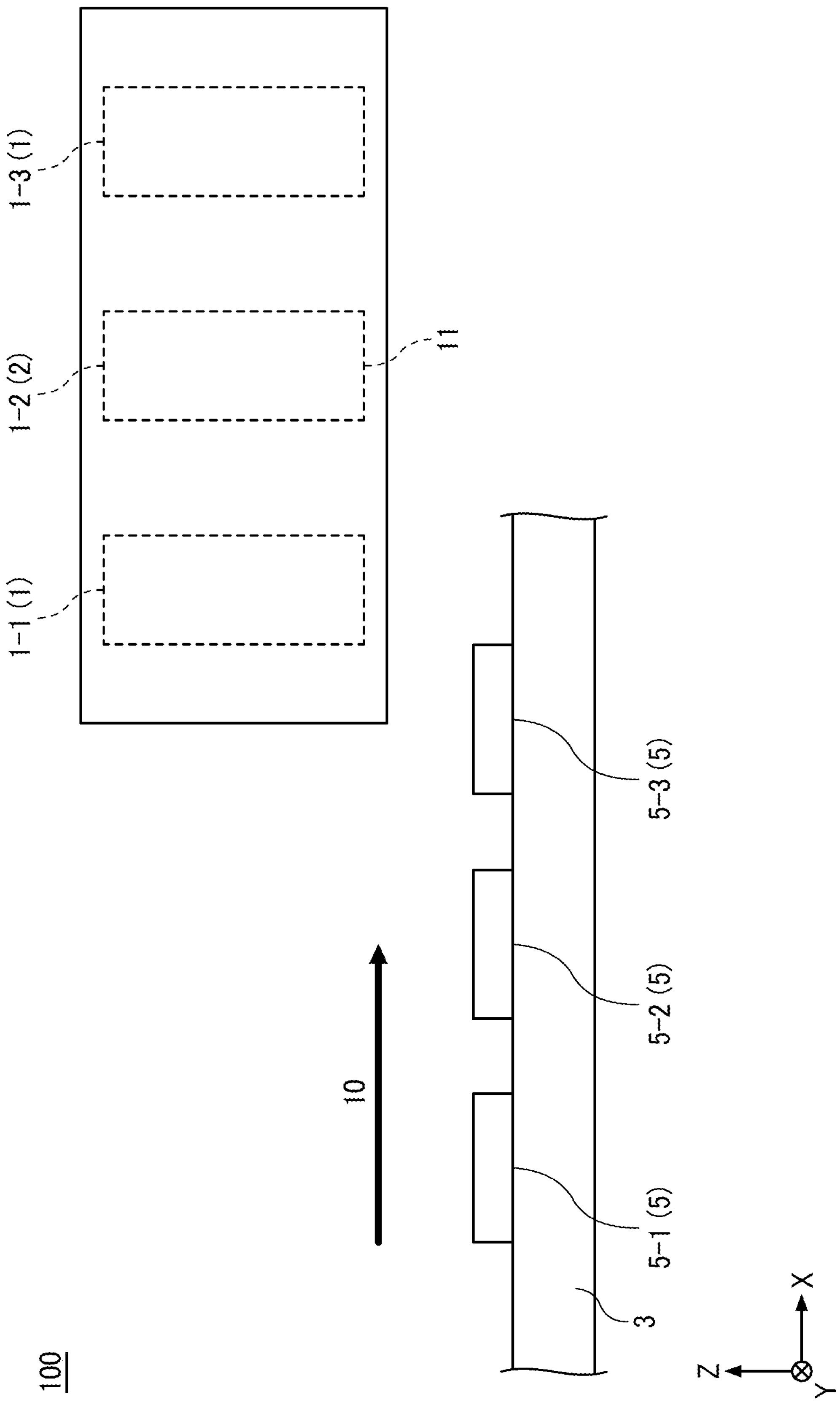
FIG. 7 is a first diagram illustrating an example of a liquid applying operation by the liquid application apparatus illustrated in FIG. 1.
Figure 8:
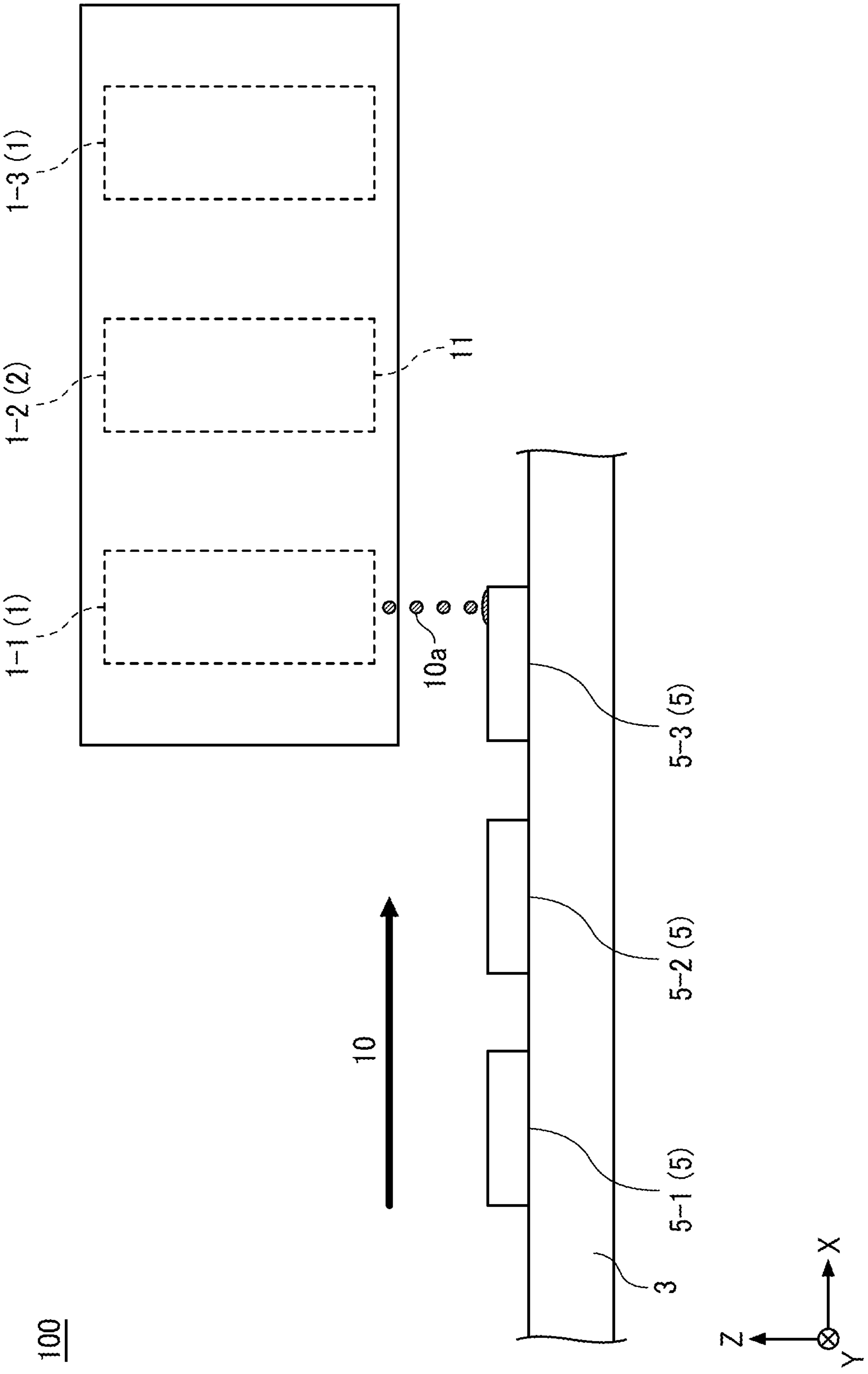
FIG. 8 is a second diagram illustrating the example of the liquid applying operation by the liquid application apparatus illustrated in FIG. 1.

FIG. 7 illustrates a positional relationship between the head 1 and the object 5 before the positional relationship of the liquid applying operation. When the object 5 has been conveyed in the conveyance direction 10 by the conveyor 3 from the state of FIG. 7 and the downstream end of the object 5-3 has reached below the head 1-1 as illustrated in FIG. 8, the head 1 and the object 5 are brought into the positional relationship of the liquid applying operation. The head 1-1 is a head located most upstream in the conveyance direction 10 among the head 1-1, the head 1-2, and the head 1-3. The object 5-3 is an object located most downstream in the conveyance direction 10 among the object 5-1, the object 5-2, and the object 5-3. The downstream end of the object 5 means a portion of the object 5 located most downstream in the conveyance direction 10 in the area on the object 5 to which the liquid 10*a* is applied.

When the head 1 and the object 5 bring into the positional relationship of the liquid applying operation, the liquid application apparatus 100 starts applying the liquid 10*a* onto the object 5-3 by discharging the liquid 10*a* from the head 1-1. Thereafter, the liquid application apparatus 100 applies the liquid 10*a* to the object 5-3 while conveying the object 5 by the conveyor 3.

Herein, the liquid application apparatus 100 applies the liquid 10*a* to the object 5 being conveyed without stopping the conveyance of the object 5. However, the liquid application apparatus 100 may apply the liquid 10*a* to the object 5 with a temporary stop of the conveyance of the object 5 while repeatedly performing the conveyance of the object 5 and temporarily stopping the conveyance. These points are the same in various liquid applying operations described below in the liquid application apparatus according to the embodiment.

Figure 9:
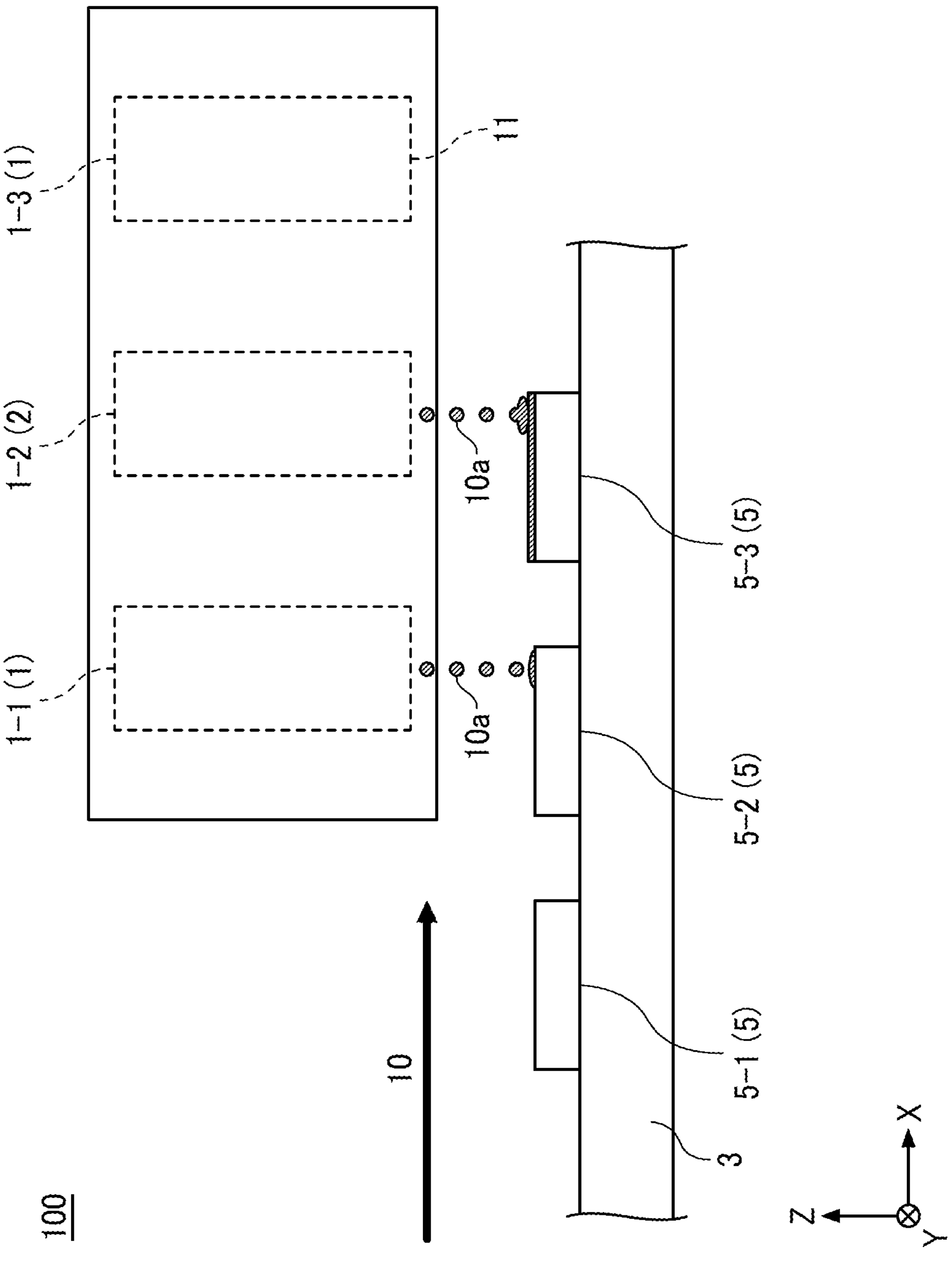
FIG. 9 is a third diagram illustrating the example of the liquid applying operation by the liquid application apparatus illustrated in FIG. 1.

FIG. 9 illustrates a state in which the object 5 has been further conveyed from the state of FIG. 8, the object 5-3 is positioned below the head 1-2, and the object 5-2 is positioned below the head 1-1. The liquid application apparatus 100 applies the liquid 10*a* onto the object 5-3 by discharging the liquid 10*a* from the head 1-2. The liquid application apparatus 100 also applies the liquid 10*a* onto the object 5-2 by discharging the liquid 10*a* from the head 1-1.

Figure 10:
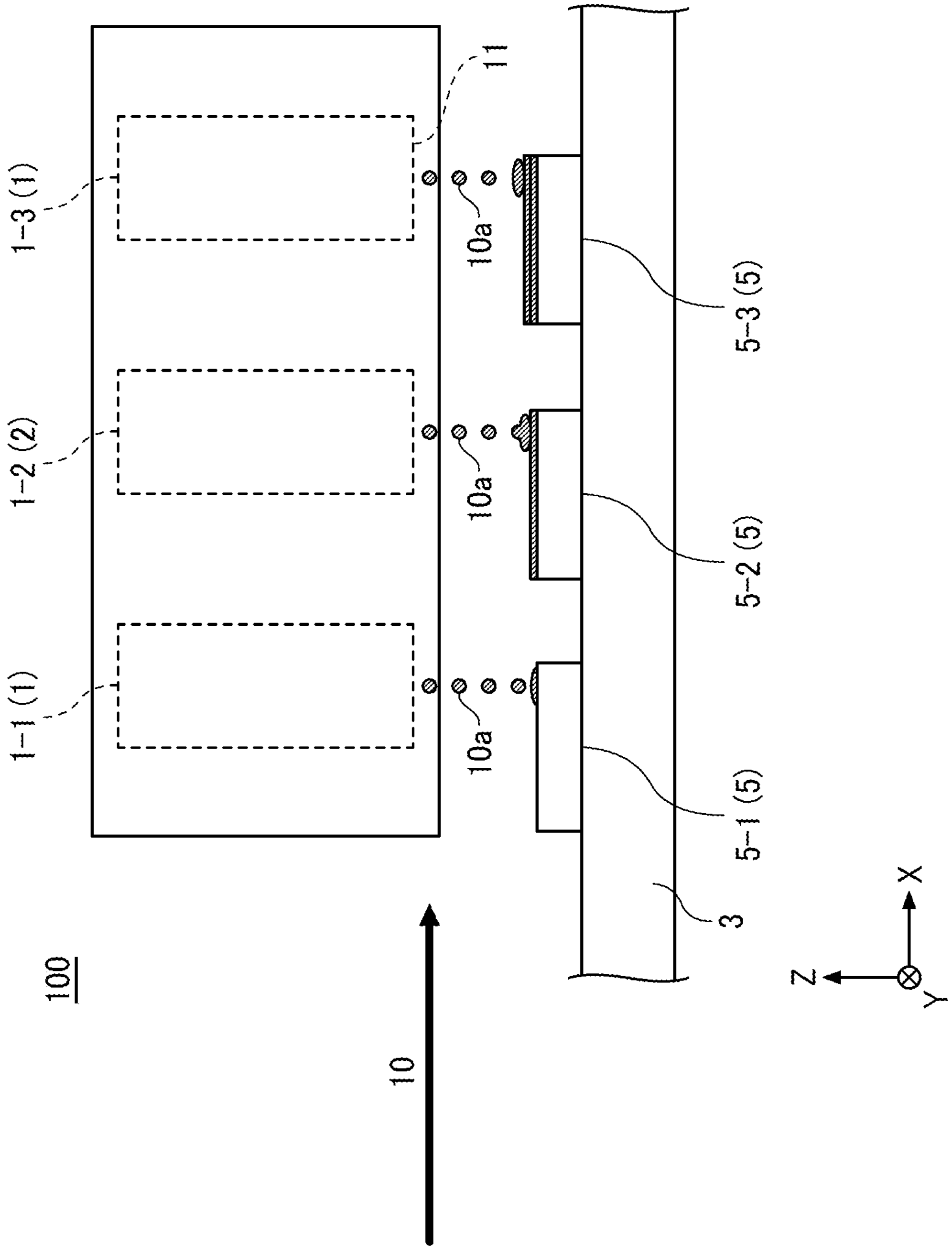
FIG. 10 is a fourth diagram illustrating the example of the liquid applying operation by the liquid application apparatus illustrated in FIG. 1.

FIG. 10 illustrates a state in which the object 5 has been further conveyed from the state of FIG. 9, the object 5-3 is positioned below the head 1-3, the object 5-2 is positioned below the head 1-2, and the object 5-1 is positioned below the head 1-1. The liquid application apparatus 100 applies the liquid 10*a* onto the object 5-3 by discharging the liquid 10*a* from the head 1-3. In addition, the liquid application apparatus 100 applies the liquid 10*a* onto the object 5-2 by discharging the liquid 10*a* from the head 1-2, and applies the liquid 10*a* onto the object 5-1 by discharging the liquid 10*a* from the head 1-1.

Figure 11:
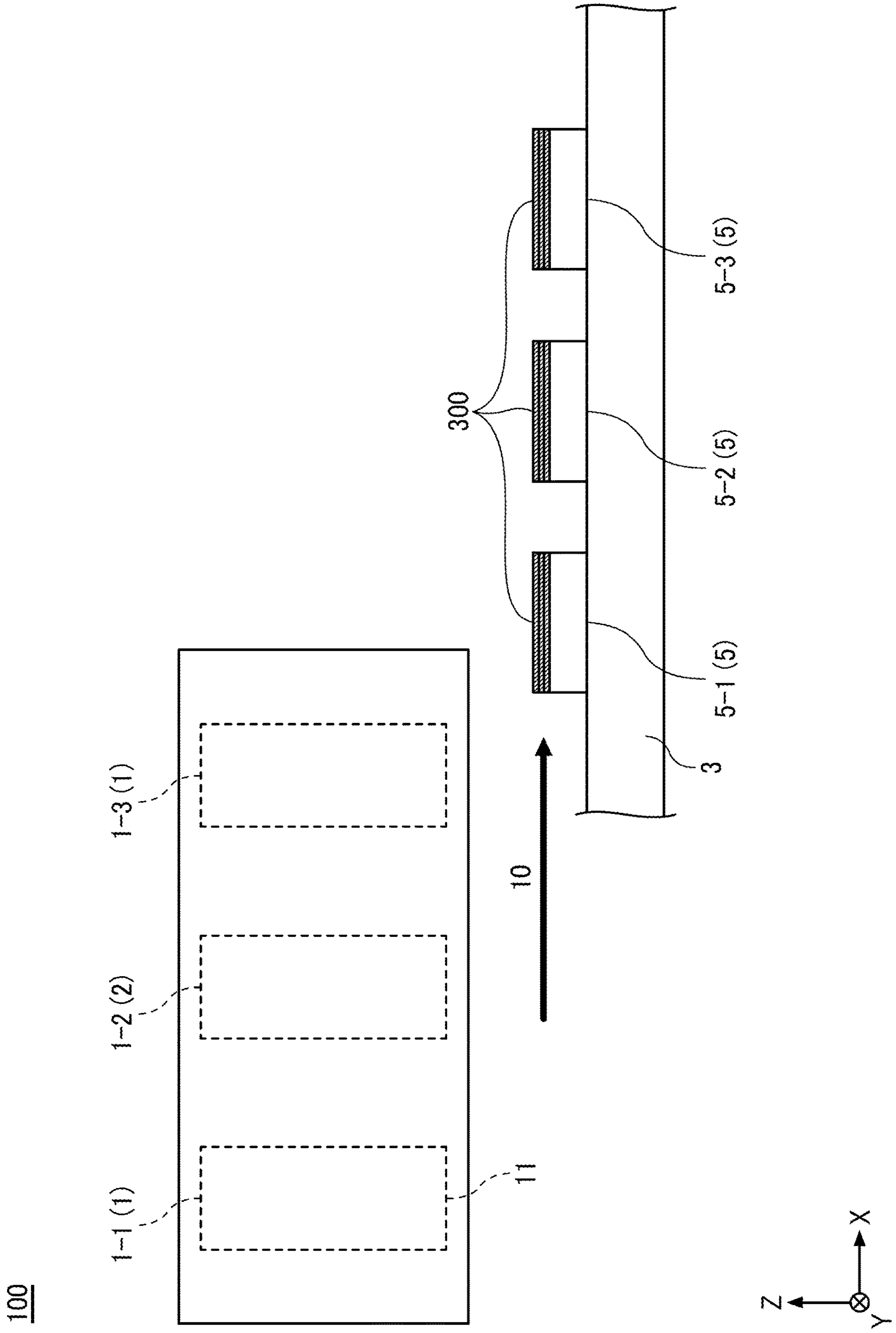
FIG. 11 is a fifth diagram illustrating the example of the liquid applying operation by the liquid application apparatus illustrated in FIG. 1.

FIG. 11 illustrates a state after the object 5 has been further conveyed from the state of FIG. 10 and the upstream end of the object 5-1 has passed below the head 1-3. The object 5-1 is an object located most upstream in the conveyance direction 10 among the object 5-1, the object 5-2, and the object 5-3. The upstream end of the object 5 means a portion of the object 5 located most upstream in the conveyance direction 10 in the area on the object 5 to which the liquid 10*a* is applied.

In the state illustrated in FIG. 11, liquid application to the object 5-1, the object 5-2, and the object 5-3 by the head 1-1, the head 1-2, and the head 1-3 is completed. A predetermined pattern 300 is completely formed on each of the object 5-1, the object 5-2, and the object 5-3.

Maintaining Operation Example

FIGS. 12 to 16 are diagrams schematically illustrating an example of the maintaining operation by the liquid application apparatus 100.

Figure 12:
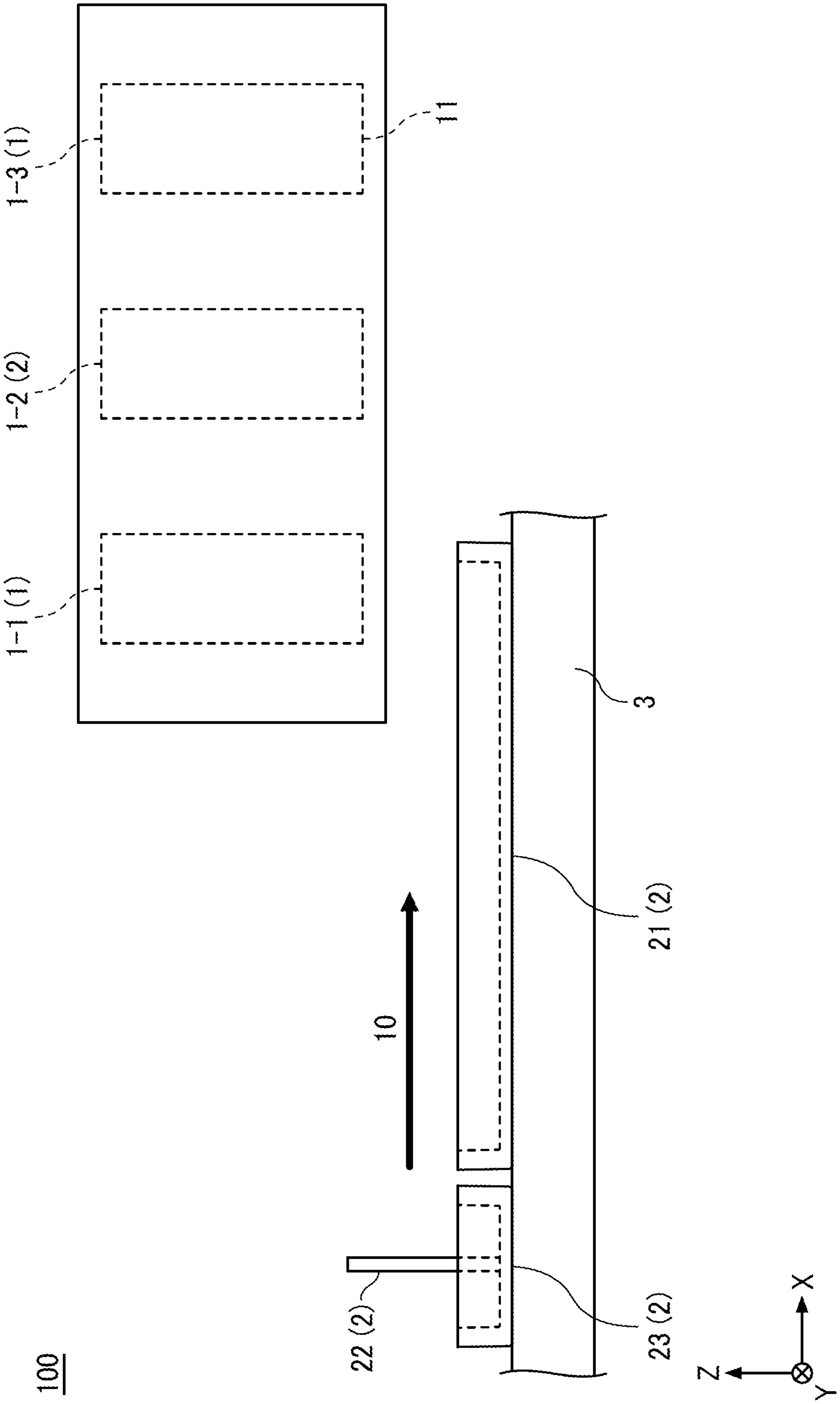
FIG. 12 is a first diagram illustrating an example of a maintaining operation by the liquid application apparatus illustrated in FIG. 1.

FIG. 12 illustrates a positional relationship between the head 1 and the cleaning unit 2 before the head 1 and the cleaning unit 2 are brought into the positional relationship of the dummy discharging operation. The liquid application apparatus 100 conveys the cleaning unit 2 in the conveyance direction 10 by the conveyor 3 from the state of FIG. 12.

Figure 13:
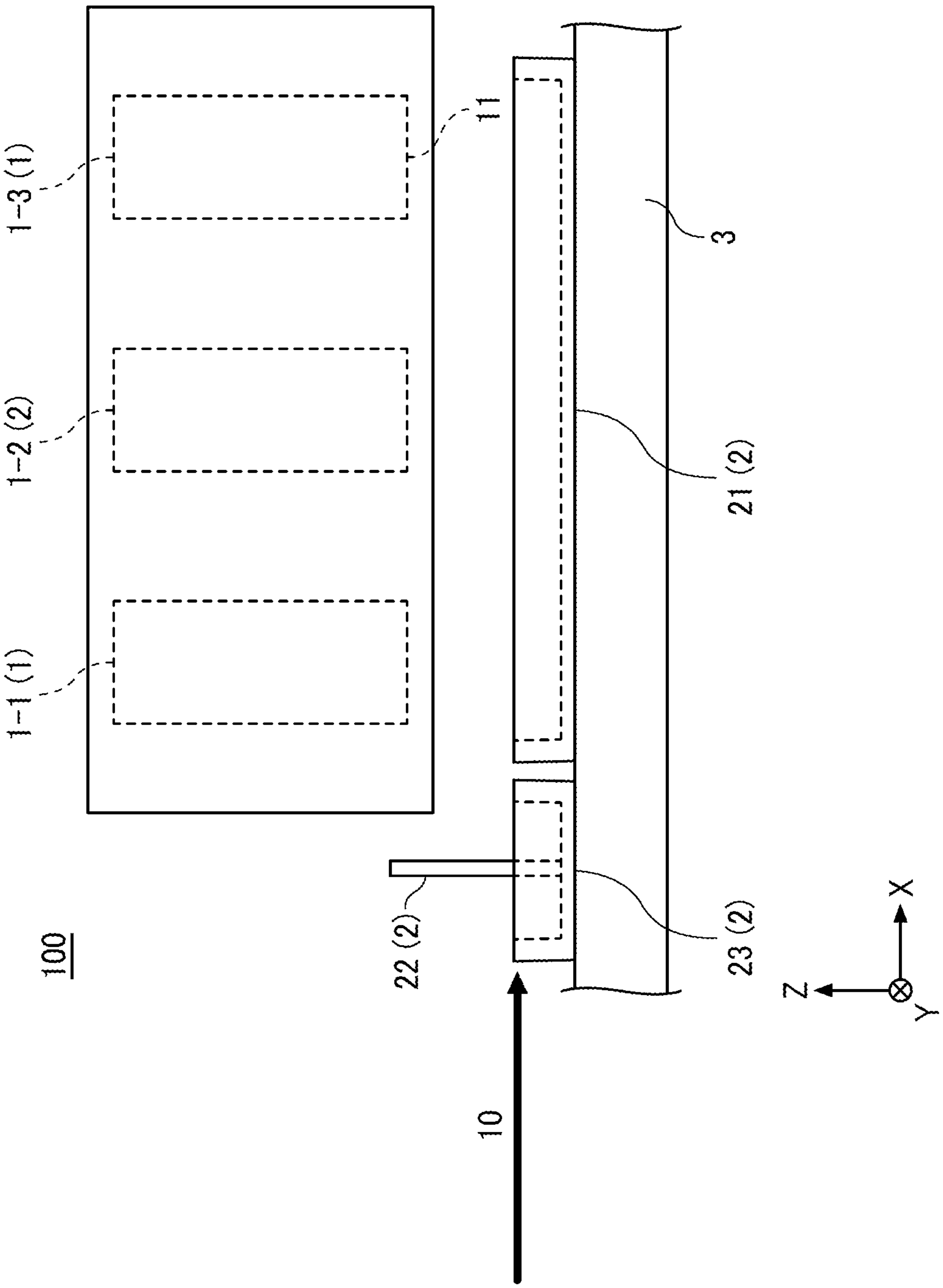
FIG. 13 is a second diagram illustrating the example of the maintaining operation by the liquid application apparatus illustrated in FIG. 1.

Thereafter, as illustrated in FIG. 13, when the positional relationship of the dummy discharging operation is established, the liquid application apparatus 100 temporarily stops the conveyance of the object 5 and the cleaning unit 2 by the conveyor 3 under the control of the conveyance control unit 43.

Figure 14:
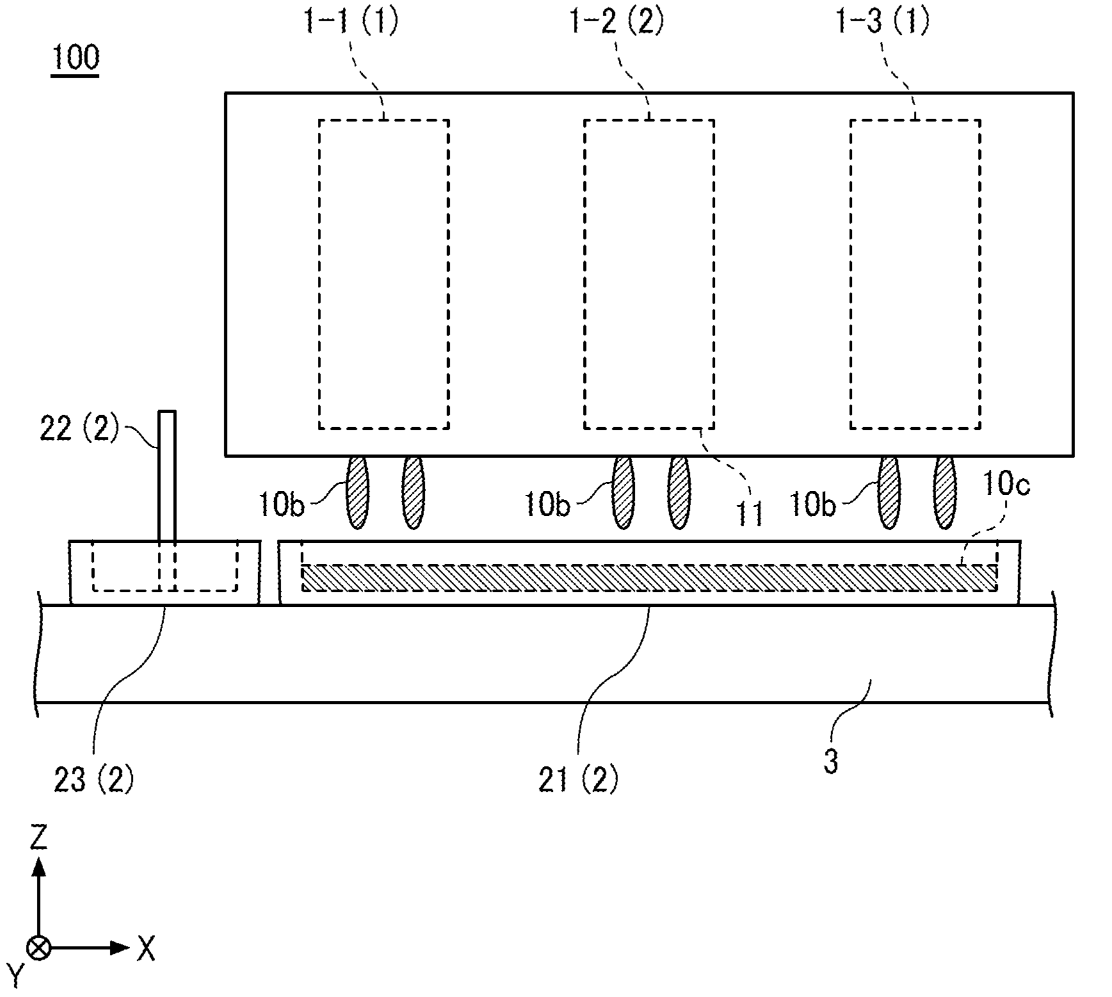
FIG. 14 is a third diagram illustrating the example of the maintaining operation by the liquid application apparatus illustrated in FIG. 1.

As illustrated in FIG. 14, the liquid application apparatus 100 executes dummy discharge by the head 1 under the control of the discharge control unit 42 while the cleaning unit 2 is temporarily stopped. The dummy-discharged liquid 10*b* is held by the discharged liquid holder 21. The liquid 10*c* represents a liquid held by the discharged liquid holder 21. In the present specification, the liquid application apparatus 100 temporarily stops the conveyance of the cleaning unit 2 and performs dummy discharge. However, embodiments of the present disclosure are not limited thereto, and the liquid application apparatus 100 may perform dummy discharge to the cleaning unit 2 being conveyed without stopping the conveyance of the cleaning unit 2. After the end of the dummy discharge, the liquid application apparatus 100 restarts the conveyance of the cleaning unit 2 by the conveyor 3.

Figure 15:
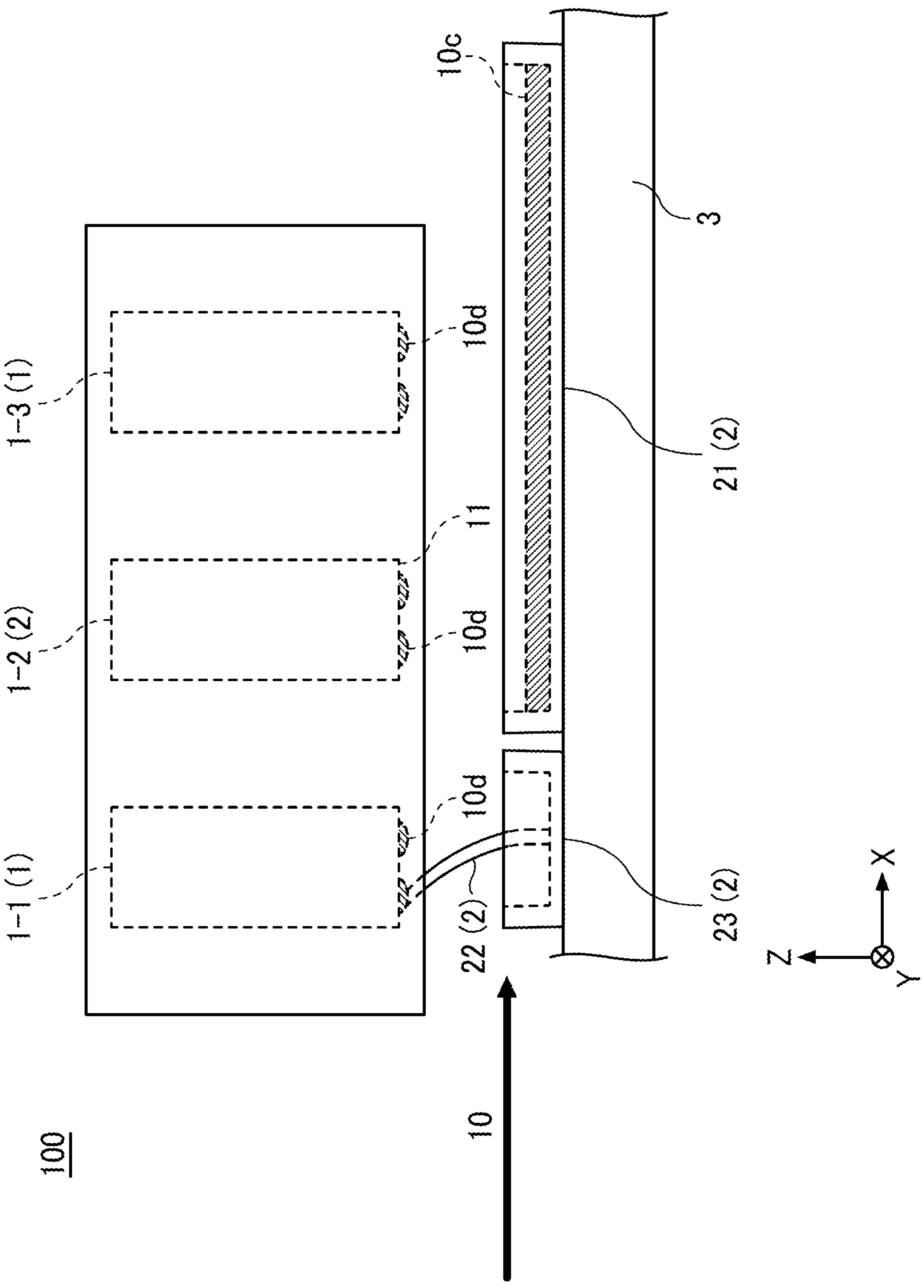
FIG. 15 is a fourth diagram illustrating the example of the maintaining operation by the liquid application apparatus illustrated in FIG. 1.

FIG. 15 illustrates a state in which the cleaning unit 2 has been further conveyed from the state of FIG. 14 and the head 1-1 has reached the wiping member 22. The upper end of the wiping member 22 is in contact with the nozzle surface 11 of the head 1-1. The wiping member 22 is softer than the head 1. Therefore, when the cleaning unit 2 is conveyed in the conveyance direction 10 in a state where the upper end of the wiping member 22 is in contact with the nozzle surface 11, the wiping member 22 is bent such that the upper end of the wiping member 22 is located upstream in the conveyance direction 10 with respect to the lower end of the wiping member 22.

When the cleaning unit 2 is conveyed in the conveyance direction 10 in a state where the upper end of the wiping member 22 is in contact with the nozzle surface 11, the nozzle surface 11 of the head 1-1 can be wiped, and a liquid 10*d* left on the nozzle surface 11 after dummy discharge can be removed. The wiping member 22 can remove the liquid 10*d* by conveying the cleaning unit 2 to wipe the nozzle surfaces 11 of the head 1-1, the head 1-2, and the head 1-3. The liquid 10*d* removed by the wiping member 22 drops onto the wiped liquid holder 23 along the wiping member 22 and is held by the wiped liquid holder 23. A liquid 10*e* represents a liquid held by the wiped liquid holder 23.

Figure 16:
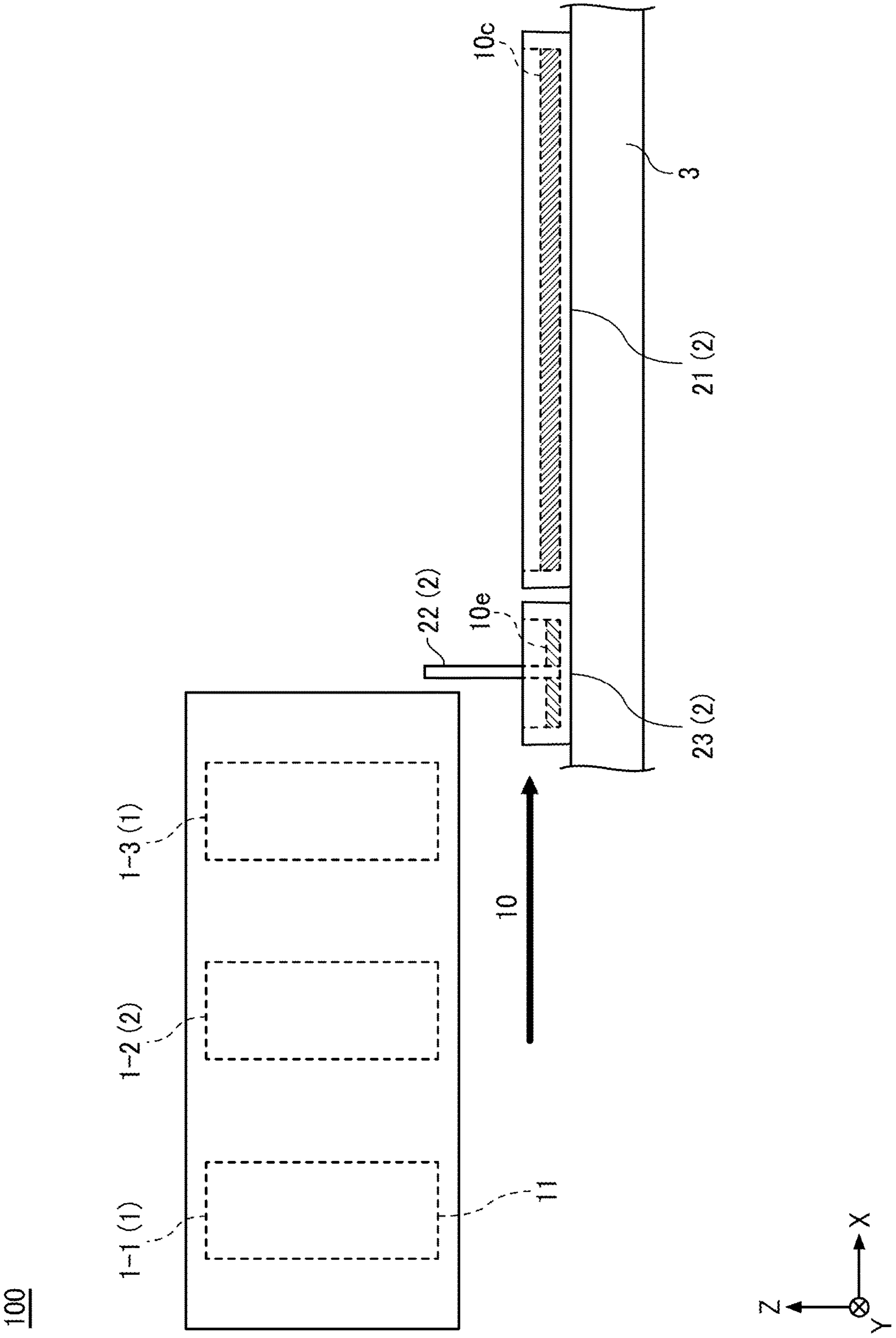
FIG. 16 is a fifth diagram illustrating the example of the maintaining operation by the liquid application apparatus illustrated in FIG. 1.

FIG. 16 illustrates a state after the cleaning unit 2 has been further conveyed from the state of FIG. 15 and the wiping member 22 has passed under the head 1-3. In the state illustrated in FIG. 15, the liquid application apparatus 100 completes the maintaining operation on the head 1-1, the head 1-2, and the head 1-3.

Second Embodiment

A liquid application apparatus according to a second embodiment will be described. Note that the same names and reference numerals as those in the first embodiment indicate the same or similar members, and detailed description thereof will be omitted as appropriate. The same applies to the subsequent embodiments described below.

The present embodiment is different from the first embodiment in further including a first mover that moves a head 1 in a direction intersecting a conveyance direction 10 of a cleaning unit when the cleaning unit performs an operation of maintaining the applying condition of liquid by the head 1.

Configuration Example of Liquid Application Apparatus

Figure 17:
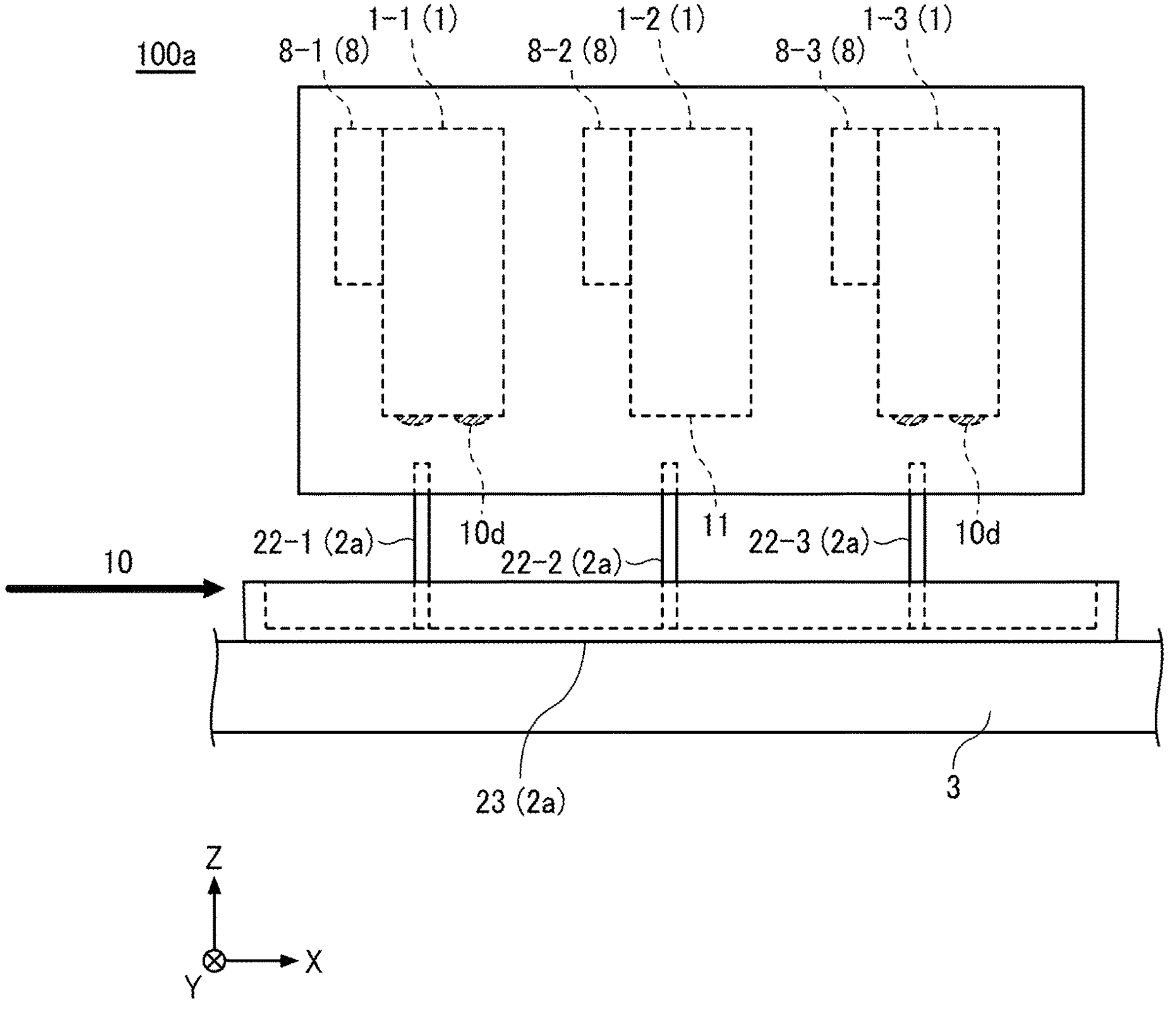
FIG. 17 is a side view of a head and the vicinity thereof in a liquid application apparatus according to a second embodiment of the present disclosure.

FIG. 17 is a side view of the head 1 and the vicinity thereof in a liquid application apparatus 100*a* according to the present embodiment. The liquid application apparatus 100*a* is different from the liquid application apparatus according to the first embodiment in including a cleaning unit 2*a* and a head movement mechanism 8.

The cleaning unit 2*a* is different from the cleaning unit 2 in the first embodiment in including a wiping member 22-1, a wiping member 22-2, and a wiping member 22-3. The wiping member 22-1 wipes a head 1-1, the wiping member 22-2 wipes a head 1-2, and the wiping member 22-3 wipes a head 1-3.

The head movement mechanism 8 is an example of the first mover that moves the head 1 in a direction intersecting the conveyance direction 10 of the cleaning unit 2*a* when the cleaning unit 2*a* performs a maintaining operation.

The direction intersecting the conveyance direction 10 of the cleaning unit 2*a* is along the liquid discharge direction of the head 1. In the example illustrated in FIG. 17, since the head 1 discharges a liquid in the downward direction (−Z direction), the direction intersecting the conveyance direction 10 of the cleaning unit 2*a* corresponds to the up-and-down direction (Z direction). In other words, the conveyance direction 10 of the cleaning unit 2*a* is a direction intersecting the vertical direction, and the direction intersecting the conveyance direction 10 of the cleaning unit 2*a* is the vertical direction. However, the direction intersecting the conveyance direction 10 of the cleaning unit 2*a* is not limited to the above, and can be changed as appropriate in accordance with the liquid discharge direction of the head 1.

The head movement mechanism 8 includes a head movement mechanism 8-1, a head movement mechanism 8-2, and a head movement mechanism 8-3. The head movement mechanism 8-1 moves the head 1-1. The head movement mechanism 8-2 moves the head 1-2. The head movement mechanism 8-3 moves the head 1-3. The head movement mechanism 8 includes a linear motion mechanism using a linear motion guide member or the like, a driving unit that drives the linear motion mechanism, and the like, for example. As the drive unit, a motor, a cylinder, or the like can be used.

In the present embodiment, since the liquid application apparatus 100*a* includes the head movement mechanism 8, the states of the wiping member 22-1, the wiping member 22-2, and the wiping member 22-3 with respect to the head 1 are switched between the contact state and the non-contact state. Thus, the liquid application apparatus 100*a* can bring the corresponding wiping members into contact with the head 1-1, the head 1-2, and the head 1-3 to perform the wiping operation on each head.

For example, if the head 1-1, the head 1-2, and the head 1-3 discharge different types of liquid, the wiping members in pairwise relationship with the heads are used to perform a wiping operation, so that it is possible to prevent a situation in which a liquid of a different type from the liquid discharged by a specific head adheres to the specific head via the wiping member. This makes it possible to prevent deterioration in the quality of liquid application to an object due to mixing of different types of liquids.

There may be a case where the liquid is not discharged from a specific head among the head 1-1, the head 1-2, and the head 1-3 depending on an object 5 or the pattern of the liquid to be applied. In such a case, the specific head that has not discharged the liquid is not wiped, thereby to reduce deterioration, damage, and the like of the nozzle surface due to unnecessary wiping.

Figure 18:
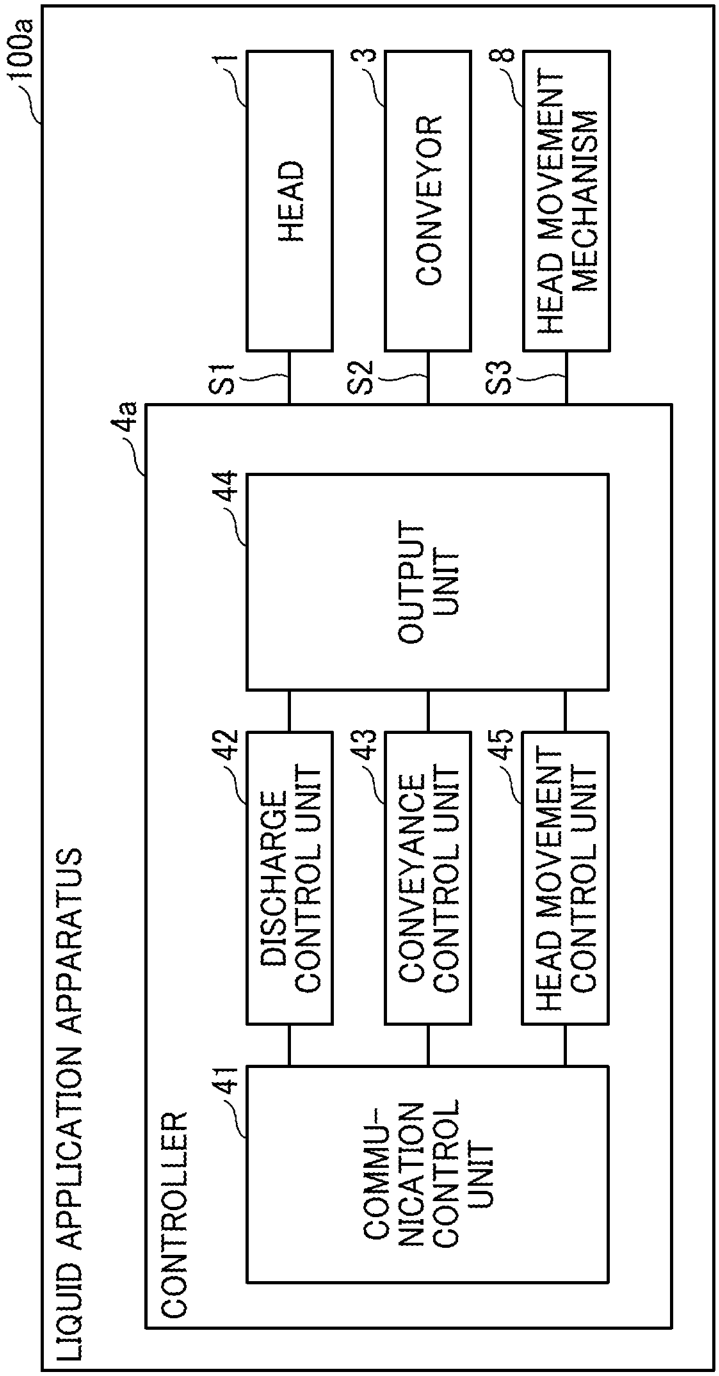
FIG. 18 is a diagram illustrating a functional configuration of a controller of the liquid application apparatus illustrated in FIG. 17.

FIG. 18 is a block diagram illustrating an example of a functional configuration of a controller 4*a* included in the liquid application apparatus 100*a*. The controller 4*a* includes a head movement control unit 45. The function of the head movement control unit 45 is implemented by a processor such as the CPU 401 illustrated in FIG. 4 executing a process defined in a program stored in a nonvolatile memory such as the ROM 402. The head movement control unit 45 may be implemented by an external device such as a PC or a server, or may be implemented by distributed processing between the controller 4*a* and the external device.

The head movement control unit 45 controls the operations of the head movement mechanism 8 by outputting a head movement control signal S3 to the driving unit of the head movement mechanism 8 via an output unit 44. For example, the head movement control unit can control the movement timing, movement speed, and the like of the head 1 by the head movement mechanism 8. The head movement control unit 45 can independently control the operations of the head 1-1, the head 1-2, and the head 1-3.

Operation Example of Liquid Application Apparatus

Overall Operation Example

Figure 19:
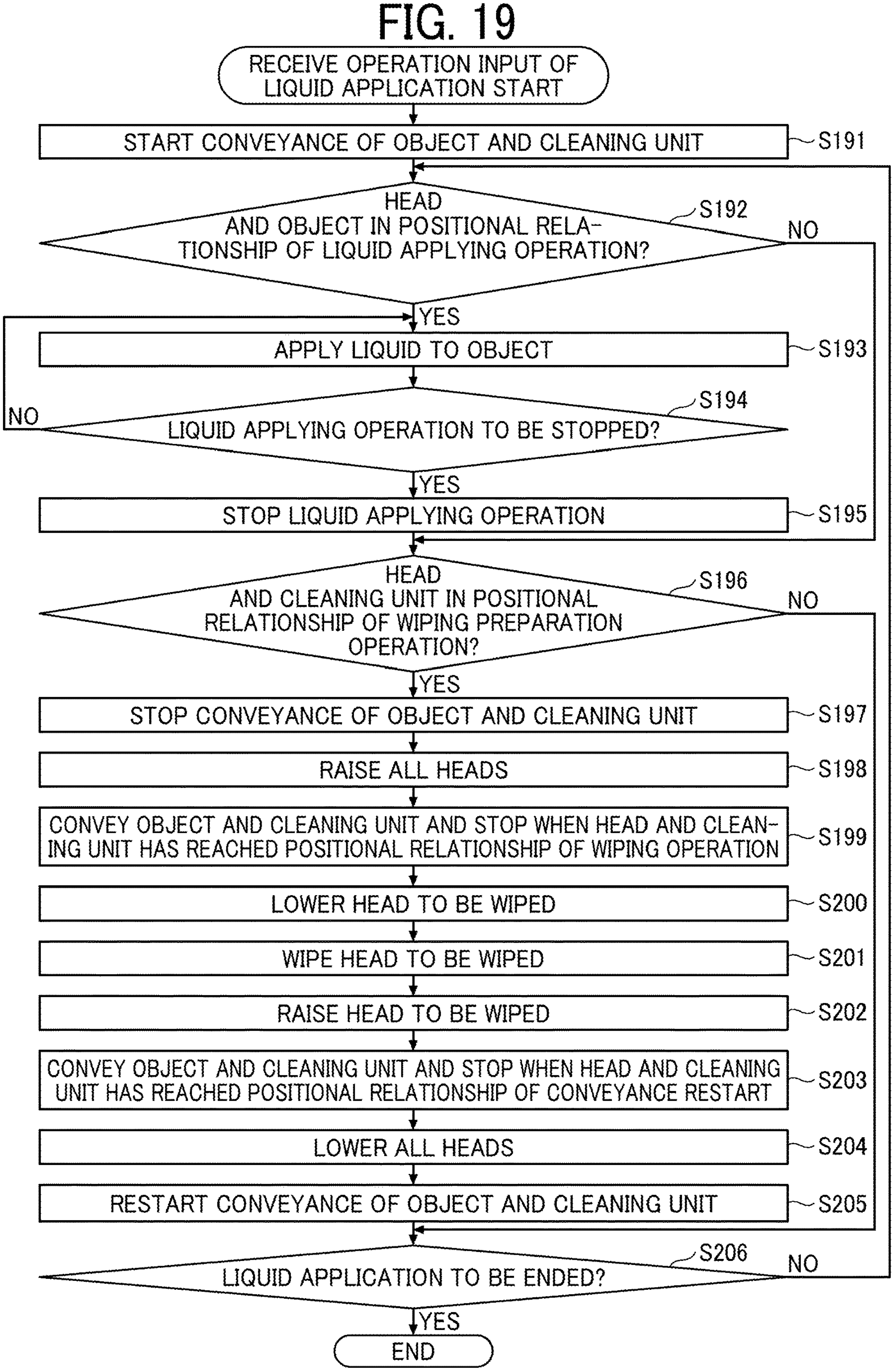
FIG. 19 is a flowchart illustrating an operation example of the liquid application apparatus illustrated in FIG. 17.

FIG. 19 is a flowchart illustrating an example of the operations of the liquid application apparatus 100*a*. The following description is provided with reference to FIGS. 17, 18, and others in addition to FIG. 19. The liquid application apparatus 100*a* starts the operations in FIG. 19 upon receiving an operation input signal for starting liquid application via the operation unit, for example. The operations in steps S191 to S195 are the same as the operations in steps S61 to S65 in FIG. 6, and thus redundant description thereof will be omitted here.

In step S196, the liquid application apparatus 100*a* causes the controller 4*a* to determine whether the head 1 and the cleaning unit 2*a* are in a positional relationship of a wiping preparation operation. The positional relationship of the wiping preparation operation refers to a positional relationship before the head 1 is lowered by the head movement mechanism 8 in order to bring the wiping member 22-1, the wiping member 22-2, and the wiping member 22-3 into contact with the head 1-1, the head 1-2, and the head 1-3 after the cleaning unit 2*a* is conveyed to the vicinity immediately below the head 1. For example, the controller 4*a* conveys the cleaning unit 2*a* by a predetermined conveyance distance, and determines that the head 1 and the cleaning unit 2*a* are in the positional relationship of the wiping preparation operation when the wiping member 22-1, the wiping member 22-2, and the wiping member 22-3 are positioned below the head 1. Alternatively, the controller 4*a* may determine that the head 1 and the cleaning unit 2*a* are in the positional relationship of the wiping preparation operation when the proximity of the cleaning unit 2*a* is detected by a proximity sensor provided in the head 1.

If the controller 4*a* determines in step S196 that the head 1 and the cleaning unit 2*a* are not in the positional relationship of the wiping preparation operation (NO in step S196), the liquid application apparatus 100*a* proceeds to step S208. On the other hand, if the controller 4*a* determines that the head 1 and the cleaning unit 2*a* are in the positional relationship of the wiping preparation operation (YES in step S196), in step S197, the liquid application apparatus 100*a* stops the conveyance of the object 5 and the cleaning unit 2*a* by the conveyor 3 under the control of the conveyance control unit 43.

Subsequently, in step S198, the liquid application apparatus 100*a* raises all of the head 1-1, the head 1-2, and the head 1-3 to a predetermined height and then stops them under the control of the head movement control unit 45. Accordingly, the wiping member 22-1, the wiping member 22-2, and the wiping member 22-3 can be conveyed in the conveyance direction 10 below the head 1-1, the head 1-2, and the head 1-3 without contacting the head 1-1, the head 1-2, and the head 1-3.

Subsequently, in step S199, the liquid application apparatus 100*a* conveys the object and the cleaning unit 2*a* by the conveyor 3 under the control of the conveyance control unit 43, and stops the conveyance when the head 1 and the cleaning unit 2*a* are in a positional relationship of a wiping operation. The positional relationship of the wiping operation refers to a positional relationship in which the wiping member 22-1, the wiping member 22-2, and the wiping member 22-3 are conveyed immediately below the head 1, so that the wiping member 22-1, the wiping member 22-2, and the wiping member 22-3 can wipe the head 1.

Subsequently, in step S200, the liquid application apparatus 100*a* causes the head movement mechanism 8 to lower the head to be wiped among the head 1-1, the head 1-2, and the head 1-3 to a predetermined height, and then stops the head, under the control of the head movement control unit 45. Accordingly, the wiping member comes into contact with only the head to be wiped among the head 1-1, the head 1-2, and the head 1-3.

Subsequently, in step S201, the liquid application apparatus 100*a* conveys the cleaning unit 2*a* in the conveyance direction 10 by the conveyor 3 to wipe the nozzle surface 11 of the head to be wiped with the wiping member, under the control of the conveyance control unit 43. When the cleaning unit 2*a* is conveyed by a predetermined distance and the wiping of the head 1 to be wiped is completed, the liquid application apparatus 100*a* stops the conveyance of the cleaning unit 2*a*, under the control of the conveyance control unit 43.

Subsequently, in step S202, the liquid application apparatus 100*a* raises the head to be wiped up to a predetermined height by the head movement mechanism 8, and then stops the head, under the control of the head movement control unit 45. Accordingly, the wiping member 22-1, the wiping member 22-2, and the wiping member 22-3 can be conveyed in the conveyance direction 10 below the head 1-1, the head 1-2, and the head 1-3 without contacting the head 1-1, the head 1-2, and the head 1-3.

Subsequently, in step S203, the liquid application apparatus 100*a* conveys the object and the cleaning unit 2*a* by the conveyor 3, and stops the conveyance when the head 1 and the cleaning unit 2*a* are in a positional relationship of conveyance restart, under the control of the conveyance control unit 43. The positional relationship of conveyance restart refers to a positional relationship in which among the wiping member 22-1, the wiping member 22-2, and the wiping member 22-3, the wiping member 22-1 located most upstream in the conveyance direction 10 is located downstream of the head 1 located most downstream in the conveyance direction 10 among the head 1-1, the head 1-2, and the head 1-3.

Subsequently, in step S204, the liquid application apparatus 100*a* causes the head movement mechanism 8 to lower all of the head 1-1, the head 1-2, and the head 1-3 to a predetermined height and then stops them, under the control of the head movement control unit 45.

Subsequently, in step S205, the liquid application apparatus 100*a* restarts the conveyance of the object 5 and the cleaning unit 2*a* by the conveyor 3 under the control of the conveyance control unit 43.

Subsequently, in step S206, the liquid application apparatus 100*a* causes the controller 4*a* to determine whether to end the application of the liquid to the object 5. For example, the controller 4*a* determines that the liquid applying operation is to be ended when the liquid has been applied to the predetermined total number of objects 5 in a predetermined pattern. Alternatively, the controller 4*a* may determine that the liquid applying operation is to be ended when receiving an operation input signal indicating the end of the liquid application via the operation unit.

If the controller 4*a* determines in step S206 that the operation is not to be ended (NO in step S206), the liquid application apparatus 100*a* performs step S192 and the subsequent steps again. On the other hand, if the controller 4*a* determines in step S206 that the process is to be ended (YES in step S206), the liquid application apparatus 100*a* ends the operation.

As described above, the liquid application apparatus 100*a* can apply the liquid to the object 5.

Maintaining Operation Example

FIGS. 20 to 26 are diagrams schematically illustrating an example of the maintaining operation by the liquid application apparatus 100*a*.

Figure 20:
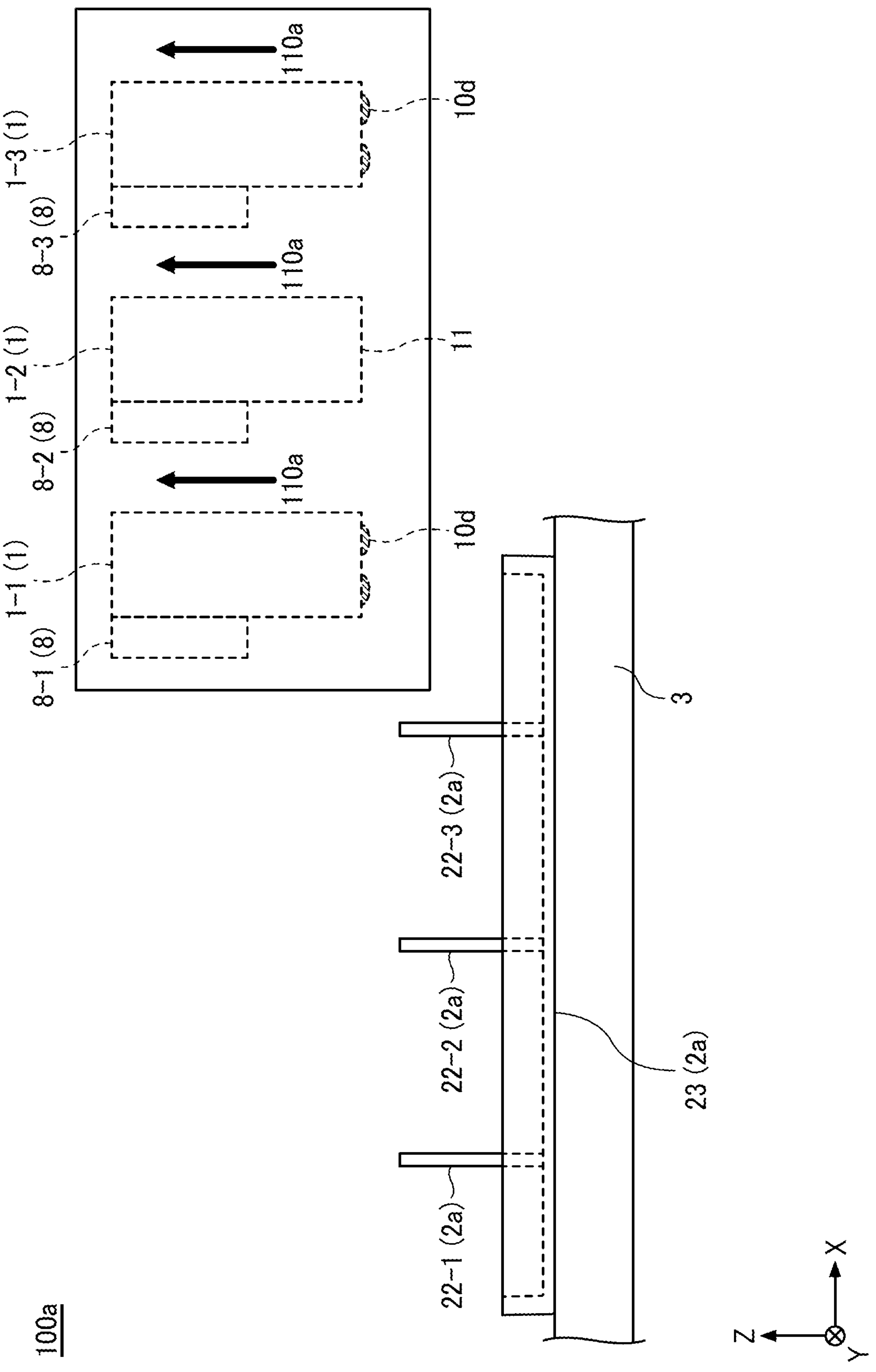
FIG. 20 is a first diagram illustrating an example of a maintaining operation by the liquid application apparatus illustrated in FIG. 17.

FIG. 20 illustrates a state in which the head 1 and the cleaning unit 2*a* are in the positional relationship of the wiping preparation operation. That is, FIG. 20 illustrates a state after the head 1-1, the head 1-2, and the head 1-3 have been raised in a head movement direction 110*a* while the conveyance of the cleaning unit 2*a* by the conveyor 3 is stopped. In this state, the wiping member 22-1, the wiping member 22-2, and the wiping member 22-3 can pass under the head 1 without contacting the head 1. The head movement direction 110*a* corresponds to a direction intersecting the conveyance direction 10 of the cleaning unit 2*a*.

Figure 21:
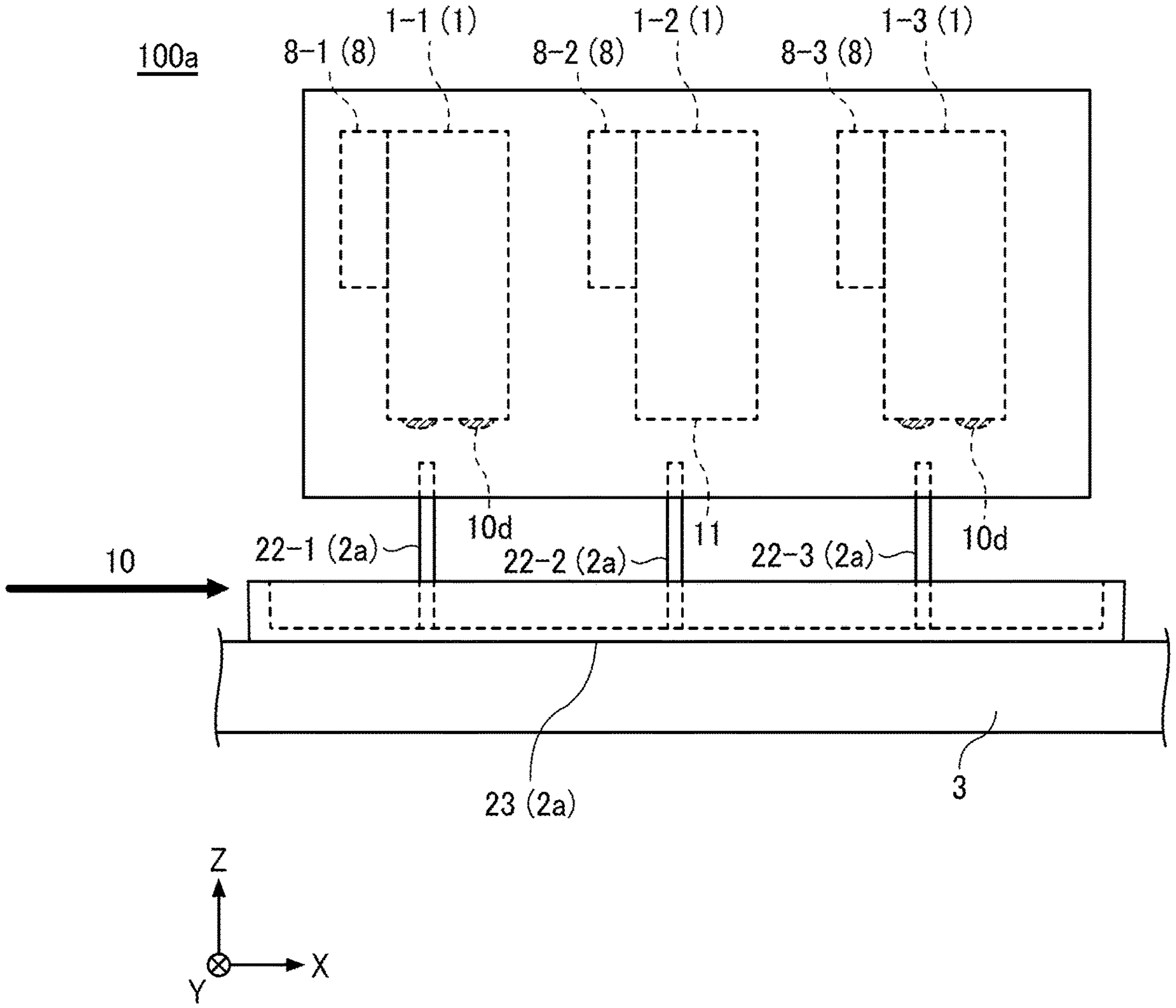
FIG. 21 is a second diagram illustrating the example of the maintaining operation by the liquid application apparatus illustrated in FIG. 17.

Thereafter, as illustrated in FIG. 21, the liquid application apparatus 100*a* conveys the cleaning unit 2*a* by the conveyor 3, and stops the conveyance when the head 1 and the cleaning unit 2*a* are in the positional relationship of the wiping operation under the control of the conveyance control unit 43. In the positional relationship of the wiping operation, the wiping member 22-1 is located most upstream in the conveyance direction 10 under the head 1-1, the wiping member 22-2 is located most upstream in the conveyance direction 10 under the head 1-2, and the wiping member 22-3 is located most upstream in the conveyance direction 10 under the head 1-3.

Figure 22:
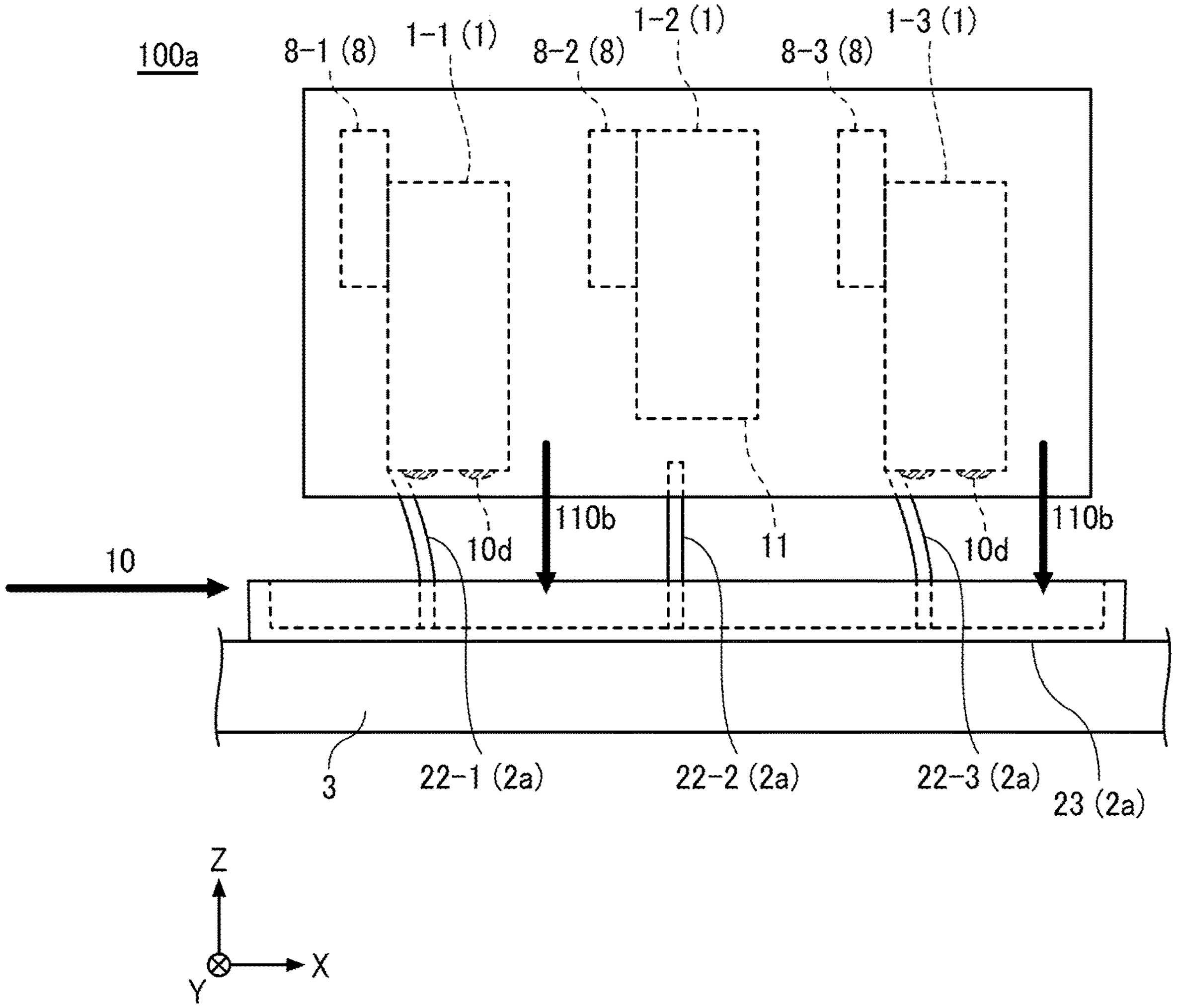
FIG. 22 is a third diagram illustrating the example of the maintaining operation by the liquid application apparatus illustrated in FIG. 17.

Thereafter, as illustrated in FIG. 22, the liquid application apparatus 100*a* causes the head movement mechanism 8 to lower the head 1 to be wiped among the head 1-1, the head 1-2, and the head 1-3 to a predetermined height in a head movement direction 110*b*, and then stops the head 1, under the control of the head movement control unit 45. Accordingly, among the head 1-1, the head 1-2, and the head 1-3, the wiping member 22-1 is in contact with the head 1-1 to be wiped, and the wiping member 22-3 is in contact with the head 1-3. The head movement direction 110*b* corresponds to a direction intersecting the conveyance direction 10 of the cleaning unit 2*a*.

Figure 23:
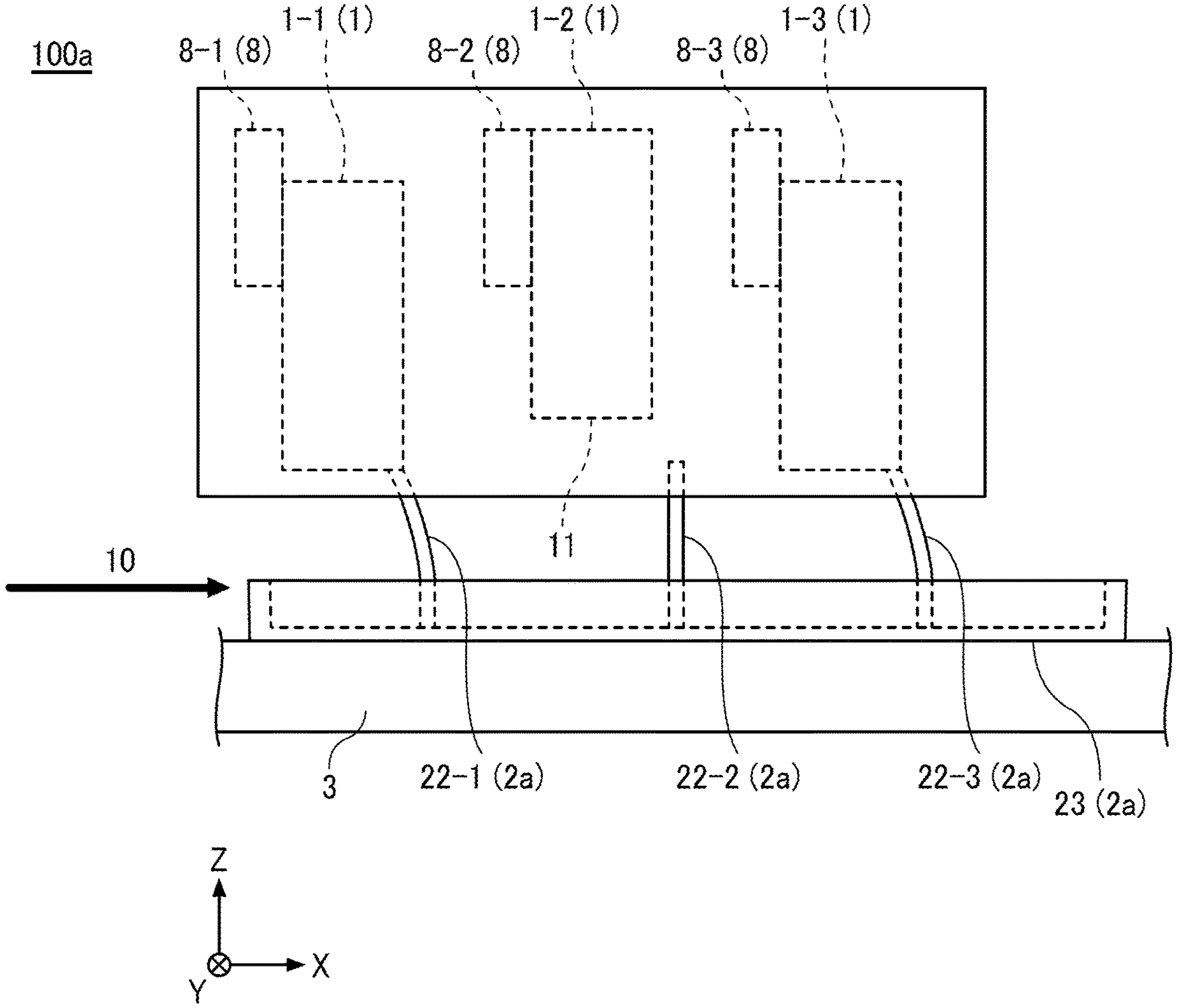
FIG. 23 is a fourth diagram illustrating the example of the maintaining operation by the liquid application apparatus illustrated in FIG. 17.

Thereafter, as illustrated in FIG. 23, the liquid application apparatus 100*a* conveys the cleaning unit 2*a* in the conveyance direction 10 by the conveyor 3 under the control of the conveyance control unit 43. Thus, the nozzle surface 11 of the head 1-1 can be wiped by the wiping member 22-1, and the nozzle surface 11 of the head 1-3 can be wiped by the wiping member 22-3. When the cleaning unit 2*a* is conveyed by a predetermined distance and the wiping of the head 1 to be wiped is completed, the liquid application apparatus 100*a* stops the conveyance of the cleaning unit 2*a*, under the control of the conveyance control unit 43. The predetermined distance here corresponds to a distance from the most upstream side to the most downstream side of the nozzle surface 11 in the conveyance direction 10, for example.

Figure 24:
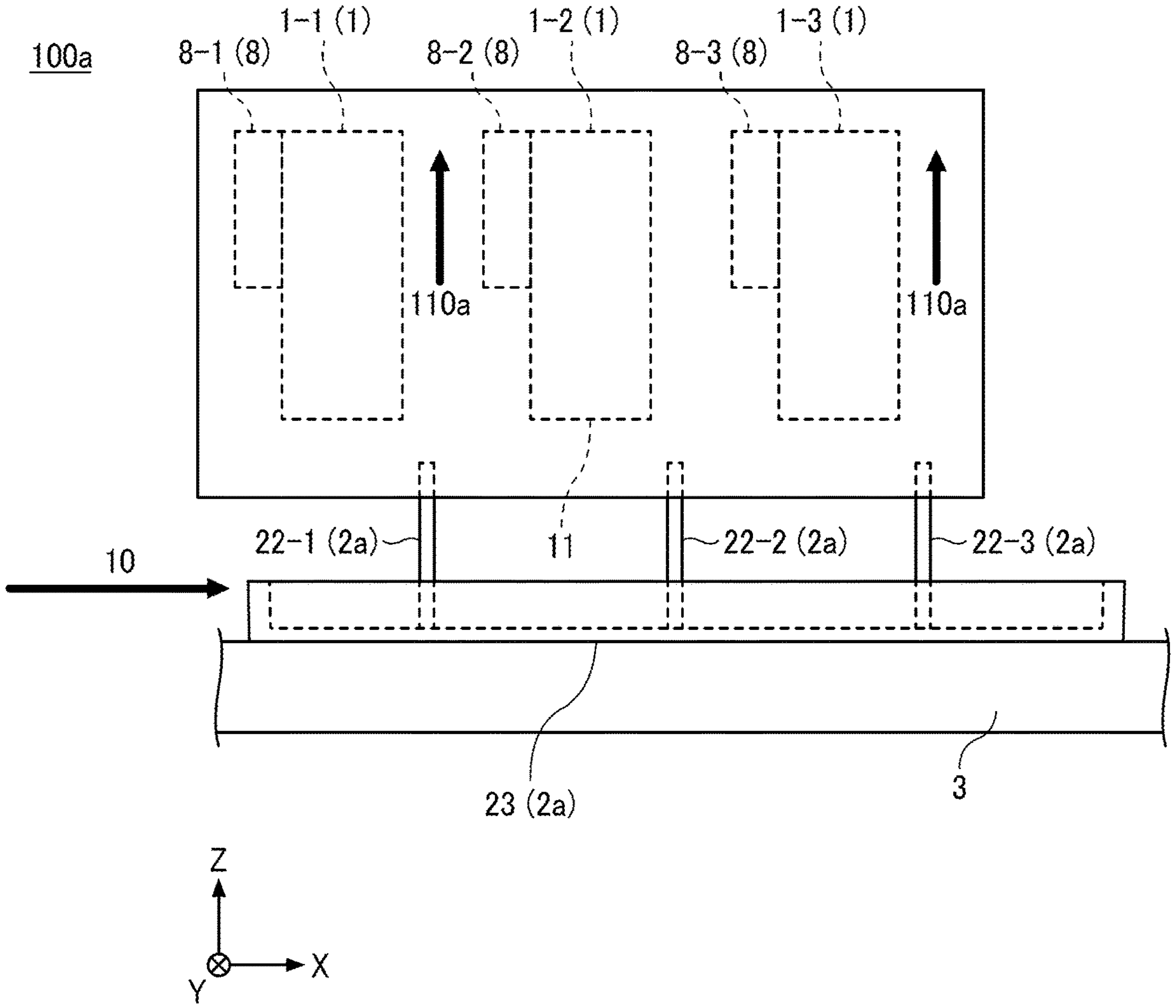
FIG. 24 is a fifth diagram illustrating the example of the maintaining operation by the liquid application apparatus illustrated in FIG. 17.

Thereafter, as illustrated in FIG. 24, the liquid application apparatus 100*a* raises the head 1 to be wiped up to a predetermined height in the head movement direction 110*a* by the head movement mechanism 8, and then stops the head 1, under the control of the head movement control unit 45. Accordingly, the wiping member 22-1, the wiping member 22-2, and the wiping member 22-3 can be conveyed in the conveyance direction 10 below the head 1-1, the head 1-2, and the head 1-3 without contacting the head 1-1, the head 1-2, and the head 1-3.

Figure 25:
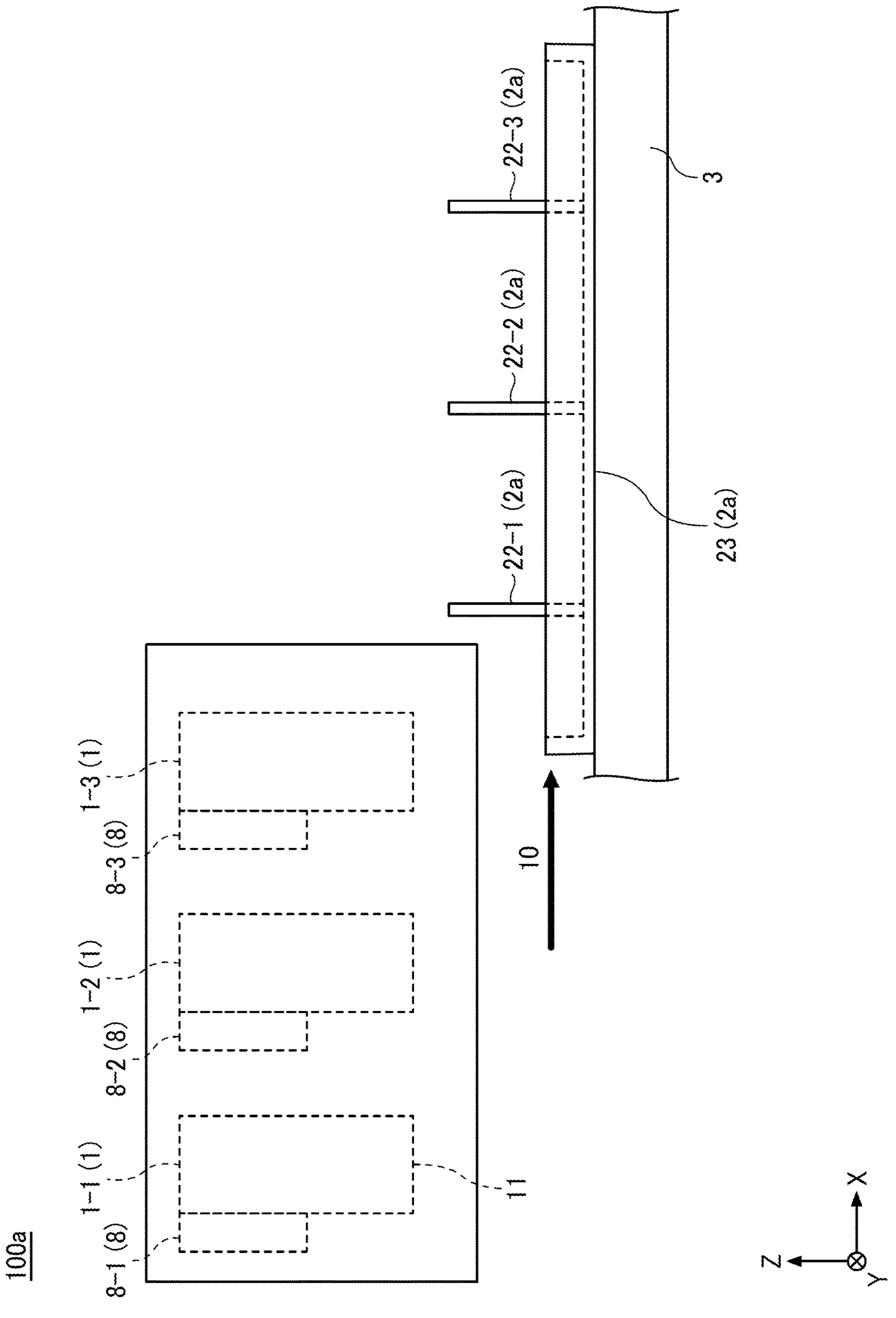
FIG. 25 is a sixth diagram illustrating the example of the maintaining operation by the liquid application apparatus illustrated in FIG. 17.

Thereafter, as illustrated in FIG. 25, the liquid application apparatus 100*a* conveys the object 5 and the cleaning unit 2*a* by the conveyor 3, and stops the conveyance when the head 1 and the cleaning unit 2*a* are in the positional relationship of the conveyance restart, under the control of the conveyance control unit 43.

Figure 26:
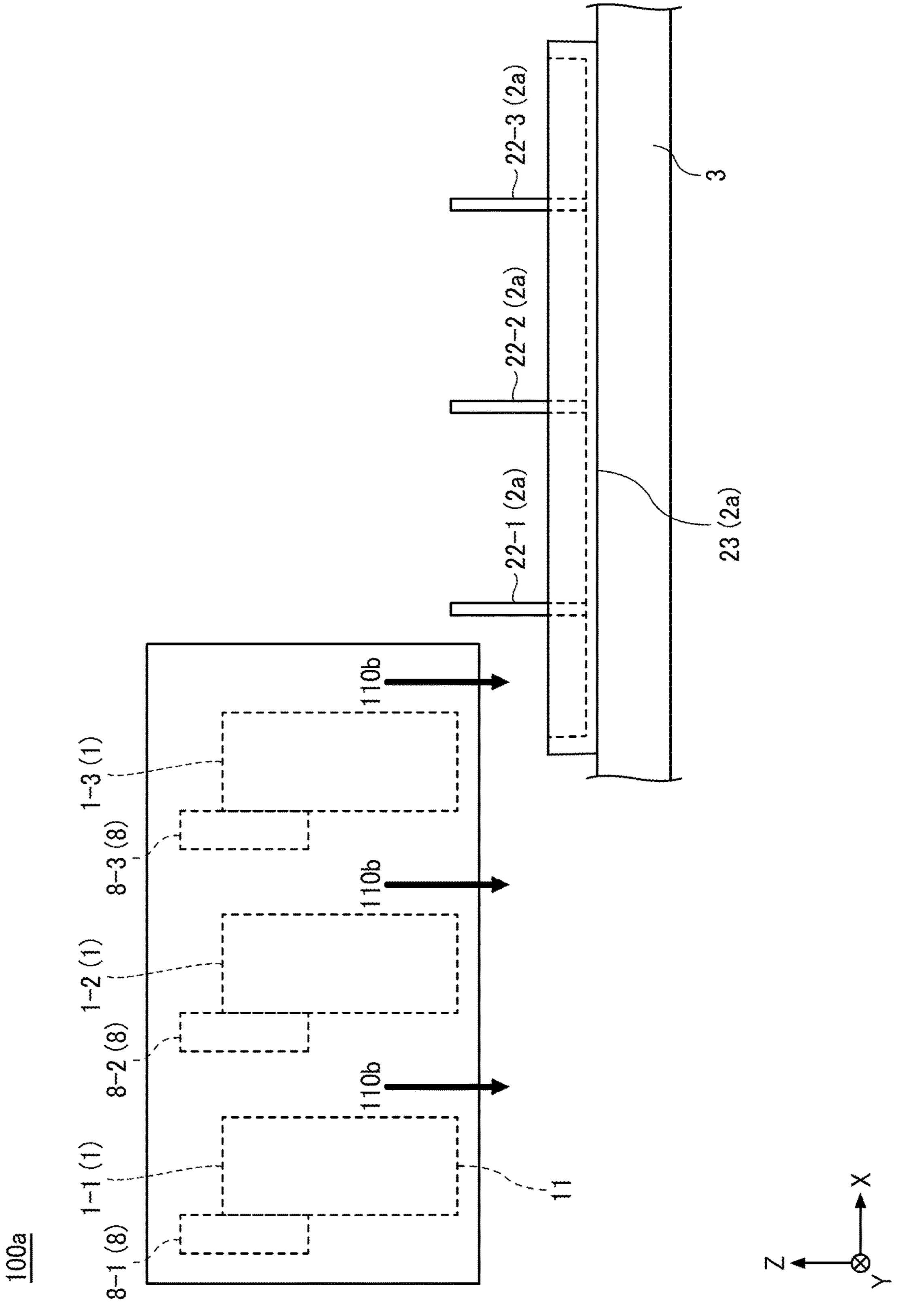
FIG. 26 is a seventh diagram illustrating the example of the maintaining operation by the liquid application apparatus illustrated in FIG. 17.

Thereafter, as illustrated in FIG. 26, the liquid application apparatus 100*a* lowers all of the head 1-1, the head 1-2, and the head 1-3 to a predetermined height by the head movement mechanism 8 and then stops them, under the control of the head movement control unit 45. Thereafter, the liquid application apparatus 100*a* restarts the conveyance of the cleaning unit 2*a*.

Third Embodiment

A liquid application apparatus according to a third embodiment will be described. The present embodiment is different from the above-described embodiments in further including a second mover that moves a wiping member in a direction intersecting a conveyance direction 10 of a cleaning unit when the cleaning unit performs an operation of maintaining the applying condition of liquid by a head.

Configuration Example of Liquid Application Apparatus

Figure 27:
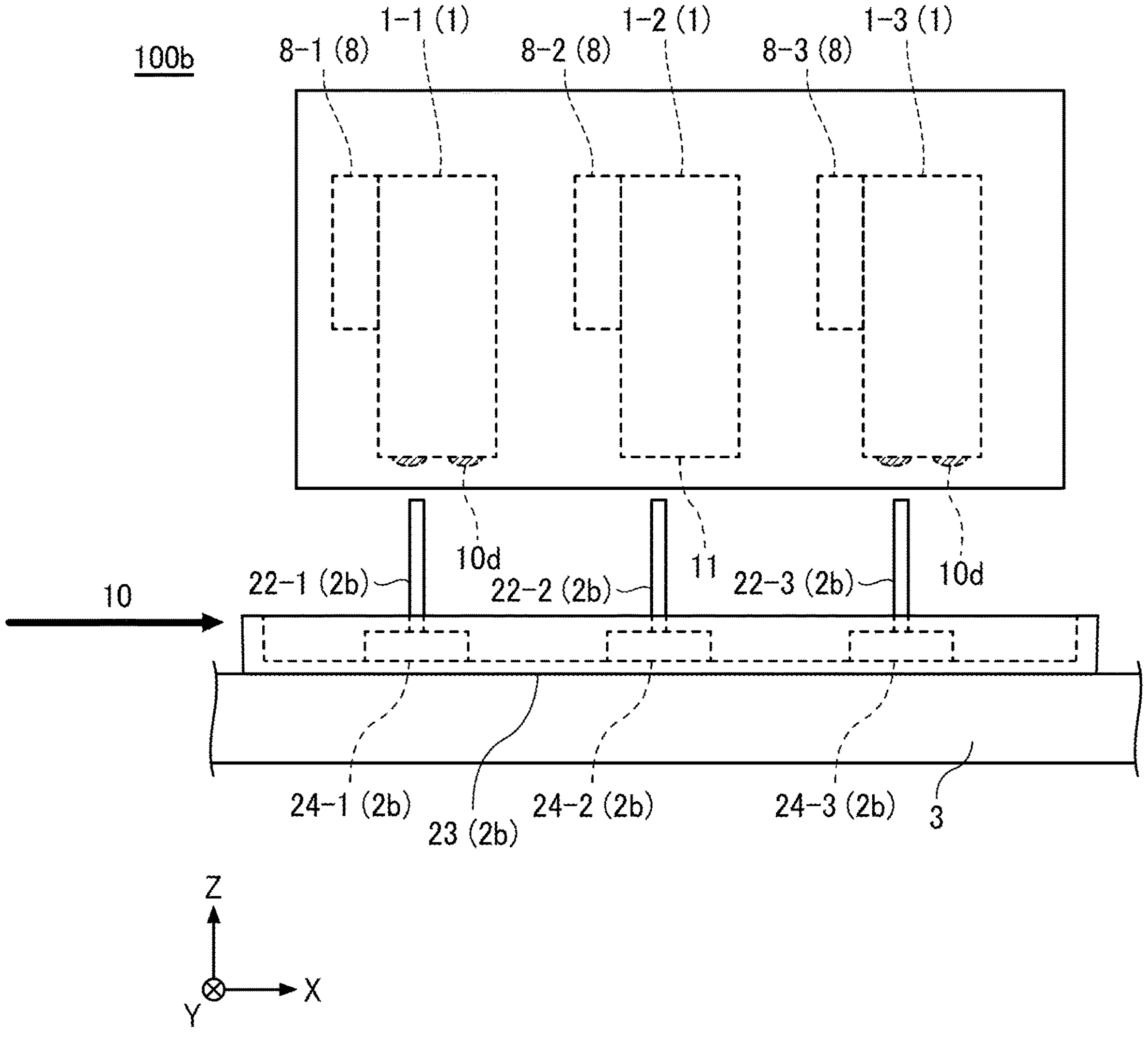
FIG. 27 is a side view of a head and the vicinity thereof in a liquid application apparatus according to a third embodiment of the present disclosure.

FIG. 27 is a side view of a head 1 and the vicinity thereof in the liquid application apparatus 100*b* according to the present embodiment. The liquid application apparatus 100*b* is different from the liquid application apparatus according to the above-described embodiments in including a cleaning unit 2*b*. The cleaning unit 2*b* is different from the cleaning unit in the above-described embodiments in that the cleaning unit 2*b* includes a wiping member movement mechanism 24-1, a wiping member movement mechanism 24-2, and a wiping member movement mechanism 24-3.

Each of the wiping member movement mechanism 24-1, the wiping member movement mechanism 24-2, and the wiping member movement mechanism 24-3 is an example of the second mover that moves the wiping member in a direction intersecting the conveyance direction 10 of the cleaning unit 2*b* when the cleaning unit 2*b* performs a maintaining operation.

The direction intersecting the conveyance direction 10 of the cleaning unit 2*b* is along the liquid discharge direction of the head 1. In the example illustrated in FIG. 27, since the head 1 discharges a liquid in the downward direction (−Z direction), the direction intersecting the conveyance direction 10 of the cleaning unit 2*b* corresponds to the up-and-down direction (Z direction). In other words, the conveyance direction 10 of the cleaning unit 2*b* is a direction intersecting the vertical direction, and the direction intersecting the conveyance direction 10 of the cleaning unit 2*b* is the vertical direction. However, the direction intersecting the conveyance direction 10 of the cleaning unit 2*b* can be changed as appropriate in accordance with the liquid discharge direction of the head 1.

The wiping member movement mechanism 24-1 moves a wiping member 22-1, the wiping member movement mechanism 24-2 moves a wiping member 22-2, and the wiping member movement mechanism 24-3 moves a wiping member 22-3. Each of the wiping member movement mechanism 24-1, the wiping member movement mechanism 24-2, and the wiping member movement mechanism 24-3 includes a linear motion mechanism using a linear motion guide member or the like, a driving unit that drives the linear motion mechanism, and the like, for example. As the drive unit, a motor, a cylinder, or the like can be used.

In the present embodiment, since the liquid application apparatus 100*b* includes—1 the wiping member movement mechanism 24-3, the wiping member movement mechanism 24-2, and the wiping member movement mechanism 24-3, the states of the wiping member 22-1, the wiping member 22-2, and the wiping member 22 with respect to the head 1 can be switched between the contact state and the non-contact state. This advantageous effect is the same as that of the second embodiment.

Figure 28:
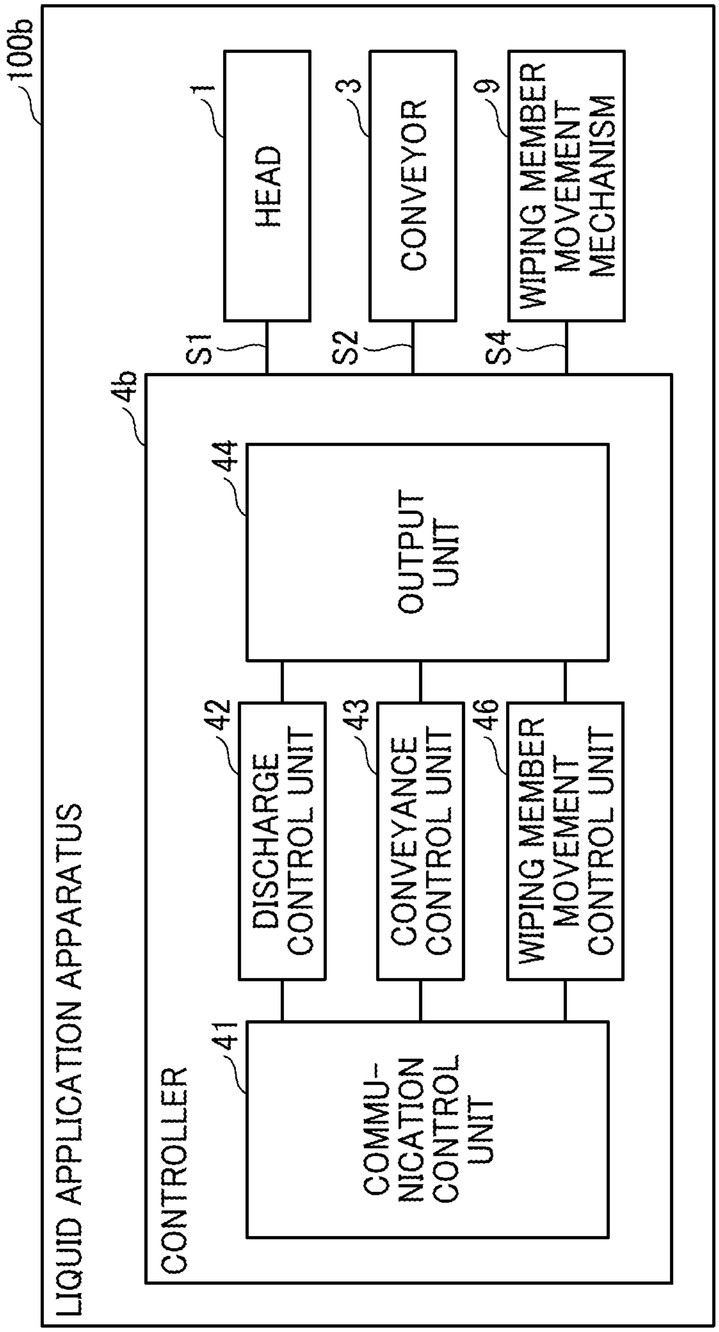
FIG. 28 is a diagram illustrating a functional configuration of a controller of the liquid application apparatus illustrated in FIG. 27.

FIG. 28 is a block diagram illustrating an example of a functional configuration of a controller 4*b* included in the liquid application apparatus 100*b*. The controller 4*b* includes a wiping member movement control unit 46. The function of the wiping member movement control unit 46 is implemented by a processor such as the CPU 401 illustrated in FIG. 4 executing a process defined in a program stored in a nonvolatile memory such as the ROM 402. The wiping member movement control unit 46 may be implemented by an external device such as a PC or a server, or may be implemented by distributed processing between the controller 4*b* and the external device.

The wiping member movement control unit 46 controls the operations of the wiping member movement mechanism 9 by outputting a wiping member movement control signal S4 to the driving unit of the wiping member movement mechanism 9 via an output unit 44. For example, the wiping member movement control unit 46 can control the movement timing, movement speed, and the like of the wiping member by the wiping member movement mechanism 9. The wiping member movement control unit 46 can independently control the operations of the wiping member 22-1, the wiping member 22-2, and the wiping member 22-3.

Operation Example Of Liquid Application Apparatus

Overall Operation Example

Figure 29:
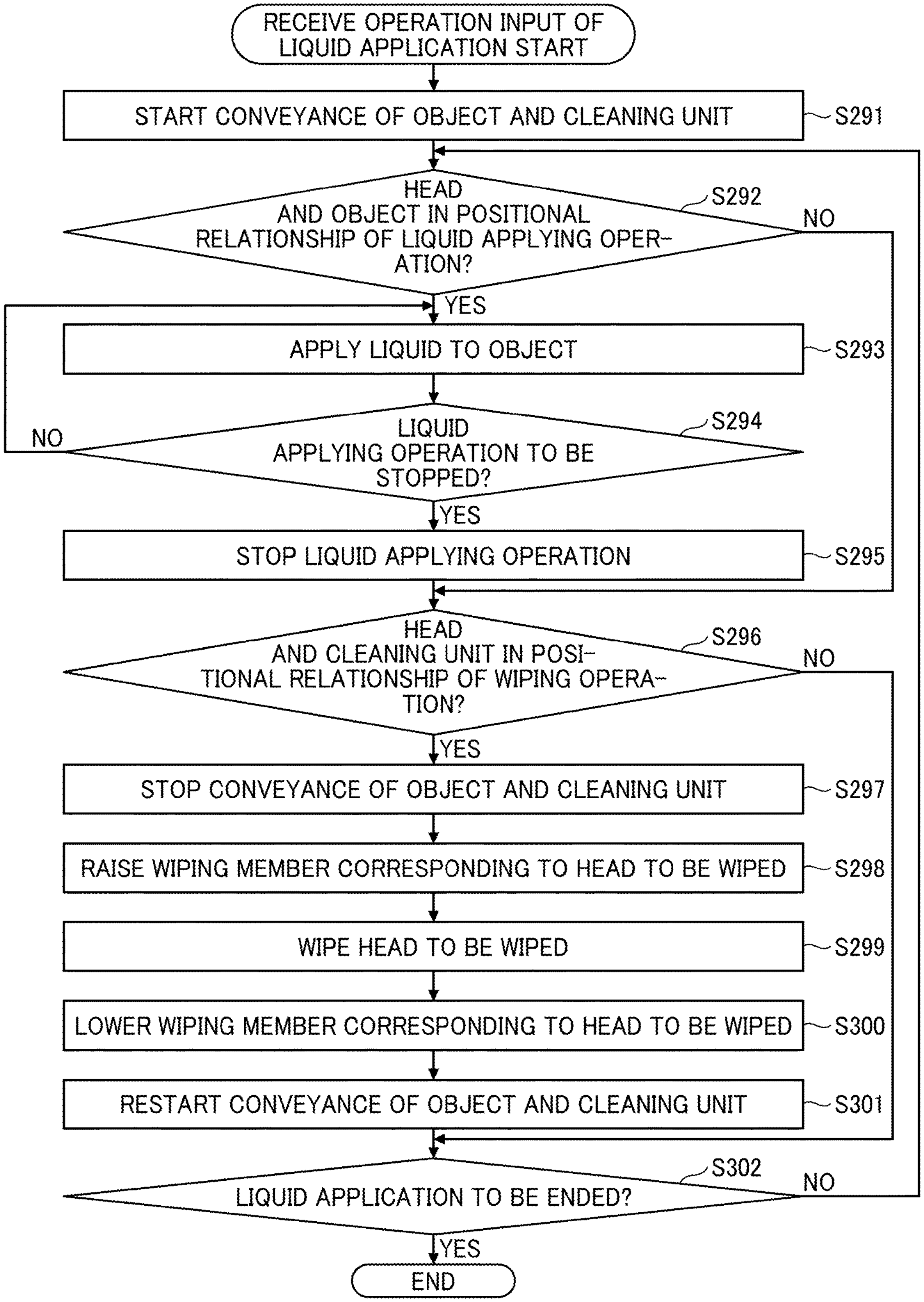
FIG. 29 is a flowchart illustrating an operation example of the liquid application apparatus illustrated in FIG. 27.

FIG. 29 is a flowchart illustrating an example of the operations of the liquid application apparatus 100*b*. The following description is provided with reference to FIGS. 27, 28, and others in addition to FIG. 29. The liquid application apparatus 100*b* starts the operations in FIG. 29 upon receiving an operation input signal for starting liquid application via the operation unit, for example. The operations in steps S291 to S295 are the same as the operations in steps S61 to S65 in FIG. 6, and thus redundant description thereof will be omitted here.

In step S296, the liquid application apparatus 100*b* causes the controller 4*b* to determine whether the head 1 and the cleaning unit 2*b* are in the positional relationship of the wiping operation. For example, the controller 4*b* conveys the cleaning unit 2*b* by a predetermined conveyance distance, and determines that the head 1 and the cleaning unit 2*b* are in the positional relationship of the wiping operation when the wiping member 22-1, the wiping member 22-2, and the wiping member 22-3 are positioned below the head 1. Alternatively, the controller 4*b* may determine that the head 1 and the cleaning unit 2*b* are in the positional relationship of the wiping operation when the proximity of the cleaning unit 2*b* is detected by a proximity sensor provided in the head 1.

If the controller 4*b* determines in step S296 that the head 1 and the cleaning unit 2*b* are not in the positional relationship of the wiping operation (NO in step S296), the liquid application apparatus 100*b* proceeds to step S302. On the other hand, if the controller 4*b* determines that the head 1 and the cleaning unit 2*b* are in the positional relationship of the wiping operation (YES in step S296), in step S297, the liquid application apparatus 100*b* stops the conveyance of the object 5 and the cleaning unit 2*b* by the conveyor 3 under the control of the conveyance control unit 43.

Subsequently, in step S298, the liquid application apparatus 100*b* raises the wiping member corresponding to the head to be wiped, among the head 1-1, the head 1-2, and the head 1-3, to a predetermined height and then stops the wiping member, under the control of the wiping member movement control unit 46. Accordingly, the wiping member comes into contact with only the head to be wiped among the head 1-1, the head 1-2, and the head 1-3.

Subsequently, in step S299, the liquid application apparatus 100*b* conveys the cleaning unit 2*b* in the conveyance direction 10 by the conveyor 3 to wipe the nozzle surface 11 of the head to be wiped with the wiping member, under the control of the conveyance control unit 43. When the cleaning unit 2*b* is conveyed by a predetermined distance and the wiping of the head to be wiped is completed, the liquid application apparatus 100*b* stops the conveyance of the cleaning unit 2*b*, under the control of the conveyance control unit 43.

Subsequently, in step S300, the liquid application apparatus 100*b* lowers the wiping member corresponding to the head to be wiped to a predetermined height by the wiping member movement mechanism 9 and then stops the wiping member, under the control of the wiping member movement control unit 46. Accordingly, the wiping member 22-1, the wiping member 22-2, and the wiping member 22-3 can be conveyed in the conveyance direction 10 below the head 1-1, the head 1-2, and the head 1-3 without contacting the head 1-1, the head 1-2, and the head 1-3.

Subsequently, in step S301, the liquid application apparatus 100*b* restarts the conveyance of the object 5 and the cleaning unit 2*b* by the conveyor 3 under the control of the conveyance control unit 43.

Subsequently, in step S302, the liquid application apparatus 100*b* causes the controller 4*b* to determine whether to end the application of the liquid to the object 5. For example, the controller 4*b* determines that the liquid applying operation is to be ended when the liquid has been applied to the predetermined total number of objects 5 in a predetermined pattern. Alternatively, the controller 4*b* may determine that the liquid applying operation is to be ended when receiving an operation input signal indicating the end of the liquid application via the operation unit.

If the controller 4*b* determines in step S302 that the operation is not to be ended (NO in step S302), the liquid application apparatus 100*b* performs step S292 and the subsequent steps again. On the other hand, if the controller 4*b* determines that the operation is to be ended (YES in step S302), the liquid application apparatus 100*b* ends the operation.

As described above, the liquid application apparatus 100*b* can apply the liquid to the object 5.

Maintaining Operation Example

FIGS. 30 to 34 are diagrams schematically illustrating an example of the maintaining operation by the liquid application apparatus 100*b*.

Figure 30:
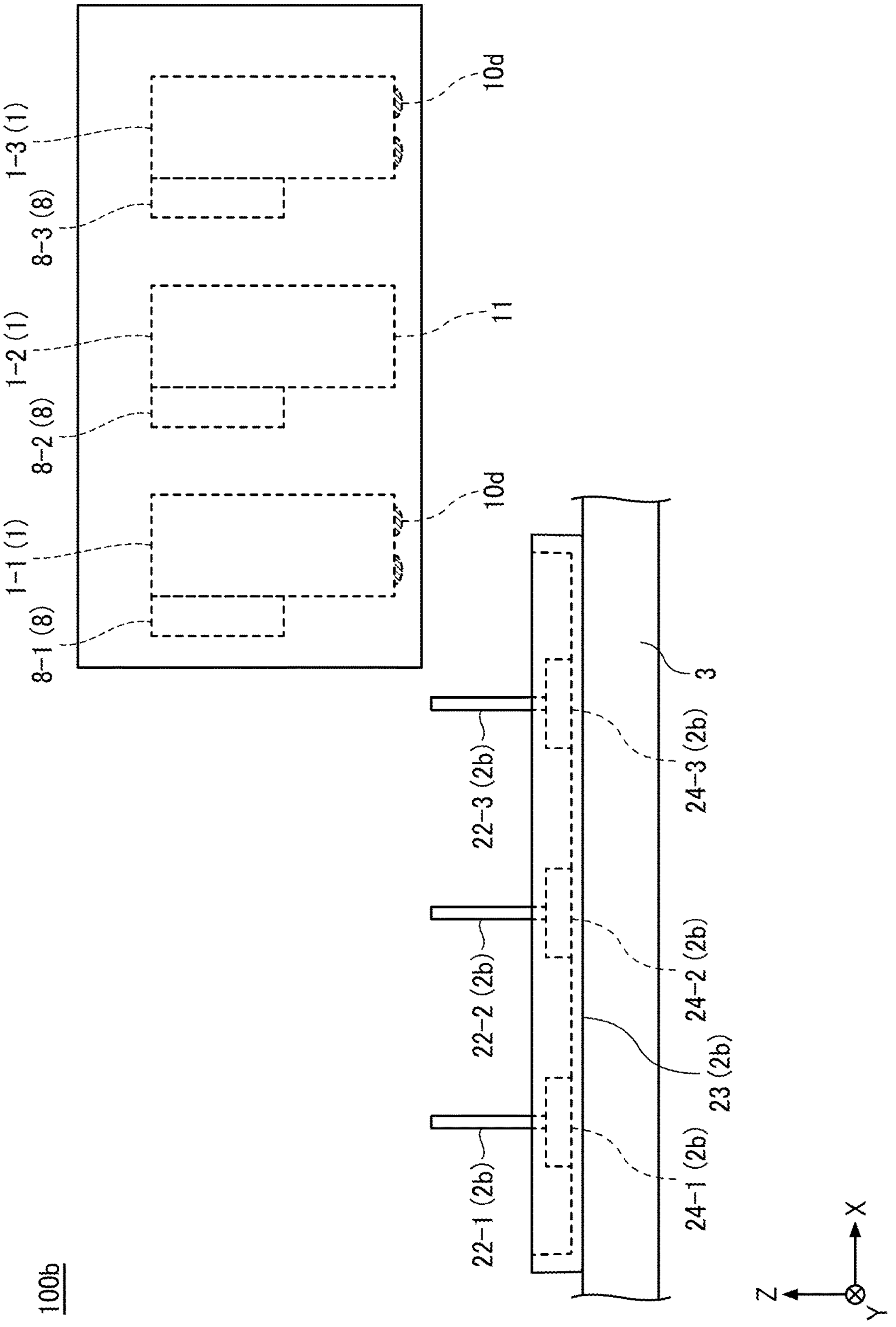
FIG. 30 is a first diagram illustrating an example of a maintaining operation by the liquid application apparatus illustrated in FIG. 27.
Figure 31:
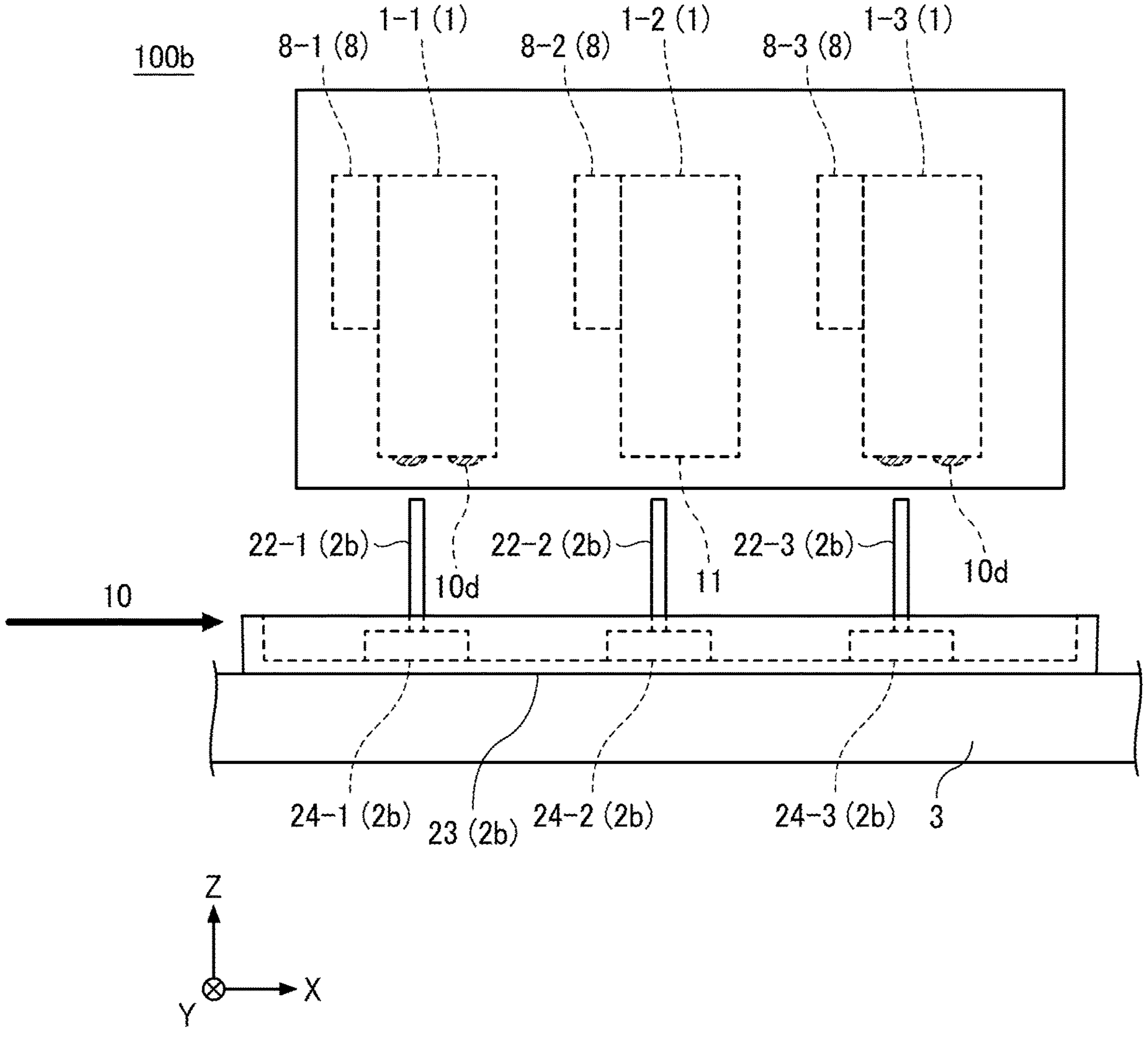
FIG. 31 is a second diagram illustrating the example of the maintaining operation by the liquid application apparatus illustrated in FIG. 27.

FIG. 30 illustrates a state in which the head 1 and the cleaning unit 2*b* are in the positional relationship of the wiping preparation operation. From the state of FIG. 30, as illustrated in FIG. 31, the liquid application apparatus 100*b* conveys the cleaning unit 2*b* by the conveyor 3, and stops the conveyance when the head 1 and the cleaning unit 2*b* are in the positional relationship of the wiping operation under the control of the conveyance control unit 43. In the positional relationship of the wiping operation, the wiping member 22-1 is located most upstream in the conveyance direction 10 under the head 1-1, the wiping member 22-2 is located most upstream in the conveyance direction 10 under the head 1-2, and the wiping member 22-3 is located most upstream in the conveyance direction 10 under the head 1-3.

Figure 32:
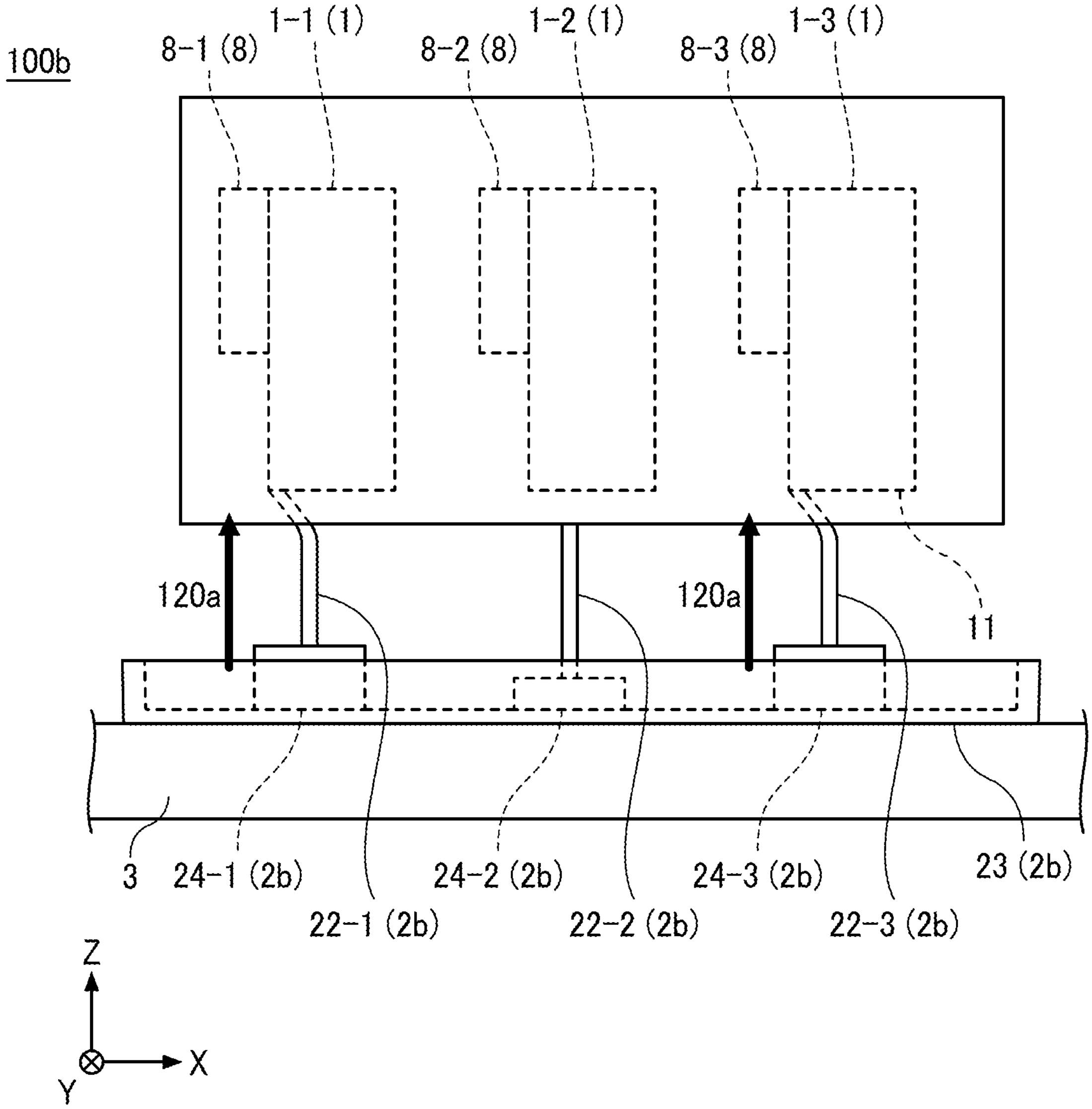
FIG. 32 is a third diagram illustrating the example of the maintaining operation by the liquid application apparatus illustrated in FIG. 27.

Thereafter, as illustrated in FIG. 32, the liquid application apparatus 100*b* raises the wiping member corresponding to the head to be wiped, among the head 1-1, the head 1-2, and the head 1-3, to a predetermined height and then stops the wiping member, under the control of the wiping member movement control unit 46. Accordingly, the wiping member comes into contact with only the head to be wiped among the head 1-1, the head 1-2, and the head 1-3. The head movement direction 120*a* corresponds to a direction intersecting the conveyance direction 10 of the cleaning unit 2*b*.

Figure 33:
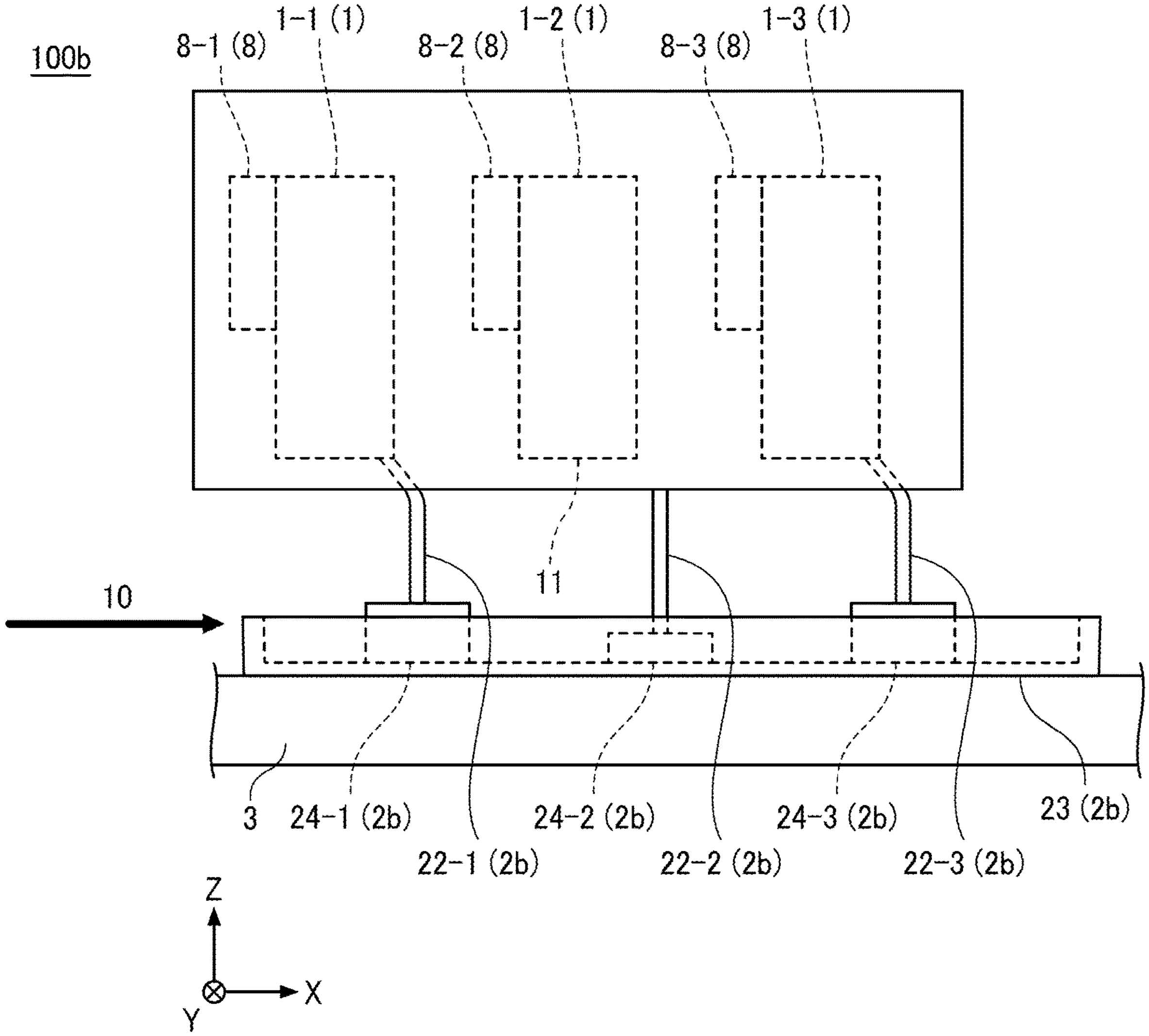
FIG. 33 is a fourth diagram illustrating the example of the maintaining operation by the liquid application apparatus illustrated in FIG. 27.

Thereafter, as illustrated in FIG. 33, the liquid application apparatus 100*b* conveys the cleaning unit 2*b* in the conveyance direction 10 by the conveyor 3 to wipe the nozzle surface 11 of the head to be wiped with the wiping member, under the control of the conveyance control unit 43. When the cleaning unit 2*b* is conveyed by a predetermined distance and the wiping of the head to be wiped is completed, the liquid application apparatus 100*b* stops the conveyance of the cleaning unit 2*b*, under the control of the conveyance control unit 43. The predetermined distance here corresponds to a distance from the most upstream side to the most downstream side of the nozzle surface 11 in the conveyance direction 10, for example.

Figure 34:
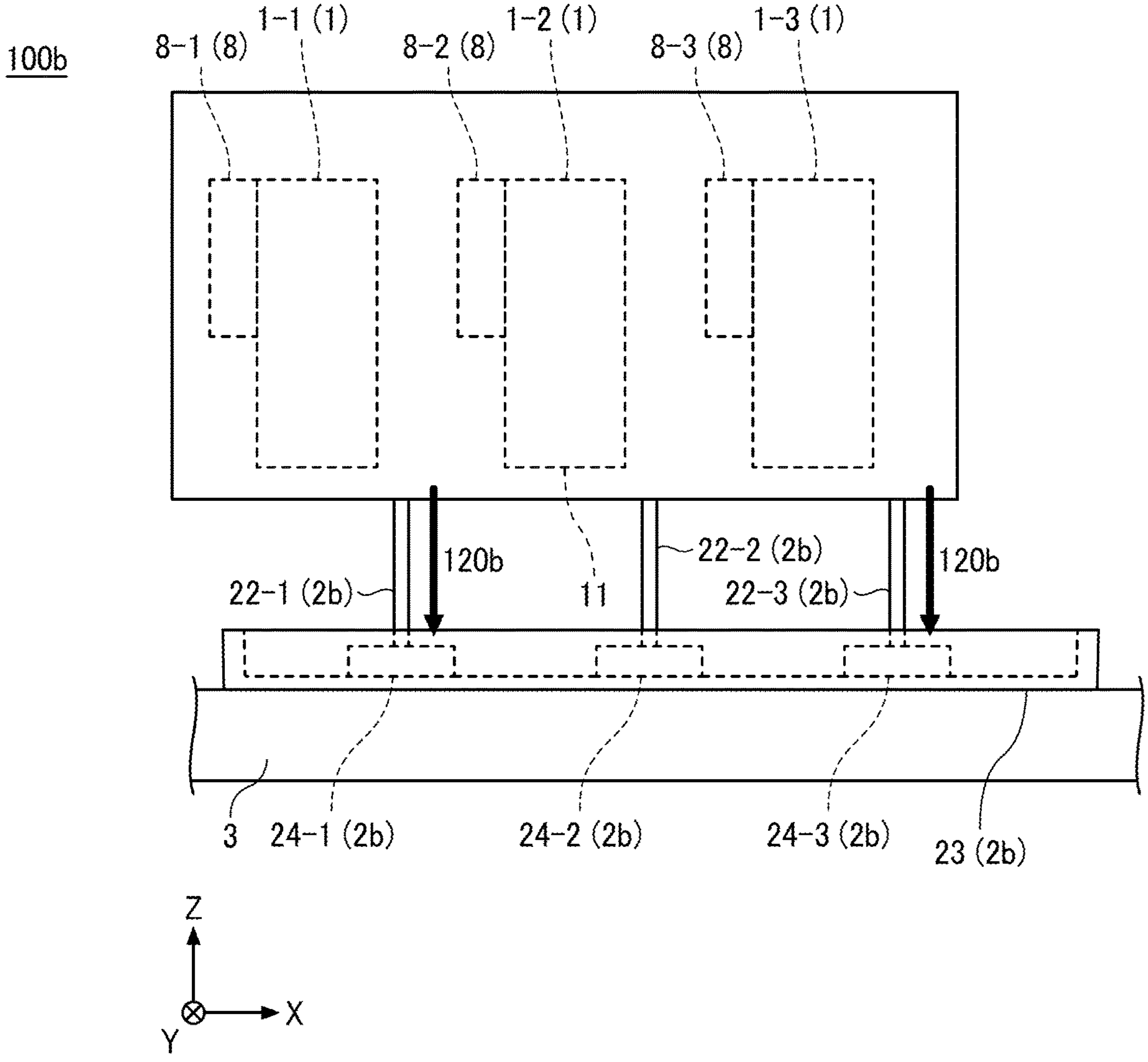
FIG. 34 is a fifth diagram illustrating the example of the maintaining operation by the liquid application apparatus illustrated in FIG. 27.

Thereafter, as illustrated in FIG. 34, the liquid application apparatus 100*b* lowers the wiping member corresponding to the head to be wiped to a predetermined height in the wiping member moving direction 120*b* by the wiping member movement mechanism 9 and then stops the wiping member, under the control of the wiping member movement control unit 46. Accordingly, the wiping member 22-1, the wiping member 22-2, and the wiping member 22-3 can be conveyed in the conveyance direction 10 below the head 1-1, the head 1-2, and the head 1-3 without contacting the head 1-1, the head 1-2, and the head 1-3. Thereafter, the liquid application apparatus 100*b* restarts the conveyance of the cleaning unit 2*b*.

Fourth Embodiment

A liquid application apparatus according to a fourth embodiment will be described. The present embodiment is different from the above-described embodiments in that a first conveyance path and a second conveyance path are linear. The advantageous effects of the present embodiment are the same as those of the first embodiment.

Figure 35:
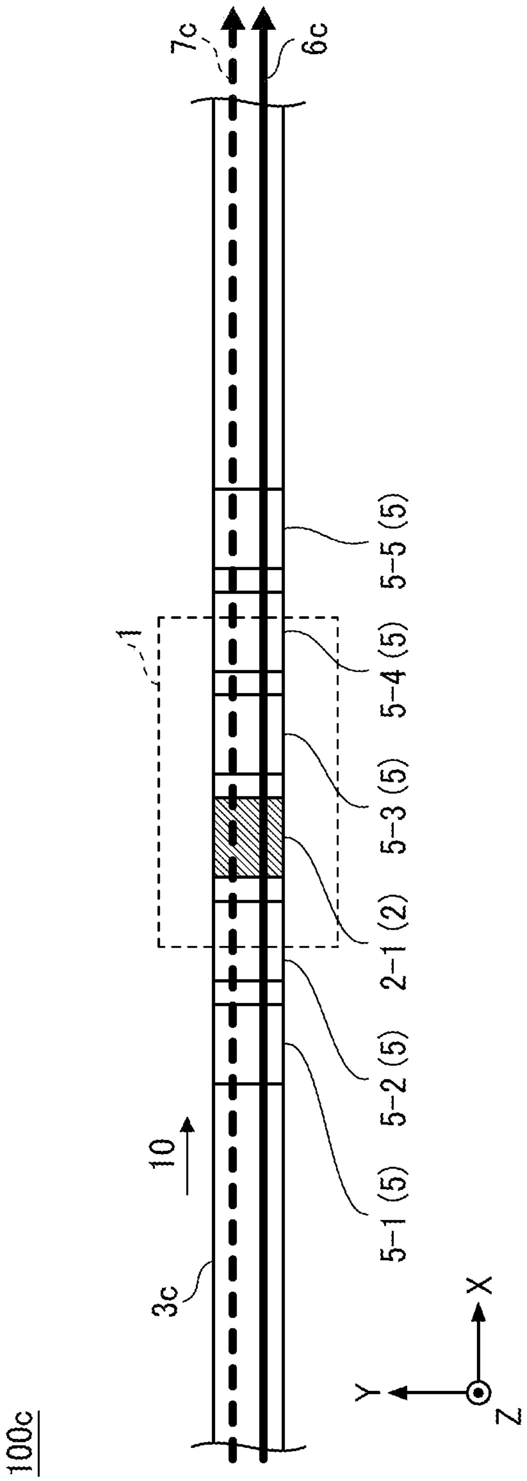
FIG. 35 is a top view of a liquid application apparatus according to a fourth embodiment of the present disclosure.

FIG. 35 is a top view of a configuration of a liquid application apparatus 100*c* according to the present embodiment. In the present embodiment, the liquid application apparatus 100*c* conveys an object 5 along a first conveyance path 6*c* by a conveyor 3*c*. The liquid application apparatus 100*c* conveys a cleaning unit 2 along a second conveyance path 7*c* by the conveyor 3*c*. Each of the first conveyance path 6*c* and the second conveyance path 7*c* has a substantially linear shape. The entire first conveyance path 6*c* is the same as the second conveyance path 7*c*. In the first conveyance path 6*c* and the second conveyance path 7*c*, the object 5 and the cleaning unit 2 are conveyed substantially linearly in the +X direction from the upstream process.

Fifth Embodiment

A liquid application apparatus according to a fifth embodiment will be described. The present embodiment is different from the above-described embodiments in that a second conveyance path branches from a first conveyance path downstream of a head in a conveyance direction of a cleaning unit.

Figure 36:
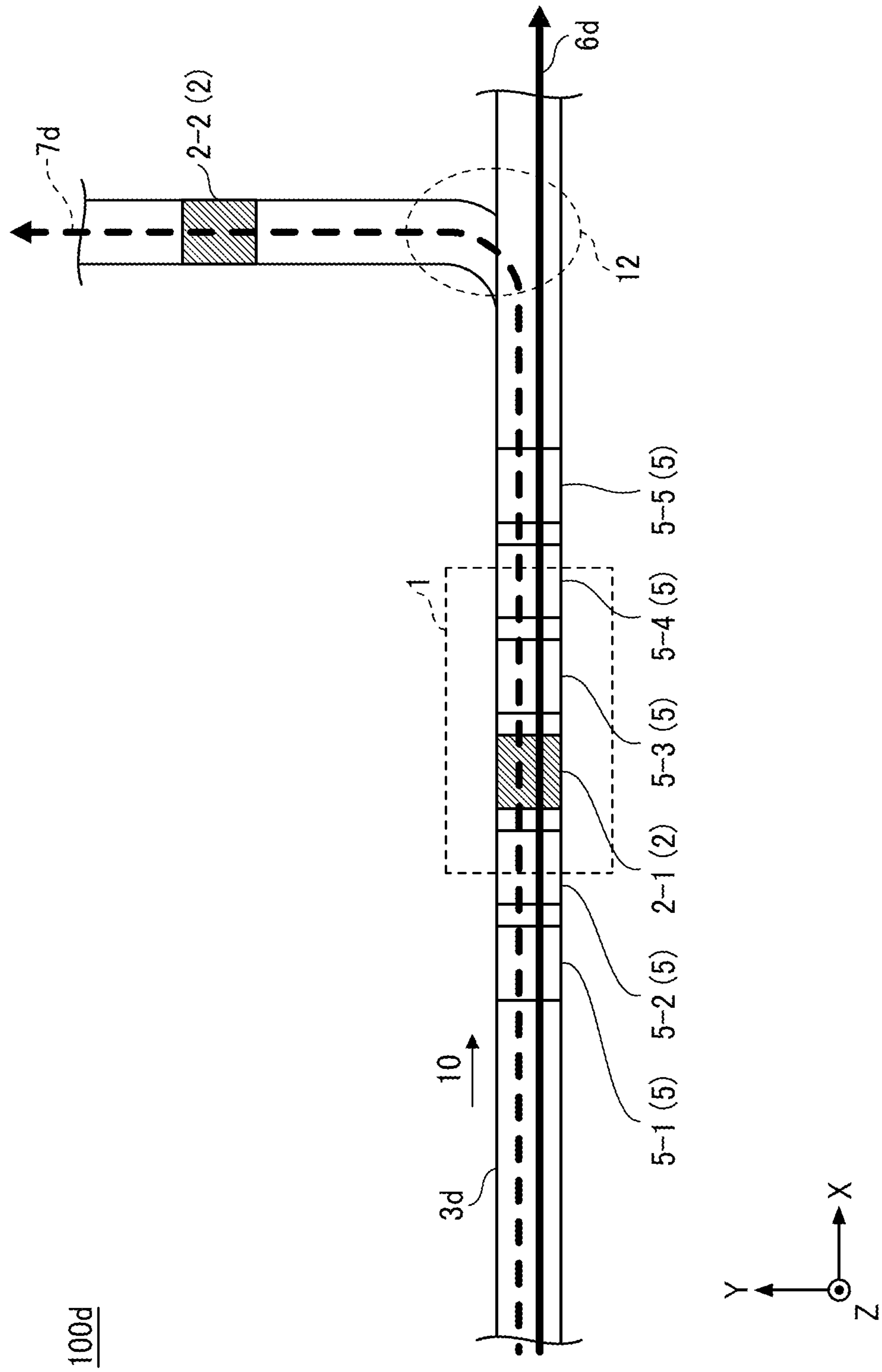
FIG. 36 is a top view of a liquid application apparatus according to a fifth embodiment of the present disclosure.

FIG. 36 is a top view of a configuration of a liquid application apparatus 100*d* according to the present embodiment. In the present embodiment, the liquid application apparatus 100*d* conveys an object 5 along a first conveyance path 6*d* by a conveyor 3*d*. The liquid application apparatus 100*d* conveys a cleaning unit 2 along a second conveyance path 7*d* by a conveyor 3*d*.

The first conveyance path 6*d* is substantially linear. The second conveyance path 7*d* is the same as the first conveyance path 6*d* upstream of a head 1 in a conveyance direction 10. The second conveyance path 7*d* branches from the first conveyance path 6*d* downstream of the head 1 in the conveyance direction 10. In the example illustrated in FIG. 36, the second conveyance path 7*d* branches from the first conveyance path 6*d* at a branch portion 12. Downstream of the branch portion 12, the object 5 is conveyed toward a process on the downstream side in the +X direction, and the cleaning unit 2 is conveyed in the +Y direction.

In the present embodiment, the cleaning unit 2 may be collected from the second conveyance path 7*d* after branching from the first conveyance path 6*d*. When the cleaning unit 2 is collected, the liquid held by a discharged liquid holder 21 (see FIG. 3) included in the cleaning unit 2 can be discarded or reused. In the example illustrated in FIG. 36, the configuration in which the second conveyance path 7*d* branches in the direction substantially orthogonal to the first conveyance path 6*d*. However, embodiments of the present disclosure are not limited thereto, and the second conveyance path 7*d* may branch in the intersecting direction. Advantageous effects other than the above of the present embodiment are the same as those of the first embodiment.

Sixth Embodiment

A liquid application apparatus according to a sixth embodiment will be described. The present embodiment is different from the above-described embodiments in that a second conveyance path includes a circulation path that branches from a first conveyance path downstream of a head in a conveyance direction of a cleaning unit and then joins the first conveyance path upstream of the head in the conveyance direction of the cleaning unit.

Figure 37:
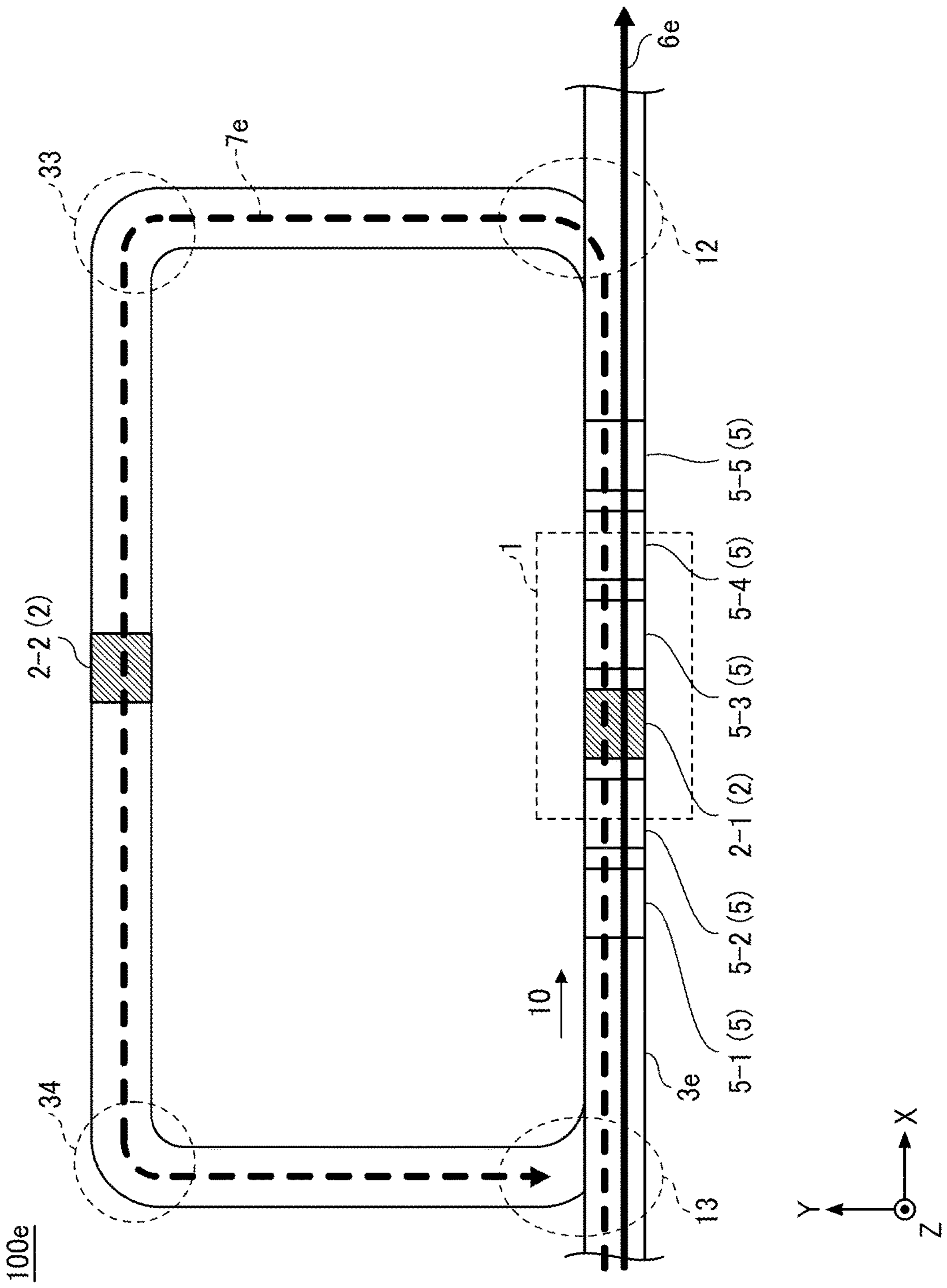
FIG. 37 is a top view of a liquid application apparatus according to a sixth embodiment of the present disclosure.

FIG. 37 is a top view of a configuration of a liquid application apparatus 100*e* according to the present embodiment. In the present embodiment, the liquid application apparatus 100*e* conveys an object 5 along a first conveyance path 6*e* by a conveyor 3*e*. The liquid application apparatus 100*e* conveys a cleaning unit 2 along a second conveyance path 7*e* by the conveyor 3*e*.

The first conveyance path 6*e* is linear. The second conveyance path 7*e* is the same path as the first conveyance path 6*e* in parts upstream and downstream of the head 1 in a conveyance direction 10. The second conveyance path 7*e* includes a circulation path that branches from the first conveyance path 6*e* downstream of the head 1 in the conveyance direction 10 and then joins the first conveyance path 6*e* upstream of the head 1 in the conveyance direction 10.

In the example illustrated in FIG. 37, the second conveyance path 7*e* branches from the first conveyance path 6*e* at a branch portion 12. The object 5 is conveyed toward the downstream process in the +X direction downstream of the branch portion 12. On the other hand, the cleaning unit 2 is conveyed in the +Y direction downstream of the branch portion 12, and then the conveyance direction is changed by 90 degrees at a curved portion 33, and the cleaning unit 2 is conveyed in the −X direction. Thereafter, the conveyance direction of the cleaning unit 2 is further changed by 90 degrees at the curved portion 33, and the cleaning unit 2 is conveyed in the −Y direction. Thereafter, the second conveyance path 7*e* joins the first conveyance path 6*e* at a joining part 13, and the cleaning unit 2 is conveyed in the +X direction.

The object 5 needs to be conveyed from the upstream process to the downstream process, but the cleaning unit 2 does not necessarily need to be conveyed between the processes. In the present embodiment, the second conveyance path 7*e* is branched and merged with the first conveyance path 6*e* to be circulated. Accordingly, since the same cleaning unit 2 can be used for the maintaining operation of the head 1 a plurality of times, the frequency of replacing the cleaning unit 2 or discarding the liquid held in the cleaning unit 2 can be reduced. As a result, the time and effort required for the maintaining operation in the liquid application apparatus 100*e* can be reduced.

In the present embodiment, the cleaning unit 2 may be collected from the second conveyance path 7*e* after branching from the first conveyance path 6*e*. When the cleaning unit 2 is collected, the liquid held by a discharged liquid holder 21 (see FIG. 3) included in the cleaning unit 2 can be discarded or reused. The cleaning unit 2 may be replaced in the path after branching from the first conveyance path 6*e*. Accordingly, since the replacement position of the cleaning unit 2 can be set at one place, the cleaning unit 2 can be easily replaced.

Advantageous effects other than the above of the present embodiment are the same as those of the first embodiment.

Seventh Embodiment

A liquid application apparatus according to a seventh embodiment will be described. The present embodiment is different from the third embodiment in that a first wiper and a second wiper among a plurality of wipers move with different timings in a direction intersecting the conveyance direction 10.

More specifically, in the liquid application apparatus 100*b* according to the third embodiment, for example, when the head 1 and the cleaning unit 2*b* are in the positional relationship of the wiping operation, the wiping member corresponding to the head 1 to be wiped is raised in a state where the conveyance of the cleaning unit 2*b* is temporarily stopped, and the wiping member is brought into contact with the head 1 to perform the wiping operation. On the other hand, in the present embodiment, in performing the wiping operation, the cleaning unit 2*b* is continuously conveyed without being temporarily stopped. With the timing with which the head 1 to be wiped by the first wiper is conveyed onto the first wiper, the first wiper is raised and brought into contact with the head to perform the wiping operation. With the timing with which the head 1 to be wiped by the second wiper is conveyed onto the second wiper, the second wiper is raised and brought into contact with the head to perform the wiping operation. The timing for raising the first wiper and the timing for raising the second wiper are different.

According to the above configuration and operation, since the maintaining operation is performed without temporarily stopping the cleaning unit 2*b*, the time required for the maintaining operation can be reduced, and the productivity of the liquid application apparatus can be improved. In addition, since the wiping operation is performed using the wiping members corresponding to the plurality of heads that discharges different types of liquid, it is possible to prevent a situation in which the liquid of a type different from the liquid discharged by a specific head adheres to the specific head via the wiping member, and it is possible to prevent a reduction in the application quality of the liquid to the object due to the mixture of the liquids of different types. The advantageous effects other than those described above are the same as those described in relation to the above-described embodiments.

Figure 38:
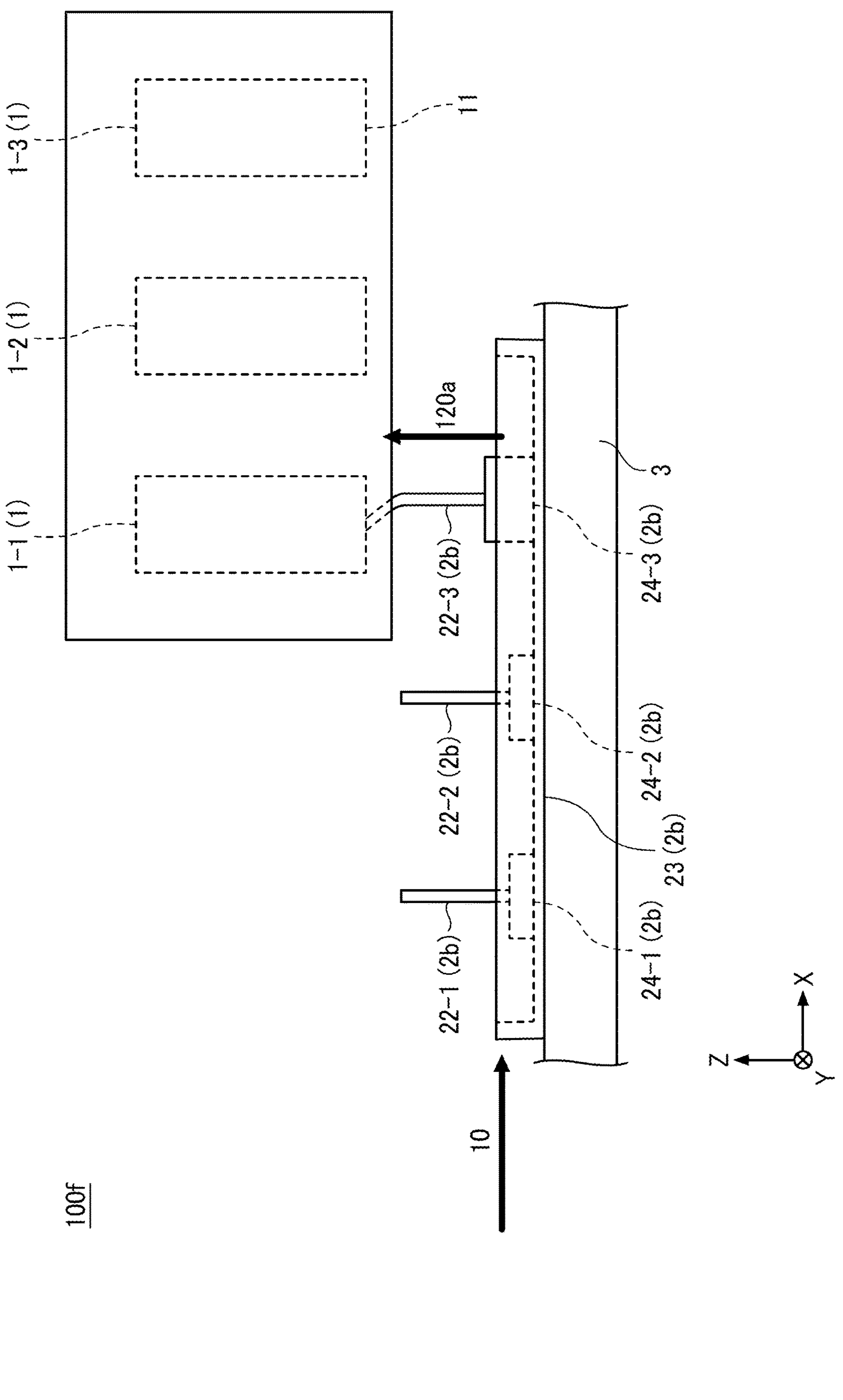
FIG. 38 is a first diagram illustrating an example of a maintaining operation by a liquid application apparatus according to a seventh embodiment of the present disclosure.
Figure 39:
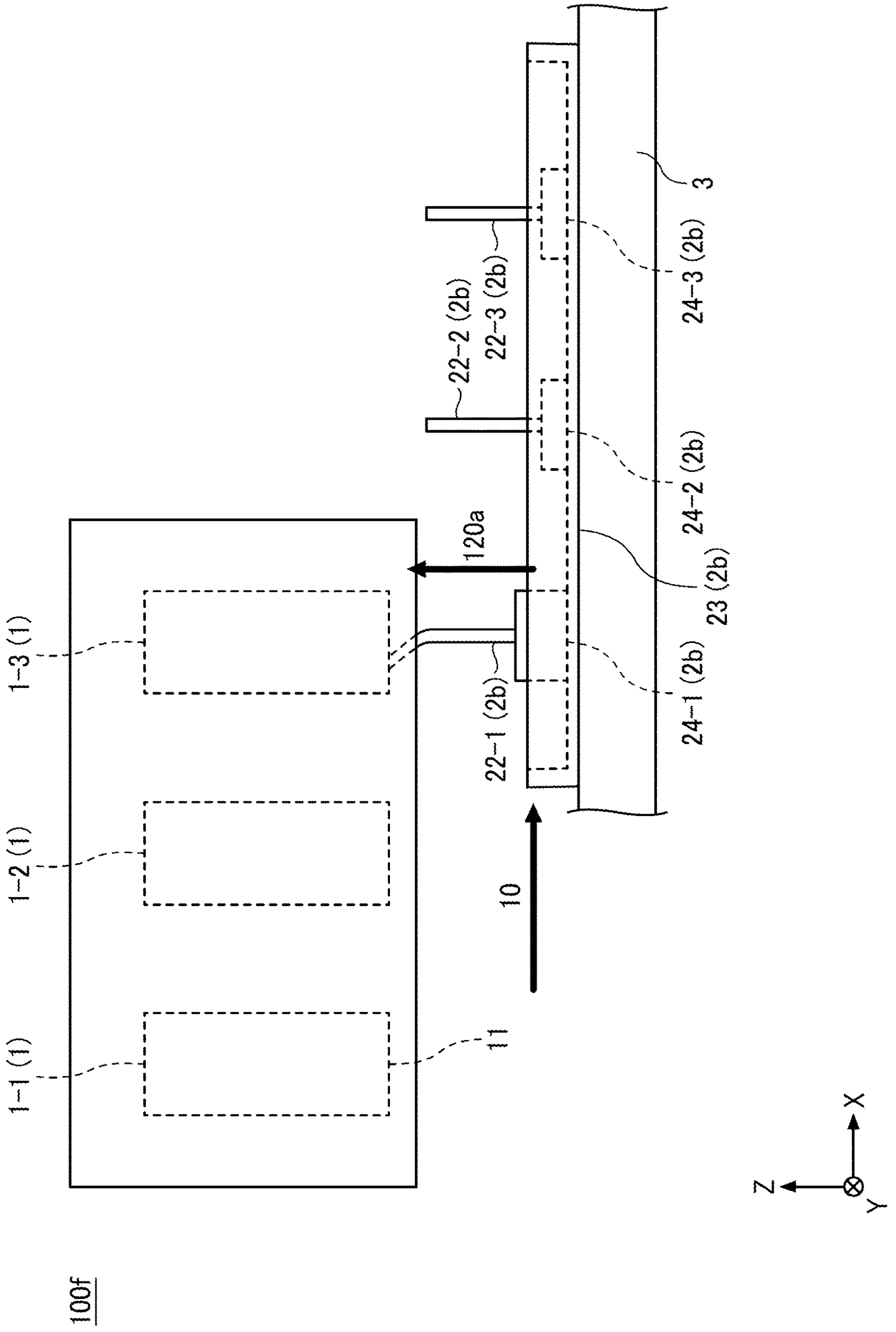
FIG. 39 is a second diagram illustrating the example of the maintaining operation by the liquid application apparatus according to the seventh embodiment.

FIGS. 38 and 39 are diagrams illustrating an example of the maintaining operation by a liquid application apparatus 100*f* according to the seventh embodiment. In FIGS. 38 and 39, the liquid application apparatus 100 *f* continuously conveys the cleaning unit 2*b* in the conveyance direction 10 by the conveyor 3 without stopping.

A wiping member 22-3 corresponding to a head 1-1 rises to a height at which the wiping member 22-3 will come into contact with a nozzle surface 11 of the head 1-1 with a timing immediately before the head 1-1 is conveyed above the wiping member 22-3. Thereafter, as illustrated in FIG. 38, when the head 1-1 reaches above the wiping member 22-3, the wiping member 22-3 comes into contact with the nozzle surface 11 of the head 1-1. When the cleaning unit 2*b* is conveyed in the conveyance direction 10 in a state where the wiping member 22-3 is in contact, the nozzle surface 11 of the head 1-1 is wiped. After the nozzle surface 11 of the head 1-1 is wiped, the wiping member 22-3 descends and is no longer in contact with the nozzle surface 11 of each of the head 1-1, the head 1-2, and the head 1-3.

Thereafter, the wiping member 22-1 corresponding to the head 1-3 rises to a height at which the wiping member 22-1 will come into contact with the nozzle surface 11 of the head 1-3 at a timing immediately before the head 1-3 is conveyed above the wiping member 22-1. Thereafter, as illustrated in FIG. 38, when the head 1-3 reaches above the wiping member 22-1, the wiping member 22-1 comes into contact with the nozzle surface 11 of the head 1-3. When the cleaning unit 2*b* is conveyed in the conveyance direction 10 in a state where the wiping member 22-1 is in contact, the nozzle surface 11 of the head 1-3 is wiped. After the nozzle surface 11 of the head 1-3 is wiped, the wiping member 22-1 descends and is no longer in contact with the nozzle surface 11 of each of the head 1-1, the head 1-2, and the head 1-3.

As described above, the liquid application apparatus 100*f* can wipe the nozzle surface 11 of the head 1.

Eighth Embodiment

A liquid application apparatus according to an eighth embodiment will be described. The present embodiment is different from the above-described embodiments in that a wiper includes a plate member including a flat portion intersecting a conveyance direction of a cleaning unit, and a liquid application apparatus further includes an inclination variable mechanism that changes the inclination of the flat portion so as to be switchable between a contact state and a non-contact state with respect to a head.

Figure 40:
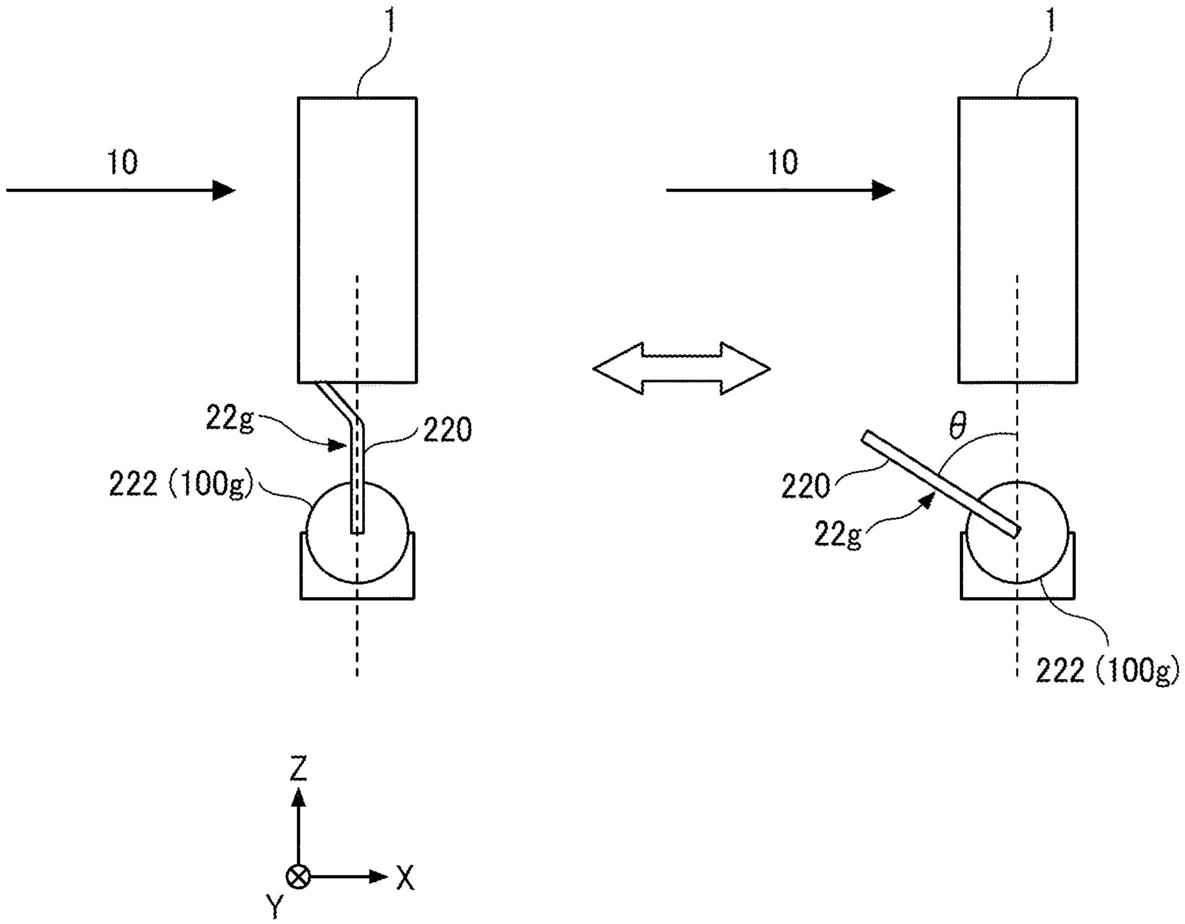
FIG. 40 is a diagram illustrating a configuration example of a wiping member according to an eighth embodiment of the present disclosure.

FIG. 40 is a diagram illustrating an example of a configuration of a liquid application apparatus 100*g* according to the present embodiment. The liquid application apparatus 100*g* includes a wiping member 22*g* and an inclination variable mechanism 222. The wiping member 22*g* includes a flat portion 220. The inclination variable mechanism 222 serving as an adjuster changes the inclination of the wiping member 22*g* so that the inclination of the flat portion 220 changes.

The inclination variable mechanism 222 changes the inclination of the flat portion 220 by rotating the wiping member 22*g* about an axis intersecting a conveyance direction 10 and the up-and-down direction (for example, an axis parallel to the Y axis). The inclination variable mechanism 222 includes a rotary stage, a motor that rotationally drives the rotary stage, and the like. The inclination variable mechanism 222 can change the inclination of the flat portion 220 and switch between the contact state and the non-contact state of the wiping member 22*g* with respect to the head 1 by rotationally driving the rotary stage according to a control signal from a controller, for example.

The left diagram in FIG. 40 illustrates a state in which the flat portion 220 is along the up-and-down direction. In this state, when the head 1 is conveyed above the wiping member 22*g*, the wiping member 22*g* comes into contact with the head 1.

The right diagram in FIG. 40 illustrates a state in which the flat portion 220 is inclined at an angle θ with respect to the up-and-down direction. In this state, when the head 1 is conveyed above the wiping member 22*g*, the wiping member 22*g* does not come into contact with the head 1.

As described above, the wiping member 22*g* can switch between the contact state and the non-contact state with respect to the head 1. As long as the wiping member 22*g* can switch between the contact state and the non-contact state with respect to the head 1, the direction of the rotation axis for the inclination variable mechanism 222 to change the inclination of the wiping member 22*g* is not particularly limited.

The advantageous effect of the liquid application apparatus 100*g* is the same as that of the liquid application apparatus 100*b* according to the third embodiment.

Ninth Embodiment

A liquid application apparatus according to a ninth embodiment will be described. In the present embodiment, a head includes a nozzle surface on which a plurality of nozzles for discharging a liquid is formed. The normal line of the nozzle surface is inclined at any one of degrees or more and 45 degrees or less and −45 degrees or more and −5 degrees or less with respect to the axis along the up-and-down direction about at least one of an axis along a conveyance direction of an object and an axis orthogonal to the conveyance direction of the object in a plane orthogonal to the up-and-down direction. This point is different from the above-described embodiments.

Figure 41:
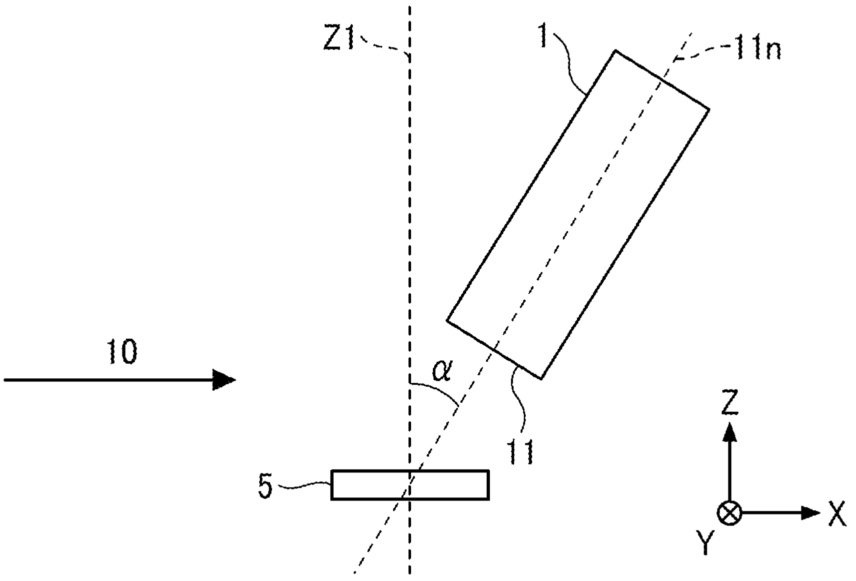
FIG. 41 is a first diagram illustrating a configuration example of a head according to a ninth embodiment of the present disclosure.
Figure 42:
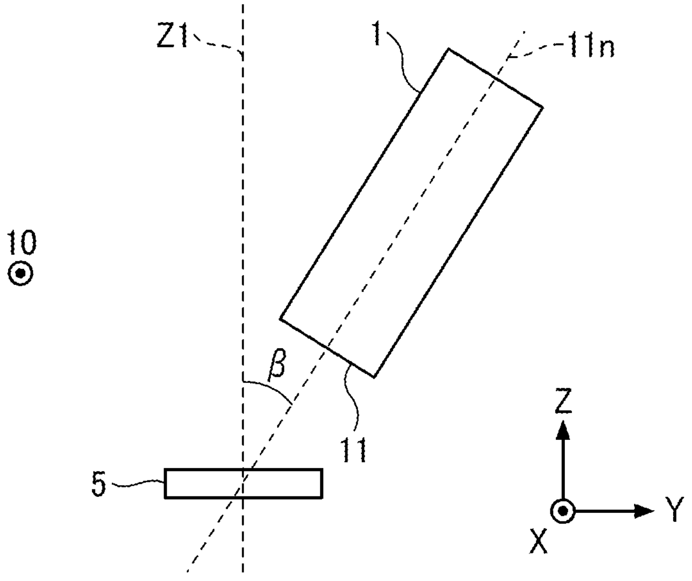
FIG. 42 is a second diagram illustrating the configuration example of the head according to the ninth embodiment.

FIGS. 41 and 42 are diagrams illustrating a configuration example of the head 1 according to the present embodiment. In FIGS. 41 and 42, the positive angle is a clockwise angle, and the negative angle is a counterclockwise angle.

In FIG. 41, a normal line 11*n* of the nozzle surface 11 in the head 1 is inclined at an angle α with respect to an axis Z1 along the up-and-down direction about the axis along the conveyance direction 10. In the example illustrated in FIG.

41, the angle α is 5 degrees or more and 45 degrees or less. However, the angle α may be −45 degrees or more and −5 degrees or less.

In FIG. 42, the normal line 11*n* of the nozzle surface 11 in the head 1 is inclined at an angle β with respect to the axis Z1 along the up-and-down direction about an axis orthogonal to the conveyance direction 10 in a plane including the axis along the conveyance direction 10. In the example illustrated in FIG. 42, the angle β is 5 degrees or more and 45 degrees or less. However, the angle β may be −45 degrees or more and −5 degrees or less.

In the present embodiment, according to the above configuration, since the discharge direction of the liquid from the head 1 intersects the front surface, the back surface, or the side surface of the object 5, the liquid discharged from the head 1 can be applied to these surfaces. The front surface of the object 5 is a surface intersecting the axis along the conveyance direction 10 of the object 5, and is a surface on the side in conveyance direction 10 side (here, the +X side). The back surface of the object 5 is a surface intersecting the axis along the conveyance direction 10 of the object 5, and is a surface on the side opposite (in this case, the −X side) to the conveyance direction 10. The side surface of the object 5 is a side surface of the object 5 (herein, a surface on the +Y side or the −Y side).

Figure 43:
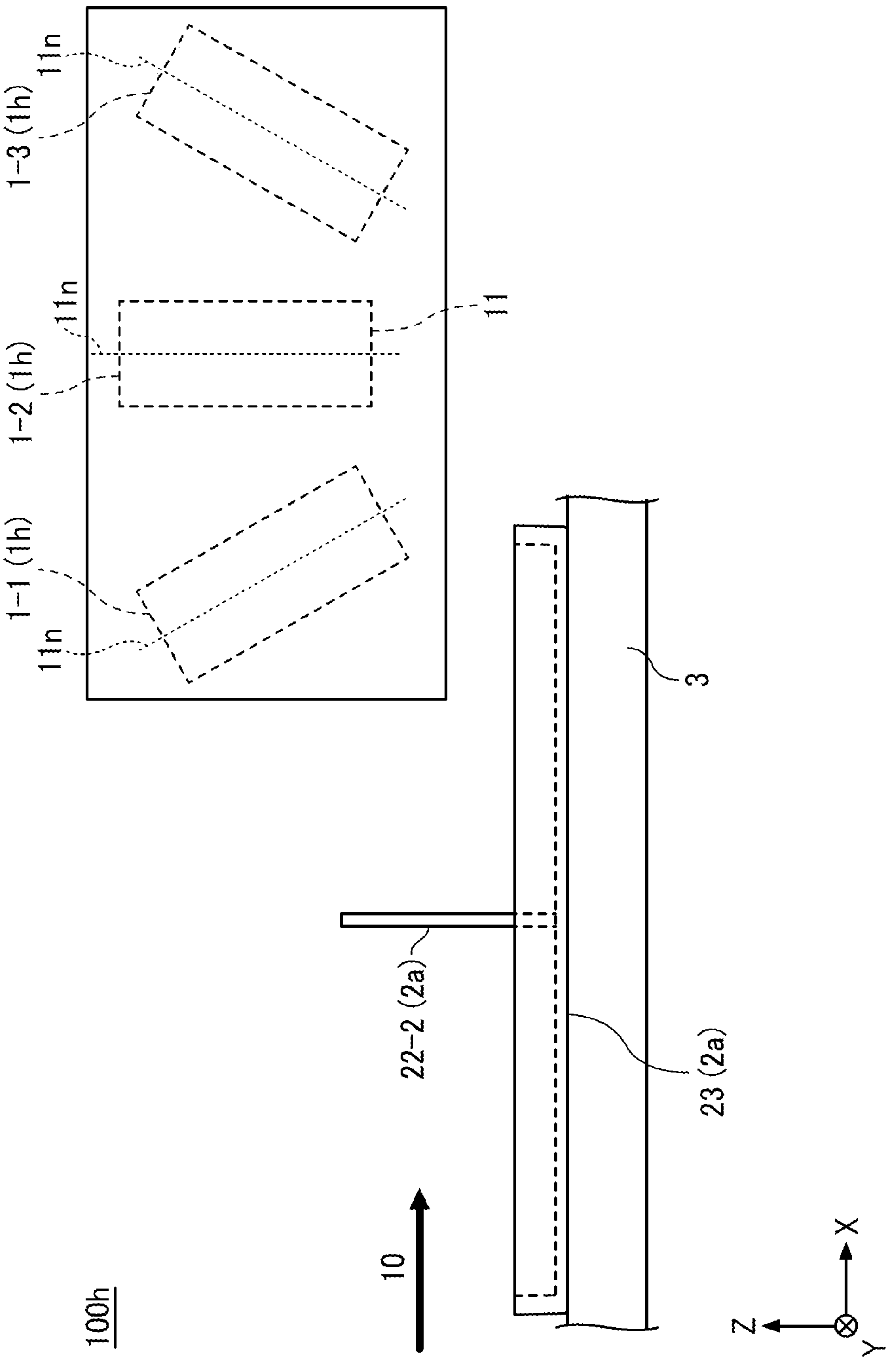
FIG. 43 is a first diagram illustrating another configuration example of the liquid application apparatus according to the ninth embodiment.
Figure 44:
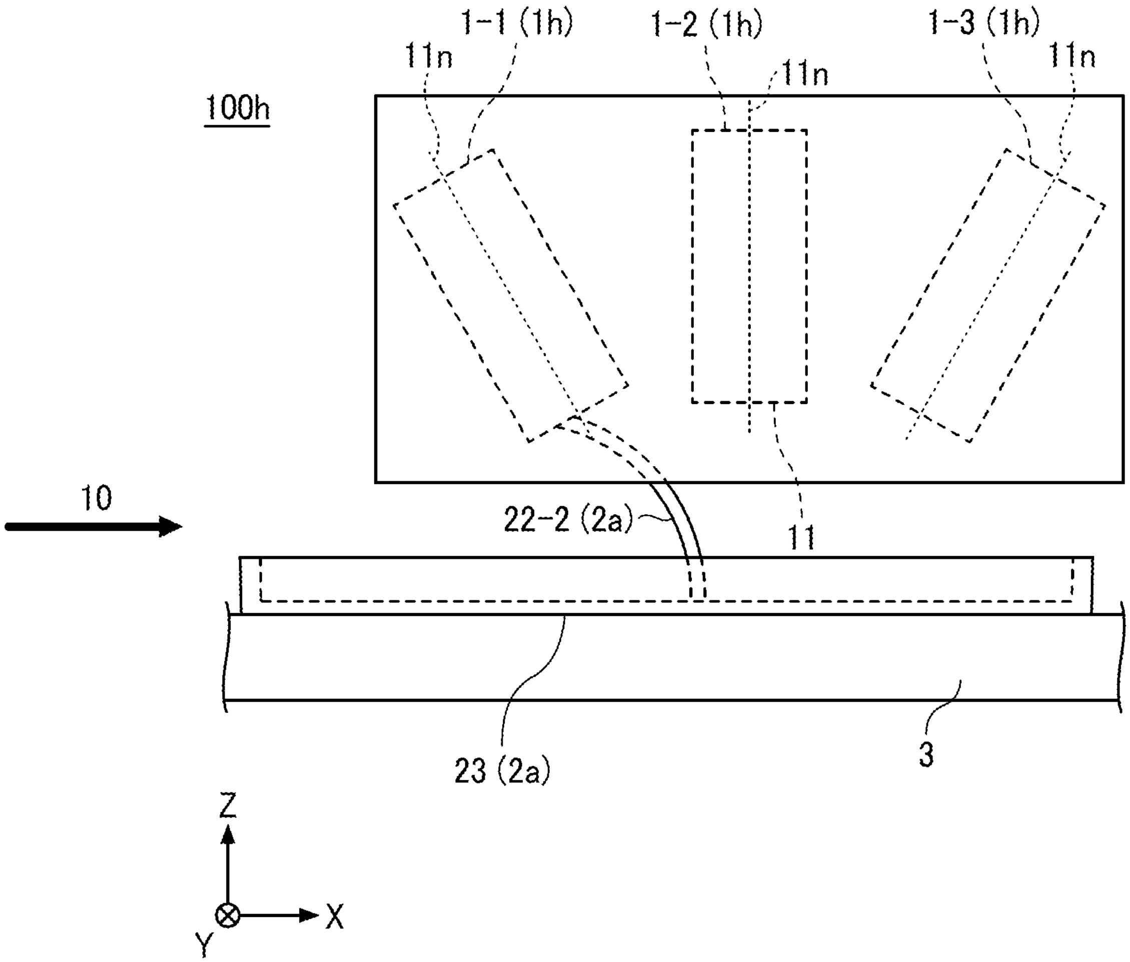
FIG. 44 is a second diagram illustrating the other configuration example of the liquid application apparatus according to the ninth embodiment.
Figure 45:
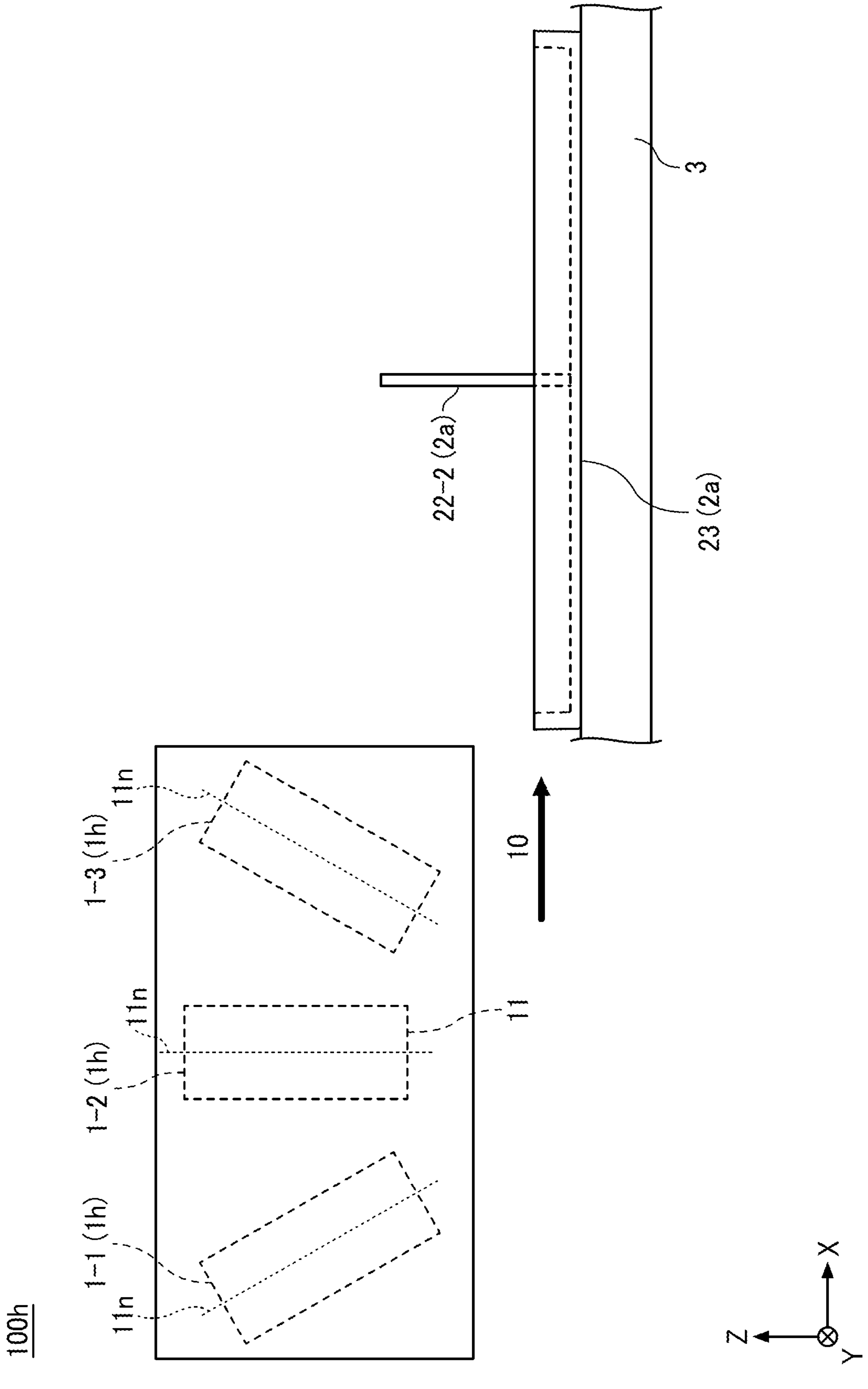
FIG. 45 is a third diagram illustrating the other configuration example of the liquid application apparatus according to the ninth embodiment.

In the present embodiment, as illustrated in FIGS. 43 to 45, the inclination of the normal line of the nozzle surface may be different among the plurality of heads included in the head. In FIGS. 43 to 45, a liquid application apparatus 100*h* includes a head 1*h* including a head 1-1, a head 1-2, and a head 1-3. The inclinations of the normal lines 11*n* of nozzle surfaces 11 of the head 1-1, the head 1-2, and the head 1-3 included in the head 1*h* are different from one another.

Specifically, the normal line 11*n* of the nozzle surface 11 of the head 1-1 is inclined at a range of −45 degrees or more and −5 degrees or less with respect to an axis along the up-and-down direction about the axis orthogonal to the conveyance direction 10 of the object 5 in a plane orthogonal to the up-and-down direction. The normal line 11*n* of the nozzle surface 11 of the head 1-2 is inclined by 0 degrees, that is, not inclined with respect to the axis along the up-and-down direction about the axis orthogonal to the conveyance direction 10 of the object 5 in the plane orthogonal to the up-and-down direction. The normal line 11*n* of the nozzle surface 11 of the head 1-3 is inclined at a range of 5 degrees or more and 45 degrees or less with respect to the axis along the up-and-down direction about the axis orthogonal to the conveyance direction 10 of the object 5 in the plane orthogonal to the up-and-down direction. Also in this configuration, the advantageous effects of the present embodiments described above can be obtained.

The advantageous effects other than those described above are the same as those described in relation to the above-described embodiments.

Although the preferred embodiments have been described in detail above, embodiments of the present disclosure are not limited to the above-described embodiments, and various modifications and substitutions can be made to the above-described embodiments without departing from the scope of the claims.

In an embodiment, it is preferable that a path including a position at which the object faces the head 1 in the first conveyance path 6 and a path including a position at which the cleaning unit 2 faces the head 1 in the second conveyance path 7 are at least the same. Accordingly, the movement time for retracting the head 1 from the first conveyance path 6 for the maintaining operation can be shortened, and the advantageous effect of increasing the productivity of the liquid application apparatus can be suitably obtained.

In relation to the above-described embodiments, the advantageous effect has been described in which the movement time of the head 1 can be reduced by not moving the head 1 to a position separated from the first conveyance path 6, whereby a liquid application apparatus with high productivity can be provided. This advantageous effect can be obtained if the head 1 is not moved in a direction intersecting the extending direction of the first conveyance path 6 and substantially orthogonal to the up-and-down direction in order to separate the head 1 from the first conveyance path 6. In other words, in an embodiment, the above advantageous effect can be obtained even if the head 1 is moved in the up-and-down direction.

This will be described in more detail. For example, in the case of forming an image on a recording medium such as paper as an object, the distance between the head 1 and the object 5 may be a short distance of about 1 mm or less. On the other hand, the length of each of the discharged liquid holder 21, the wiped liquid holder 23, and the wiping member 22 in the up-and-down direction is about 5 mm or more. Therefore, in the case of performing the maintaining operation, if the distance between the head 1 and the cleaning unit 2 is set to be the same as the distance between the head 1 and the object 5, the head 1 comes into contact with the cleaning unit 2 and cannot perform the maintaining operation such as dummy discharge or wiping.

Therefore, in the above case, in the case of performing the maintaining operation, the head 1 needs to be moved in the upward direction from the state in which the image is formed so that the head 1 and the cleaning unit 2 are not in contact with each other. After the maintaining operation is completed, the head 1 needs to be moved downward to form an image on the object 5.

However, the movement distance of the head 1 in the up-and-down direction in the above case is shorter than the movement distance in the horizontal direction intersecting the up-and-down direction in the case of moving the head 1 a position separated from the first conveyance path 6 to perform the maintaining operation and then returning the head 1 to the original position. For example, the movement distance in the up-and-down direction is less than 50 mm, and the movement distance in the horizontal direction is 50 mm or more. According to the moving distance, the time of movement in the up-and-down direction becomes shorter than the time of movement in the horizontal direction. As described above, even if the head 1 is moved in the up-and-down direction, the advantageous effect of reducing the time of moving the head 1 can be obtained. Since the first conveyance path 6 and the second conveyance path 7 are the same even if the head 1 is moved in the up-and-down direction, the movement of the head 1 in the up-and-down direction does not affect the difference in the conveyance path at all.

The numbers, such as ordinal numbers and quantities, used in the descriptions of the above-described embodiments are all examples for specifically describing the technology of the present disclosure, and embodiments of the present disclosure are not limited to the exemplified numbers. In addition, the above-describe connections among the components are examples for specifically describing the technology of the present disclosure, and connections for implementing functions of the present disclosure are not limited to the above-described examples.

Each function of the embodiment described above can be achieved by one or more processing circuits. The term "processing circuit" or "circuitry" in the present specification includes a programmed processor to execute each function by software, such as a processor implemented by an electronic circuit, and devices, such as an application specific integrated circuit (ASIC), a digital signal processor (DSP), and a field programmable gate array (FPGA), and conventional circuit modules arranged to perform the recited functions.

Aspects of the present disclosure are, for example, as follows.

According to a first aspect, a liquid application apparatus includes: an applicator to apply a liquid to an object; a maintenance device to maintain an applying condition of the liquid by the applicator; a conveyor to convey the object and the maintenance device; a first conveyance path along which the object is conveyed; and a second conveyance path along which the maintenance device is conveyed. The applicator includes a nozzle surface on which a plurality of nozzles to discharge the liquid is formed. The maintenance device includes a wiper to wipe the nozzle surface. The first conveyance path overlaps with the second conveyance path at least at a portion at which the first conveyance path passes by the applicator.

According to a second aspect, in the liquid application apparatus of the first aspect, the applicator is a head that discharges the liquid onto the object.

According to a third aspect, the liquid application apparatus of the first or second aspect further includes a first mover to move the applicator in a direction intersecting a conveyance direction of the maintenance device when the maintenance device performs an operation of maintaining the applying condition of the liquid by the applicator.

According to a fourth aspect, in the liquid application apparatus of the first or second aspect, the applicator includes a nozzle surface on which a plurality of nozzles to discharge the liquid is formed. The maintenance device includes a wiper to wipe the nozzle surface. The liquid application apparatus further includes a second mover to move the wiper in the direction intersecting the conveyance direction of the maintenance device when the maintenance device performs an operation of maintaining the applying condition of the liquid by the applicator.

According to a fifth aspect, in the liquid application apparatus of the fourth aspect, the applicator includes a first applicator to apply the liquid and a second applicator to apply a liquid different from the liquid applied by the first applicator. The maintenance device includes a first wiper to wipe a nozzle surface of the first applicator and a second wiper to wipe a nozzle surface of the second applicator. The second mover moves each of the first wiper and the second wiper in the direction intersecting the conveyance direction of the maintenance device when the maintenance device performs the operation of maintaining the applying condition of the liquid. The first wiper and the second wiper move at different timings in the direction intersecting the conveyance direction of the maintenance device.

According to a sixth aspect, in the liquid application apparatus of any one of the first to fifth aspect, the conveyance direction of the maintenance device is a direction intersecting a vertical direction, and the direction intersecting the conveyance direction of the maintenance device is the vertical direction.

According to a seventh aspect, in the liquid application apparatus of the fourth or fifth aspect, the wiper includes a plate member including a flat portion intersecting the conveyance direction of the maintenance device. The liquid application apparatus further includes a variable inclination mechanism to change an inclination of the flat portion to switch between a contact state and a non-contact state with respect to the applicator.

According to an eighth aspect, in the liquid application apparatus of the second aspect, the head executes dummy discharge that is discharge of the liquid not applied to the object. The maintenance device includes a discharged liquid holder to hold the liquid discharged by the head performing the dummy discharge.

According to a ninth aspect, in the liquid application apparatus of the eighth aspect, a length of the discharged liquid holder in the conveyance direction of the maintenance device varies depending on at least one of a conveying speed of the maintenance device and a length of the head in the conveyance direction of the maintenance device.

According to a tenth aspect, in the liquid application apparatus of any one of the first to ninth aspects, the object includes a plurality of objects, and the maintenance device includes a plurality of maintenance devices. The plurality of objects are arranged between adjacent ones of the plurality of maintenance devices in the conveyance direction of the maintenance device. The number of the plurality of objects arranged between adjacent ones of the plurality of maintenance devices varies depending on at least one of a conveying speed of the plurality of maintenance devices and a type of the liquid.

According to an eleventh aspect, in the liquid application apparatus of any one of the first to tenth aspects, a normal line of the nozzle surface of the applicator is inclined at any one of 5 degrees or more and 45 degrees or less and −45 degrees or more and −5 degrees or less, with respect to an axis along an up-and-down direction, about at least one of an axis along a conveyance direction of the object and an axis orthogonal to the conveyance direction of the object in a plane orthogonal to the up-and-down direction.

According to a twelfth aspect, in the liquid application apparatus of the first aspect, the second conveyance path branches from the first conveyance path at a position downstream from the applicator in the conveyance direction of the maintenance device.

According to a thirteenth aspect, in the liquid application apparatus of the first aspect, the second conveyance path includes a circulation path that branches from the first conveyance path at a position downstream from the applicator in the conveyance direction of the maintenance device and joins the first conveyance path at a position upstream from the applicator in the conveyance direction of the maintenance device.

According to a fourteenth aspect, in the liquid application apparatus of the twelfth or thirteenth aspect, the maintenance device is collected from the second conveyance path after branching from the first conveyance path.

According to a fifteenth aspect, in the liquid application apparatus of any one of the first to fourteenth aspects, the applicator applies the liquid discharged by a line head method to the object.

According to a sixteenth aspect, there is provided a liquid application method to be performed by a liquid application apparatus. The method includes: applying a liquid to an object by an applicator; maintaining, with a maintenance device, an applying condition of the liquid by the applicator; and conveying each of the object and the maintenance device by a conveyor. The object is conveyed along a first conveyance path. The maintenance device is conveyed along a second conveyance path. The applicator includes a nozzle surface on which a plurality of nozzles to discharge the liquid is formed. The maintenance device includes a wiper to wipe the nozzle surface. The first conveyance path overlaps with the second conveyance path at least at a portion at which the first conveyance path passes by the applicator.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The invention claimed is:

1. A liquid application apparatus, comprising:

an applicator to apply a liquid to an object;

a maintenance device to maintain an applying condition of the liquid by the applicator;

a conveyor to convey the object and the maintenance device;

a first conveyance path along which the object is to be conveyed; and a second conveyance path along which the maintenance device is to be conveyed, the applicator including a nozzle surface on which a plurality of nozzles to discharge the liquid is formed, the maintenance device including a wiper to wipe the nozzle surface, the first conveyance path overlapping with the second conveyance path at least at a portion at which the first conveyance path passes by the applicator.

2. The liquid application apparatus according to claim 1, wherein the applicator is a head that discharges the liquid to the object.

3. The liquid application apparatus according to claim 1, further comprising a mover to move the applicator in a direction intersecting a conveyance direction of the maintenance device when the maintenance device performs an operation of maintaining the applying condition of the liquid by the applicator.

4. The liquid application apparatus according to claim 1, further comprising a mover to move the wiper in a direction intersecting a conveyance direction of the maintenance device when the maintenance device performs an operation of maintaining the applying condition of the liquid by the applicator.

5. The liquid application apparatus according to claim 4, further comprising another applicator to apply a liquid different from the liquid applied by the applicator, wherein the maintenance device further includes another wiper to wipe a nozzle surface of said another applicator, wherein the mover is to move the wiper and said another wiper in the direction intersecting the conveyance direction of the maintenance device when the maintenance device performs the operation of maintaining the applying condition of the liquid, and wherein the wiper and said another wiper are to move in the direction intersecting the conveyance direction of the maintenance device at different timings from each other.

6. The liquid application apparatus according to claim 3, wherein the conveyance direction of the maintenance device is a direction intersecting a vertical direction, and wherein the direction intersecting the conveyance direction of the maintenance device is the vertical direction.

7. The liquid application apparatus according to claim 4, wherein the wiper includes a plate including a flat portion intersecting the conveyance direction of the maintenance device, and wherein the liquid application apparatus further comprises an adjuster to change an inclination of the flat portion to switch between a contact state and a non-contact state of the flat portion with respect to the applicator.

8. The liquid application apparatus according to claim 2, wherein the head is to execute dummy discharge that is discharge of the liquid not applied to the object, and wherein the maintenance device includes a discharged liquid holder to hold the liquid discharged by the dummy discharge of the head.

9. The liquid application apparatus according to claim 2, further comprising a plurality of heads, including the head, to execute dummy discharge that is discharge of the liquid not applied to the object, wherein the maintenance device includes a plurality of discharged liquid holders, including the discharged liquid holder, to hold the liquid discharged by the dummy discharge of the plurality of heads, and wherein the plurality of discharged liquid holders have different lengths in a conveyance direction of the maintenance device, depending on at least one of a conveying speed of the maintenance device and a length of the plurality of heads in the conveyance direction of the maintenance device.

10. The liquid application apparatus according to claim 1, further comprising a plurality of maintenance devices including the maintenance device, wherein a plurality of objects including the object are arranged between adjacent ones of the plurality of maintenance devices in a conveyance direction of the maintenance device, and wherein a number of the plurality of objects arranged between adjacent ones of the plurality of maintenance devices varies depending on at least one of a conveying speed of the plurality of maintenance devices and a type of the liquid.

11. The liquid application apparatus according to claim 1, wherein a normal line of the nozzle surface is inclined at any one of 5 degrees or more and 45 degrees or less and −45 degrees or more and −5 degrees or less, with respect to an axis along an up-and-down direction, about at least one of an axis along a conveyance direction of the object and an axis orthogonal to the conveyance direction of the object in a plane orthogonal to the up-and-down direction.

12. The liquid application apparatus according to claim 1, wherein the second conveyance path branches from the first conveyance path downstream from the applicator in a conveyance direction of the maintenance device.

13. The liquid application apparatus according to claim 1, wherein the second conveyance path includes a circulation path that branches from the first conveyance path at a position downstream from the applicator in a conveyance direction of the maintenance device and joins the first conveyance path at a position upstream from the applicator in the conveyance direction of the maintenance device.

14. The liquid application apparatus according to claim 12, wherein the maintenance device is collected from the second conveyance path after branching from the first conveyance path.

15. The liquid application apparatus according to claim 1, wherein the applicator is a line head to discharge the liquid to apply the liquid to the object.

* * * * *